(12) United States Patent
Lalande et al.

(10) Patent No.: US 12,445,273 B2
(45) Date of Patent: Oct. 14, 2025

(54) SHARING KEYS FOR A WIRELESS ACCESSORY

(71) Applicant: Apple Inc., Cupertino, CA (US)

(72) Inventors: Emmanuel Lalande, San Francisco, CA (US); Michael C. Laster, Santa Clara, CA (US); Scott Lopatin, San Francisco, CA (US); Munish K. Poonia, San Jose, CA (US); Tommy Rochette, San Jose, CA (US); Yannick L. Sierra, San Francisco, CA (US); Tim Taubert, Berlin (DE); Steven A. Myers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/603,562

(22) PCT Filed: Apr. 15, 2020

(86) PCT No.: PCT/US2020/028318
§ 371 (c)(1),
(2) Date: Oct. 13, 2021

(87) PCT Pub. No.: WO2020/214701
PCT Pub. Date: Oct. 22, 2020

(65) Prior Publication Data
US 2022/0200789 A1    Jun. 23, 2022

Related U.S. Application Data

(60) Provisional application No. 62/856,020, filed on Jun. 1, 2019, provisional application No. 62/835,494, filed on Apr. 17, 2019.

(51) Int. Cl.
| | | |
|---|---|---|
| *H04L 9/08* | (2006.01) | |
| *H04W 4/029* | (2018.01) | |
| *H04W 12/0431* | (2021.01) | |

(52) U.S. Cl.
CPC ............ *H04L 9/085* (2013.01); *H04L 9/0819* (2013.01); *H04L 9/0891* (2013.01); *H04W 4/029* (2018.02); *H04W 12/0431* (2021.01)

(58) Field of Classification Search
CPC ..... H04L 9/0819; H04L 9/085; H04L 9/0891; H04W 4/029; H04W 12/0431
See application file for complete search history.

(56) References Cited

U.S. PATENT DOCUMENTS

| | | | | |
|---|---|---|---|---|
| 4,918,425 A | * | 4/1990 | Greenberg | ......... G08B 21/0297 340/572.1 |
| 5,910,776 A | * | 6/1999 | Black | ............... G06K 19/07758 340/8.1 |

(Continued)

FOREIGN PATENT DOCUMENTS

| | | |
|---|---|---|
| CN | 101682508 A | 3/2010 |
| CN | 102325324 A | 1/2012 |

(Continued)

OTHER PUBLICATIONS

PCT/US20221/027681, "PCT Notification of transmittal of the International Search Report and the Written Opinion of the International Searching Authority, or the Declaration", mailed Jul. 28, 2022, 9 pages.

(Continued)

*Primary Examiner* — Gary S Gracia
(74) *Attorney, Agent, or Firm* — Kilpatrick Townsend & Stockton LLP

(57) ABSTRACT

Embodiments described herein provide for a non-transitory machine-readable medium storing instructions to cause one or more processor to perform operations to share a set of keys used to communicate with a wireless accessory device.

(Continued)

By sharing the set of keys, functionality of the wireless accessory device can be delegated by an owner to other individuals.

20 Claims, 38 Drawing Sheets

(56) References Cited

U.S. PATENT DOCUMENTS

| | | | |
|---|---|---|---|
| 6,292,660 B1 * | 9/2001 | Hartless | H04W 48/16 |
| | | | 455/515 |
| 6,345,098 B1 * | 2/2002 | Matyas, Jr. | H04L 9/3247 |
| | | | 380/46 |
| 6,369,706 B1 * | 4/2002 | Anderson | G06F 1/16 |
| | | | 340/5.1 |
| 6,754,349 B1 * | 6/2004 | Arthan | H04L 9/0894 |
| | | | 726/20 |
| 6,993,350 B2 * | 1/2006 | Katoh | G01C 21/3415 |
| | | | 455/457 |
| 7,039,427 B2 * | 5/2006 | Tachikawa | H04W 4/023 |
| | | | 455/457 |
| 7,059,182 B1 * | 6/2006 | Ragner | H04M 1/185 |
| | | | 73/200 |
| 7,224,987 B1 * | 5/2007 | Bhela | H04L 67/53 |
| | | | 455/456.2 |
| 7,274,761 B2 * | 9/2007 | Muller | G06F 1/14 |
| | | | 370/503 |
| 7,342,497 B2 * | 3/2008 | Chung | G06Q 10/08 |
| | | | 340/572.1 |
| 7,376,393 B2 * | 5/2008 | Ono | H04W 84/02 |
| | | | 455/566 |
| 7,388,491 B2 * | 6/2008 | Chand | G06Q 10/087 |
| | | | 340/572.1 |
| 7,519,377 B2 * | 4/2009 | Tsukamoto | H04M 1/6041 |
| | | | 455/462 |
| 7,558,529 B2 * | 7/2009 | Seshadri | H04R 5/033 |
| | | | 455/569.1 |
| 7,657,248 B2 * | 2/2010 | Hodoshima | H04W 12/069 |
| | | | 370/311 |
| 8,213,389 B2 * | 7/2012 | Bush | G01S 5/0221 |
| | | | 370/334 |
| 8,224,355 B2 * | 7/2012 | Beydler | H04W 4/025 |
| | | | 709/224 |
| 8,351,937 B2 * | 1/2013 | Lee | H04W 8/005 |
| | | | 455/434 |
| 8,457,617 B2 | 6/2013 | Sweeney et al. | |
| 8,499,337 B1 * | 7/2013 | Kenny | G06F 21/33 |
| | | | 726/4 |
| 8,538,401 B2 * | 9/2013 | Kim | H04M 1/72403 |
| | | | 702/41 |
| 8,583,915 B1 * | 11/2013 | Huang | H04L 9/3234 |
| | | | 726/6 |
| 8,873,758 B2 * | 10/2014 | Bradley | H04W 12/04 |
| | | | 713/171 |
| 8,971,924 B2 * | 3/2015 | Pai | H04W 64/006 |
| | | | 455/457 |
| 9,009,794 B2 * | 4/2015 | Dykeman | G06F 21/10 |
| | | | 726/4 |
| 9,077,521 B2 * | 7/2015 | Machani | H04L 63/123 |
| 9,104,896 B2 * | 8/2015 | Pai | G06T 7/11 |
| 9,277,353 B2 * | 3/2016 | Merriam | G06F 16/29 |
| 9,277,386 B1 * | 3/2016 | Masiero | H04W 4/90 |
| 9,316,717 B2 * | 4/2016 | Gicklhorn | G01S 5/18 |
| 9,323,916 B1 * | 4/2016 | Wu | G06F 21/335 |
| 9,357,348 B2 * | 5/2016 | Evans | H04W 4/029 |
| 9,420,423 B1 * | 8/2016 | Mendelson | G01C 21/206 |
| 9,426,749 B2 * | 8/2016 | Cordeiro | H04L 69/18 |
| 9,432,802 B2 * | 8/2016 | Matsushita | H04W 4/029 |
| 9,439,056 B2 * | 9/2016 | Chukka | H04W 12/06 |
| 9,443,366 B2 * | 9/2016 | Rayner | G08B 13/1427 |
| 9,445,220 B2 * | 9/2016 | Granbery | H04L 67/535 |
| 9,456,298 B2 * | 9/2016 | Lee | H04W 4/02 |
| 9,462,109 B1 * | 10/2016 | Frazier Fields | H04W 4/025 |
| 9,516,620 B1 * | 12/2016 | Upp | H04L 65/1016 |
| 9,520,045 B2 * | 12/2016 | Hawkins | H04W 4/80 |
| 9,544,075 B2 * | 1/2017 | Altman | H04W 4/06 |
| 9,557,185 B2 * | 1/2017 | Kimes | G01C 21/343 |
| 9,565,255 B2 | 2/2017 | Kapoor et al. | |
| 9,641,622 B2 * | 5/2017 | Kapoor | H04R 3/12 |
| 9,706,032 B2 * | 7/2017 | Pai | G06F 21/88 |
| 9,762,316 B2 * | 9/2017 | Kukulski | H04W 12/08 |
| 9,769,601 B2 * | 9/2017 | Zelinka | H04W 4/02 |
| 9,779,596 B2 | 10/2017 | Ingrassia et al. | |
| 9,781,106 B1 * | 10/2017 | Vitus | G06F 21/316 |
| 9,801,059 B2 * | 10/2017 | Ziv | H04W 12/03 |
| 9,820,093 B2 * | 11/2017 | Mayor | H04W 4/021 |
| 9,848,075 B1 * | 12/2017 | Ahmad | G16H 40/67 |
| 9,860,932 B2 | 1/2018 | Kapoor et al. | |
| 9,922,531 B1 * | 3/2018 | Doxey | G08B 21/0252 |
| 9,942,379 B2 * | 4/2018 | Huang | H04M 1/72412 |
| 9,961,507 B1 * | 5/2018 | Mendelson | H04W 4/029 |
| 10,015,836 B2 | 7/2018 | Kapoor et al. | |
| 10,022,066 B2 * | 7/2018 | Tomiha | A61B 17/3403 |
| 10,022,086 B1 * | 7/2018 | Kahn | H04W 4/80 |
| 10,042,595 B2 * | 8/2018 | Behzadi | G06F 13/128 |
| 10,110,642 B2 * | 10/2018 | Numakami | H04W 76/10 |
| 10,366,692 B1 * | 7/2019 | Adams | G10L 15/22 |
| 10,368,378 B2 * | 7/2019 | Foster | G06F 1/1698 |
| 10,410,485 B2 | 9/2019 | Ingrassia et al. | |
| 10,448,211 B1 * | 10/2019 | Shen | G06K 7/10366 |
| 10,506,517 B2 * | 12/2019 | Dai Javad | H04W 4/023 |
| 10,600,310 B2 | 3/2020 | Hawkins | |
| 10,667,313 B2 * | 5/2020 | Maguire | H04W 12/63 |
| 10,701,203 B2 * | 6/2020 | Fiorini | H04M 3/42 |
| 10,771,898 B2 | 9/2020 | Dusan et al. | |
| 10,841,736 B1 * | 11/2020 | De La Broise | H04W 92/18 |
| 10,855,483 B1 * | 12/2020 | Ramesh | H04L 43/0817 |
| 10,862,684 B2 * | 12/2020 | Hong | G04W 4/80 |
| 10,956,975 B1 * | 3/2021 | Abdul Gaffar | G06F 1/1626 |
| 10,970,989 B1 * | 4/2021 | Quibelan | G08B 21/24 |
| 10,992,755 B1 * | 4/2021 | Tran | B60W 40/09 |
| 11,051,105 B2 | 6/2021 | Dusan et al. | |
| 11,088,830 B2 * | 8/2021 | Gu | H04L 67/12 |
| 11,107,088 B2 * | 8/2021 | Radocchia | H04L 9/3247 |
| 11,202,168 B1 * | 12/2021 | Evans | H04W 40/023 |
| 11,265,716 B2 * | 3/2022 | Klinkner | H04L 9/0643 |
| 11,282,351 B2 * | 3/2022 | Ingrassia, Jr. | G08B 21/24 |
| 11,288,562 B2 * | 3/2022 | Purba | G06K 19/047 |
| 11,310,652 B2 * | 4/2022 | Norp | H04W 8/18 |
| 11,356,799 B2 * | 6/2022 | Haney | H04W 4/08 |
| 11,595,784 B2 * | 2/2023 | Mohalik | H04W 4/029 |
| 11,606,669 B2 * | 3/2023 | Lopatin | G01S 5/0295 |
| 11,622,237 B2 * | 4/2023 | Diem | H04W 4/021 |
| | | | 455/456.3 |
| 11,641,563 B2 | 5/2023 | Lopatin et al. | |
| 11,716,603 B2 * | 8/2023 | Lee | H04W 4/80 |
| | | | 455/39 |
| 11,768,578 B2 * | 9/2023 | Behzadi | G06V 20/52 |
| | | | 715/848 |
| 11,863,671 B1 * | 1/2024 | Sierra | H04L 9/085 |
| 11,889,302 B2 * | 1/2024 | Victa | H04W 12/63 |
| 12,262,278 B2 | 3/2025 | Ertan et al. | |
| 2002/0144215 A1 * | 10/2002 | Hoskote | G06F 30/3323 |
| | | | 716/103 |
| 2003/0065918 A1 * | 4/2003 | Willey | H04L 63/146 |
| | | | 713/168 |
| 2003/0092437 A1 * | 5/2003 | Nowlin | H04W 74/04 |
| | | | 455/420 |
| 2003/0182584 A1 * | 9/2003 | Banes | G06F 21/34 |
| | | | 713/182 |
| 2004/0162027 A1 * | 8/2004 | Chang | H04M 1/72412 |
| | | | 455/41.2 |
| 2004/0249817 A1 * | 12/2004 | Liu | H04L 63/0435 |
| | | | 707/999.009 |
| 2005/0021767 A1 * | 1/2005 | Cai | G06F 9/485 |
| | | | 709/228 |
| 2005/0154896 A1 * | 7/2005 | Widman | H04L 9/12 |
| | | | 713/182 |
| 2005/0190098 A1 * | 9/2005 | Bridgelall | G01S 13/878 |
| | | | 342/14 |

(56) References Cited

U.S. PATENT DOCUMENTS

| | | | |
|---|---|---|---|
| 2005/0285739 A1* | 12/2005 | Velhal | G08B 21/0227 340/5.2 |
| 2006/0039337 A1* | 2/2006 | Hodoshima | H04L 63/0823 370/338 |
| 2006/0111835 A1* | 5/2006 | Baker | G01C 21/26 701/1 |
| 2007/0139199 A1* | 6/2007 | Hanlon | G06K 7/0008 340/572.1 |
| 2007/0249374 A1* | 10/2007 | Hu | H04L 51/212 455/411 |
| 2007/0283151 A1* | 12/2007 | Nakano | H04L 63/0442 713/168 |
| 2007/0283395 A1* | 12/2007 | Wezowski | H04M 19/041 725/100 |
| 2008/0004798 A1* | 1/2008 | Troxler | G08B 21/023 702/187 |
| 2008/0119953 A1* | 5/2008 | Reed | G06F 16/64 707/E17.009 |
| 2008/0120196 A1* | 5/2008 | Reed | G06Q 20/204 705/17 |
| 2009/0058670 A1* | 3/2009 | Sweeney | G08B 21/24 340/686.1 |
| 2009/0150674 A1* | 6/2009 | Richardson | H04L 9/006 713/171 |
| 2009/0315767 A1* | 12/2009 | Scalisi | G01S 19/34 342/357.74 |
| 2009/0323972 A1* | 12/2009 | Kohno | G06F 21/6245 380/284 |
| 2009/0325599 A1* | 12/2009 | Vuori | H04W 8/14 455/456.1 |
| 2010/0079249 A1* | 4/2010 | Pan | G06K 17/0022 340/10.1 |
| 2010/0159833 A1* | 6/2010 | Lewis | H04B 17/318 340/539.32 |
| 2010/0184378 A1* | 7/2010 | Wakefield | H04M 1/72412 455/41.2 |
| 2010/0245054 A1* | 9/2010 | Kim | G06K 7/10336 455/41.1 |
| 2010/0289620 A1* | 11/2010 | Aminger | H04L 67/52 340/10.1 |
| 2011/0124326 A1* | 5/2011 | Kudo | G08B 25/08 455/420 |
| 2012/0054493 A1* | 3/2012 | Bradley | H04W 12/50 713/168 |
| 2012/0083209 A1* | 4/2012 | Giles | H04W 12/082 455/41.2 |
| 2012/0100868 A1* | 4/2012 | Kim | H04W 4/023 455/456.1 |
| 2012/0275361 A1* | 11/2012 | Berenberg | H04W 48/16 370/311 |
| 2012/0310391 A1* | 12/2012 | Sanders | G11B 19/08 700/94 |
| 2012/0311643 A1* | 12/2012 | Aguirre | H04N 7/20 725/72 |
| 2012/0328061 A1* | 12/2012 | Chow | H04W 4/20 375/354 |
| 2013/0023238 A1* | 1/2013 | Kaplan | H04M 1/56 455/411 |
| 2013/0034004 A1* | 2/2013 | Mannemala | H04W 52/0216 370/252 |
| 2013/0070925 A1* | 3/2013 | Yamada | H04L 9/08 380/255 |
| 2013/0104035 A1* | 4/2013 | Wagner | G06F 16/29 715/240 |
| 2013/0111555 A1* | 5/2013 | Leneel | G06F 21/44 726/4 |
| 2013/0171986 A1* | 7/2013 | Shimizu | H04W 76/19 455/423 |
| 2013/0217332 A1* | 8/2013 | Altman | G06Q 20/3224 455/3.01 |
| 2013/0271902 A1* | 10/2013 | Lai | H05K 5/0086 361/679.01 |
| 2013/0275873 A1* | 10/2013 | Shaw | G01B 21/00 715/716 |
| 2013/0290191 A1* | 10/2013 | Dischamp | H04L 63/061 705/51 |
| 2013/0290522 A1* | 10/2013 | Behm, Jr. | H04W 4/021 709/224 |
| 2013/0343542 A1* | 12/2013 | Rosati | H04L 63/0492 380/270 |
| 2014/0111307 A1* | 4/2014 | Ingrassia, Jr. | G08B 21/24 340/8.1 |
| 2014/0213301 A1* | 7/2014 | Evans | H04W 4/029 455/456.6 |
| 2014/0222685 A1* | 8/2014 | Middleton | H04W 4/023 705/50 |
| 2014/0379584 A1* | 12/2014 | Ward | G06Q 20/3829 705/71 |
| 2015/0019124 A1* | 1/2015 | Bandyopadhyay | H04W 4/029 701/410 |
| 2015/0072618 A1* | 3/2015 | Granbery | G06Q 20/3223 455/41.2 |
| 2015/0126234 A1* | 5/2015 | Rodriguez | H04M 1/72412 455/457 |
| 2015/0189596 A1* | 7/2015 | Stephens | H04W 52/0251 455/574 |
| 2015/0222517 A1* | 8/2015 | McLaughlin | H04L 67/02 713/171 |
| 2015/0277852 A1* | 10/2015 | Burgis | G06F 16/637 700/94 |
| 2015/0289207 A1* | 10/2015 | Kubo | H04W 4/029 370/311 |
| 2015/0334569 A1* | 11/2015 | Rangarajan | H04W 12/122 726/4 |
| 2015/0350140 A1* | 12/2015 | Garcia | H04L 51/222 715/753 |
| 2015/0350167 A1* | 12/2015 | Djakovic | H04L 61/5092 713/163 |
| 2015/0350820 A1* | 12/2015 | Son | H04W 12/003 455/41.2 |
| 2015/0356030 A1* | 12/2015 | Zahand | G06F 13/20 710/17 |
| 2015/0382140 A1* | 12/2015 | Cho | G01S 5/0036 455/457 |
| 2016/0006577 A1* | 1/2016 | Logan | H04W 4/80 700/276 |
| 2016/0017402 A1* | 1/2016 | Roth | C12Q 1/25 435/34 |
| 2016/0037439 A1* | 2/2016 | Shamis | H04W 4/02 370/329 |
| 2016/0057572 A1* | 2/2016 | Bojorquez Alfaro | H04W 12/64 455/411 |
| 2016/0057625 A1* | 2/2016 | Andrada | H04L 65/1069 455/411 |
| 2016/0069991 A1* | 3/2016 | Das | G01S 5/0236 342/458 |
| 2016/0080591 A1* | 3/2016 | Asakura | H04W 4/80 358/1.15 |
| 2016/0087959 A1* | 3/2016 | Park | H04W 12/04 713/168 |
| 2016/0088143 A1* | 3/2016 | Cohn | H04M 1/72412 455/557 |
| 2016/0094947 A1* | 3/2016 | Shen | G01S 5/0278 455/456.1 |
| 2016/0140335 A1* | 5/2016 | Proulx | H04L 9/0863 726/6 |
| 2016/0142856 A1* | 5/2016 | Worrall | H04W 4/021 455/456.3 |
| 2016/0164973 A1* | 6/2016 | Kapoor | H04L 67/125 709/208 |
| 2016/0167153 A1* | 6/2016 | Denis | H04W 12/50 219/132 |
| 2016/0174023 A1* | 6/2016 | Cavallaro | H04W 64/003 455/41.2 |
| 2016/0180392 A1* | 6/2016 | Liu | G06Q 30/0269 705/14.53 |

(56) References Cited

U.S. PATENT DOCUMENTS

| | | | |
|---|---|---|---|
| 2016/0189507 A1* | 6/2016 | Rayner | A45C 13/18 |
| | | | 340/572.1 |
| 2016/0205556 A1* | 7/2016 | Borghei | H04W 12/126 |
| | | | 455/411 |
| 2016/0212538 A1* | 7/2016 | Fullam | H04S 7/70 |
| 2016/0234213 A1* | 8/2016 | Kim | H04L 63/062 |
| 2016/0242192 A1* | 8/2016 | Llosa | H04W 24/08 |
| 2016/0248564 A1* | 8/2016 | Qi | H04L 5/0048 |
| 2016/0302137 A1* | 10/2016 | Escott | H04W 12/106 |
| 2016/0330095 A1* | 11/2016 | Numakami | H04W 76/19 |
| 2016/0344712 A1* | 11/2016 | Ding | H04L 67/143 |
| 2016/0352518 A1* | 12/2016 | Ford | G06F 21/6218 |
| 2016/0357385 A1* | 12/2016 | Dan | H04W 4/02 |
| 2016/0359629 A1* | 12/2016 | Nadathur | H04L 9/14 |
| 2016/0360350 A1* | 12/2016 | Watson | H04W 4/70 |
| 2016/0371507 A1* | 12/2016 | Jakobsson | G04L 67/143 |
| 2017/0006417 A1* | 1/2017 | Canoy | H04B 7/18506 |
| 2017/0078408 A1* | 3/2017 | Lepp | H04L 67/561 |
| 2017/0126818 A1* | 5/2017 | Kang | G01S 5/0295 |
| 2017/0127340 A1* | 5/2017 | Dooley | H04W 76/14 |
| 2017/0134898 A1* | 5/2017 | Vega | H04W 12/50 |
| 2017/0171181 A1* | 6/2017 | Britt | H04W 12/03 |
| 2017/0228935 A1* | 8/2017 | Foster | G06F 3/011 |
| 2017/0272415 A1* | 9/2017 | Zhao | H04L 63/0807 |
| 2017/0325065 A1* | 11/2017 | Azam | H04L 8/20 |
| 2017/0330031 A1* | 11/2017 | Wilson | G06F 1/1694 |
| 2018/0013815 A1* | 1/2018 | Gold | H04L 63/00 |
| 2018/0025595 A1 | 1/2018 | Ingrassia et al. | |
| 2018/0035374 A1* | 2/2018 | Borden | H04W 28/0278 |
| 2018/0124558 A1* | 5/2018 | Stampfl | H04W 4/02 |
| 2018/0176748 A1* | 6/2018 | Kim | H04L 63/0861 |
| 2018/0183591 A1* | 6/2018 | De Laat et al. | H04L 67/104 |
| 2018/0183596 A1* | 6/2018 | Deshpande | H04W 12/03 |
| 2018/0184286 A1* | 6/2018 | Patterson | H04W 12/02 |
| 2018/0199138 A1* | 7/2018 | Dusan | H04R 1/1091 |
| 2018/0219872 A1* | 8/2018 | Sugashima | H04L 63/08 |
| 2018/0227284 A1* | 8/2018 | Sugano | H04L 8/20 |
| 2018/0262907 A1* | 9/2018 | Alanis | H04W 12/64 |
| 2018/0288208 A1* | 10/2018 | Lee | H04M 1/724092 |
| 2018/0288599 A1* | 10/2018 | Zhao | H04W 76/30 |
| 2018/0317266 A1* | 11/2018 | Britt | H04W 4/80 |
| 2018/0343561 A1 | 11/2018 | Patterson | |
| 2018/0348718 A1* | 12/2018 | Richardson | H04L 12/2829 |
| 2019/0028281 A1* | 1/2019 | Turissini | G06F 21/57 |
| 2019/0028445 A1* | 1/2019 | McLaughlin | H04L 63/0428 |
| 2019/0034920 A1* | 1/2019 | Nolan | H04L 9/50 |
| 2019/0037469 A1* | 1/2019 | Krishnan | H04W 40/20 |
| 2019/0058966 A1* | 2/2019 | Puppala | G01S 5/0205 |
| 2019/0069243 A1* | 2/2019 | Bean | G06F 1/3209 |
| 2019/0073735 A1* | 3/2019 | Conlon | G08B 13/22 |
| 2019/0082274 A1* | 3/2019 | Dickmann | H04R 25/453 |
| 2019/0116173 A1* | 4/2019 | Robison | H04W 12/06 |
| 2019/0124469 A1* | 4/2019 | Roy | G08B 21/02 |
| 2019/0191301 A1* | 6/2019 | Fang | H04L 9/30 |
| 2019/0213528 A1* | 7/2019 | Gupta | G06Q 10/10 |
| 2019/0246253 A1* | 8/2019 | Ryu | H04L 67/04 |
| 2019/0289059 A1* | 9/2019 | Vanahalli | H04L 63/061 |
| 2020/0034835 A1* | 1/2020 | Kim | G06F 21/00 |
| 2020/0107164 A1* | 4/2020 | Lopatin | H04W 12/50 |
| 2020/0145244 A1* | 5/2020 | Hollinger | H04L 12/2809 |
| 2020/0177595 A1* | 6/2020 | Rakshit | G06N 3/08 |
| 2020/0187001 A1 | 6/2020 | Ard et al. | |
| 2020/0213133 A1* | 7/2020 | Schaap | H04L 9/0643 |
| 2020/0226908 A1* | 7/2020 | Doxey | H04W 4/02 |
| 2020/0242662 A1* | 7/2020 | Middleton | H04W 12/04 |
| 2020/0344549 A1* | 10/2020 | Wegener | H04R 3/12 |
| 2021/0044957 A1* | 2/2021 | Norp | H04W 8/18 |
| 2021/0136846 A1* | 5/2021 | Ponnusamy | H04W 4/023 |
| 2021/0203747 A1* | 7/2021 | Gorsica, IV | H04L 67/143 |
| 2021/0204115 A1* | 7/2021 | Gorsica, IV | H04W 4/70 |
| 2021/0250355 A1* | 8/2021 | Galdo | G06F 21/335 |
| 2021/0256833 A1* | 8/2021 | Daoura | H04W 4/021 |
| 2021/0334851 A1* | 10/2021 | Proctor, Jr. | G06F 21/60 |
| 2021/0336775 A1* | 10/2021 | Gu | G06Q 10/08 |
| 2021/0400045 A1* | 12/2021 | Kondeti | H04W 12/084 |
| 2022/0021684 A1* | 1/2022 | Mensah | H04L 63/105 |
| 2022/0052847 A1* | 2/2022 | Gonzalez Cervantes | |
| | | | G06F 21/6245 |
| 2022/0070667 A1* | 3/2022 | Victa | H04W 12/03 |
| 2022/0078029 A1* | 3/2022 | Galdo | H04L 9/3265 |
| 2022/0165139 A1* | 5/2022 | Ingrassia, Jr. | G08B 21/24 |
| 2022/0200789 A1* | 6/2022 | Lalande | H04W 12/63 |
| 2022/0201428 A1* | 6/2022 | Ertan | G06T 7/70 |
| 2022/0224300 A1* | 7/2022 | Knode | H03G 3/3005 |
| 2022/0256633 A1* | 8/2022 | Gu | H04W 76/15 |
| 2022/0327196 A1* | 10/2022 | Trapani | H04L 63/105 |
| 2022/0369022 A1* | 11/2022 | Jorgovanovic | H04R 1/1016 |
| 2022/0386076 A1* | 12/2022 | Lopatin | H04W 12/104 |
| 2022/0394431 A1 | 12/2022 | Lopatin et al. | |
| 2022/0394660 A1* | 12/2022 | Werner | G06F 21/88 |

FOREIGN PATENT DOCUMENTS

| | | |
|---|---|---|
| CN | 104833945 A | 8/2015 |
| CN | 106412816 A | 2/2017 |
| CN | 106792501 A | 5/2017 |
| CN | 107328424 | 11/2017 |
| CN | 108223229 A | 6/2018 |
| CN | 108520552 | 9/2018 |
| CN | 108604129 A | 9/2018 |
| CN | 109596118 | 4/2019 |
| CN | 111436040 | 7/2020 |
| CN | 112068512 | 12/2020 |
| CN | 114071357 | 2/2022 |
| EP | 1296155 | 3/2003 |
| EP | 2020784 | 2/2009 |
| GB | 2472192 A | 2/2011 |
| JP | H11262065 | 9/1999 |
| JP | 2007150904 | 6/2007 |
| JP | 2018056773 | 4/2018 |
| JP | 2018124258 | 8/2018 |
| JP | 2018191522 | 12/2018 |
| JP | 2021025798 | 2/2021 |
| KR | 20140044916 | 4/2014 |
| KR | 20170013833 | 2/2017 |
| KR | 20180086118 A | 7/2018 |
| KR | 2019-0141998 A | 12/2019 |
| WO | 2010126846 A1 | 11/2010 |
| WO | 2012030733 | 3/2012 |
| WO | 2013036488 | 3/2013 |
| WO | 2013163334 | 10/2013 |
| WO | 2014005004 A1 | 3/2014 |
| WO | 2014042507 A1 | 3/2014 |
| WO | 2014160372 A1 | 10/2014 |
| WO | 2016019064 A1 | 2/2016 |
| WO | 2016032610 | 3/2016 |
| WO | 2016036453 A1 | 3/2016 |
| WO | 2017107077 | 6/2017 |
| WO | 2018001518 A1 | 1/2018 |
| WO | 2018118026 A1 | 6/2018 |
| WO | 2018135919 | 7/2018 |
| WO | 2018156555 A1 | 8/2018 |
| WO | 2018160863 A1 | 9/2018 |
| WO | 2019232420 A2 | 12/2019 |
| WO | 2020214701 A1 | 10/2020 |
| WO | 2020214708 A1 | 10/2020 |
| WO | 2020214709 A1 | 10/2020 |
| WO | 2020214711 A1 | 10/2020 |
| WO | 2022046527 | 3/2022 |
| WO | 2022256438 | 12/2022 |

OTHER PUBLICATIONS

EP22172663.1, "Extended European Search Report" mailed Jan. 25, 2023, 18 pages.

Lopez, Mareo, "The Importance of a Speaker's Resonant Frequency", proaudioland.com, 3 pages, Aug. 2015 (Year: 2015).

Thetileapp.com [online], "Learn How Tile's Tracking Device Helps You Find Your Lost Things, " Dec. 9, 2016, retrieved from URL <https://www.thetileapp.com/how-it-works>, 9 pages.

PCT/US2023/017975, "PCT Notification of Transmittal of the International Search Report and the Written Opinion of the International

(56) References Cited

OTHER PUBLICATIONS

Searching Authority, or the Declaration", mailed Jun. 29, 2023, 12 pages.
PCT/US2021/046786, "PCT Notification of Transmittal of the International Search Report and the Written Opinion of the International Searching Authority, or the Declaration", Mailed Dec. 13, 2021, 14 pages.
PCT/US2019/048899, "Notification of Transmittal of the International Search Report and the Written Opinion of the International Searching Authority, or The Declaration" mailed Dec. 2, 2019, 5 pgs.
PCT/US2020/028318, "PCT Notification of Transmittal of the International Search Report and the Written Opinion of the International Searching Authority, or the Declaration", Mailed Jul. 8, 2020, 16 pages.
PCT/US2020/028326, "PCT Notification of Transmittal of the International Search Report and the Written Opinion of the International Searching Authority, or the Declaration", Mailed Jul. 3, 2020, 12 pages.
PCT/US2020/028327, "PCT Notification of Transmittal of the International Search Report and the Written Opinion of the International Searching Authority, or the Declaration", Mailed Sep. 14, 2020, 17 pages.
PCT/US2020/028329, "PCT Notification of Transmittal of the International Search Report and the Written Opinion of the International Searching Authority, or the Declaration", Mailed Jul. 15, 2020, 13 pages.
A. Korolova et al., "Cross-App Tracking Via Nearby Bluetooth Low Energy Devices", A presentation proposal for PrivacyCon 2017, Published Mar. 13, 2018, 12 pgs.
Mannan, Mohammad, et al. "Mercury: Recovering forgotten passwords using personal devices." International Conference on Financial Cryptography and Data Security. Springer, Berlin, Heidelberg, 2011 (Year: 2011).
PCT/US2023/031897, "PCT Notification of Transmittal of the International Search Report and the Written Opinion of the International Searching Authority or the Declaration", mailed Dec. 12, 2023, 19 pages.
FOFA, "Find One, Find All Key Finder & Remote Control Locators", received from The Wayback Machine—https://web.archive.org/web/20200715080402/http://www.findonefindall.com:80/index.htm, 3 pages. Jul. 15, 2020.
Kim et al., "In/Out Status Monitoring in Mobile Asset Tracking with Wireless Sensor Networks", received from www.mdpi.com/journal/sensors, published Mar. 26, 2010, 22 pages.
Fuemmeler et al., "Energy Efficient Multi-Object Tracking in Sensor Networks", received from https://ieeexplore.ieee.org/document/5439914, published Mar. 29, 2010, 9 pages.
Cocchi et al., "Subband Neural Networks Prediction for On-Line Audio Signal Recovery", received from https://eeexplore.ieee.org/document/1021887, Published Jul. 2002, 10 pages.
European Patent Application No. EP20724624.0 , "Intention to Grant", Nov. 5, 2024, 9 pages.
U.S. Appl. No. 16/848,453, "Ex Parte Quayle Action", Jun. 8, 2021, 9 pages.
U.S. Appl. No. 17/603,580, Non-Final Office Action, Mailed On Dec. 5, 2023, 12 pages.
U.S. Appl. No. 17/603,580, Notice of Allowance, Mailed On Apr. 23, 2024, 8 pages.
U.S. Appl. No. 17/603,580, Notice of Allowance, Mailed On Aug. 12, 2024, 9 pages.
U.S. Appl. No. 17/603,580, Notice of Allowance, Mailed On Nov. 26, 2024, 9 pages.
U.S. Appl. No. 17/603,892, Final Office Action, Mailed On Mar. 28, 2025, 29 pages.
U.S. Appl. No. 17/603,892, Non-Final Office Action, Mailed On Sep. 4, 2024, 21 pages.
U.S. Appl. No. 17/603,923, Non-Final Office Action, Mailed On Mar. 4, 2024, 17 pages.
U.S. Appl. No. 17/603,923, Non-Final Office Action, Mailed On Sep. 14, 2023, 7 pages.
U.S. Appl. No. 17/603,923, Notice of Allowance, Mailed On Feb. 6, 2025, 7 pages.
U.S. Appl. No. 17/603,923, Notice of Allowance, Mailed On Oct. 15, 2024, 7 pages.
Chinese Patent Application No. CN202080028758.X, Office Action, Mailed On Nov. 16, 2024, 5 pages (English Translation).
Chinese Patent Application No. CN202080028758.X, Office Action, Mailed On Jan. 13, 2024, 15 pages (9 pages of English translation and 6 pages of official language copy).
Chinese Patent Application No. CN202080028758.X, Office Action, Mailed On Aug. 31, 2024, 17 pages (10 pages of English translation and 7 pages of official language copy).
Chinese Patent Application No. CN202080028897.2, Notice of Decision to Grant, Mailed On Apr. 3, 2025, 4 pages (2 pages of English translation and 2 pages of official language copy).
Chinese Patent Application No. CN202080028897.2, Office Action, Mailed On Nov. 15, 2024, 3 pages (English translation).
Chinese Patent Application No. CN202080028897.2, Office Action, Mailed On Feb. 20, 2024, 10 pages (6 pages of English translation and 4 pages of official language copy).
Chinese Patent Application No. CN202080028953.2, Office Action, Mailed On Feb. 9, 2024, 9 pages (English translation).
Chinese Patent Application No. CN202080028953.2, Office Action, Mailed On Dec. 13, 2024, 20 pages (11 pages of English translation and 9 pages of official language copy).
European Patent Application No. EP20724311.4, "Intention to Grant", Feb. 27, 2024, 10 pages.
European Patent Application No. EP20724311.4, Office Action, Mailed On Feb. 16, 2023, 8 pages.
European Patent Application No. EP20724625.7, Office Action, Mailed On Nov. 14, 2023, 6 pages.
European Patent Application No. EP20724978.0, Office Action, Mailed On Jan. 11, 2024, 5 pages.
European Patent Application No. EP20724978.0, Office Action, Mailed On Mar. 13, 2023, 7 pages.
European Patent Application No. EP23196053.5, Extended European Search Report, Mailed On Sep. 26, 2023, 7 pages.
European Patent Application No. EP23196053.5, Office Action, Mailed On Jan. 15, 2025, 6 pages.
European Patent Application No. EP24186298.6, Extended European Search Report, Mailed On Jul. 23, 2024, 9 pages.
Indian Patent Application No. IN202318008855, "First Examination Report", Mar. 19, 2025, 6 pages.
International Application No. PCT/US2020/028326, International Preliminary Report on Patentability, Mailed On Oct. 28, 2021, 9 pages.
International Application No. PCT/US2020/028327, International Preliminary Report on Patentability, Mailed On Oct. 28, 2021, 12 pages.
International Application No. PCT/US2020/028327, "Invitation to Pay Additional Fees and, Where Applicable, Protest Fee", Jul. 15, 2020, 11 pages.
International Application No. PCT/US2020/028329, International Preliminary Report on Patentability, Mailed On Oct. 28, 2021, 10 pages.
Chinese Patent Application No. CN202080028953.2, Office Action, Mailed On May 6, 2025, 14 pages (8 pages of English translation and 6 pages of official language copy).
European Patent Application No. EP20724978.0, "Intention to Grant", Apr. 28, 2025, 10 pages.
European Patent Application No. EP25160790.9, "Partial European Search Report", May 15, 2025, 6 pages.
European Patent Application No. EP25160790.9, Extended European Search Report, Mailed On Aug. 5, 2025, 18 pages.

* cited by examiner

SHARING KEYS FOR A WIRELESS ACCESSORY

CROSS-REFERENCE

This patent application is a U.S. National Phase Application under 35 U.S.C. § 371 of International Application No. PCT/US2020/028318, filed Apr. 15, 2020, entitled "Sharing Keys for a Wireless Accessory," which claims to priority to U.S. Provisional Application Ser. No. 62/835,494, filed on Apr. 17, 2019 and U.S. Provisional Application Ser. No. 62/856,020, filed on Jun. 1, 2019, each of which are hereby incorporated herein by reference.

FIELD

Embodiments described herein relate generally to a system and method of locating wireless devices and accessories. More specifically, embodiments relate to an infrastructure to enable the sharing of keys to access or control a wireless accessory. BACKGROUND OF THE DESCRIPTION Current security features in handheld and portable products allow the location of the product to be identified when requested by the user, such as in instances where the product is lost or stolen. If the wireless device includes positioning technology, the device can be configured to report its last location to the server computer, which is displayed by the service on a map presented to the user. Often wireless devices are used with wireless accessory devices that cannot determine their location and cannot communicate with a remote tracking services over a wide area network. These accessory devices can include, for example, wireless earbuds, headphones, headsets and other wearable devices (e.g., smartwatches, fitness bands, optical head-mounted displays) that communicate directly with the wireless device using peer-to-peer communications. For wireless accessory devices that cannot determine their location and cannot communicate with the remote tracking service, those devices cannot be tracked by the service when lost or stolen.

SUMMARY OF THE DESCRIPTION

Embodiments described herein provide for a non-transitory machine-readable medium storing instructions to cause one or more processor to perform operations comprising determining, for a wireless accessory, a share recipient and a set of capabilities to delegate to the share recipient; creating a storage record including fields to store an identifier of the share recipient, an identifier of the wireless accessory, and a set of capabilities to be shared with the share recipient; sending a share request to a share recipient device; in response to receipt of an accept message from the share recipient device, marking the cloud storage record as accepted; and sending a set of cryptographic keys to the share recipient device to enable the share recipient device to perform the set of capabilities on the wireless accessory.

One embodiment provides for a data processing system on an electronic device, the data processing system comprising memory to store instructions and one or more processors to execute the instructions. The instructions cause the one or more processors to determine, for a wireless accessory, a share recipient and a set of capabilities to delegate to the share recipient, create a storage record including fields to store an identifier of the share recipient, an identifier of the wireless accessory, and a set of capabilities to be shared with the share recipient, and send a share request to a share recipient device that is associated with the share recipient. In response to receipt of an accept message from the share recipient device, the one or more processors can mark the storage record as accepted send a set of cryptographic keys to the share recipient device to enable the share recipient device to perform the set of capabilities on the wireless accessory.

One embodiment provides for an electronic device comprising a wireless processor coupled with a wireless radio, memory to store instructions, and one or more processors to execute the instructions. The instructions cause the one or more processors to determine, for a wireless accessory, a share recipient and a set of capabilities to delegate to the share recipient, create a storage record including fields to store an identifier of the share recipient, an identifier of the wireless accessory, and a set of capabilities to be shared with the share recipient, and send, via the wireless processor, a share request to a share recipient device that is associated with the share recipient. In response to receipt of an accept message from the share recipient device, the one or more processors can mark the storage record as accepted and send a set of cryptographic keys to the share recipient device to enable the share recipient device to perform the set of capabilities on the wireless accessory.

One embodiment provides for a method comprising, on an electronic device associated with a share recipient, receiving a request to accept a share a capability associated with a wireless accessory, the request including a storage record, where the storage record includes fields to store an identifier of the share recipient, an identifier of the wireless accessory, and a set of capabilities to be shared with the share recipient. The method additionally comprises presenting an interface on a display of the electronic device to accept or decline the request, sending a message indicating acceptance of the request in response to receipt an input via the interface, updating the storage record to indicate acceptance of the request, and receiving a set of cryptographic keys to enable the electronic device to perform an operation associated with the wireless accessory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments described herein provide techniques to enable secure crowdsourced locator services for lost or misplaced devices that cannot communicate with a wide area network. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

Figure 1:
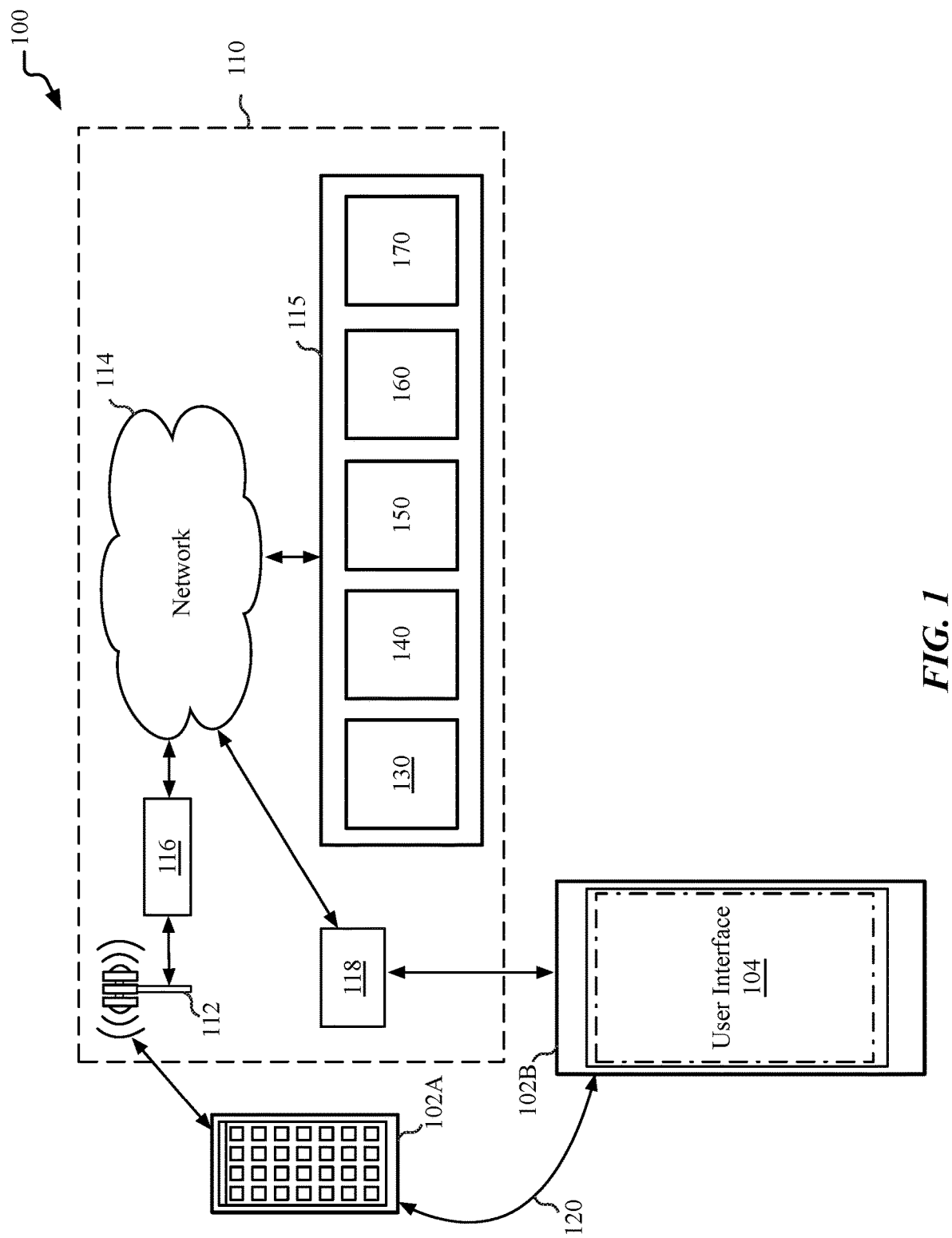
FIG. 1 is a block diagram of a network operating environment for mobile devices, according to an embodiment.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with a service provider 115 that provides or enables one or more services. Exemplary services include a telephony service 130, a messaging service 140, a media service 150, a storage service 160, and a device locator service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device locator service 170 can enable a user to locate a lost or misplaced device that was, at least at some point, connected to the one or more wired and/or wireless networks 110. For example, mobile device 102A can perform a location query for mobile device 102B. The device locator service 170 can also enable location queries for devices that do not have a network connection via the use of a network of finder devices, as shown below in FIG. 2-3. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102A-102B.

Figure 2:
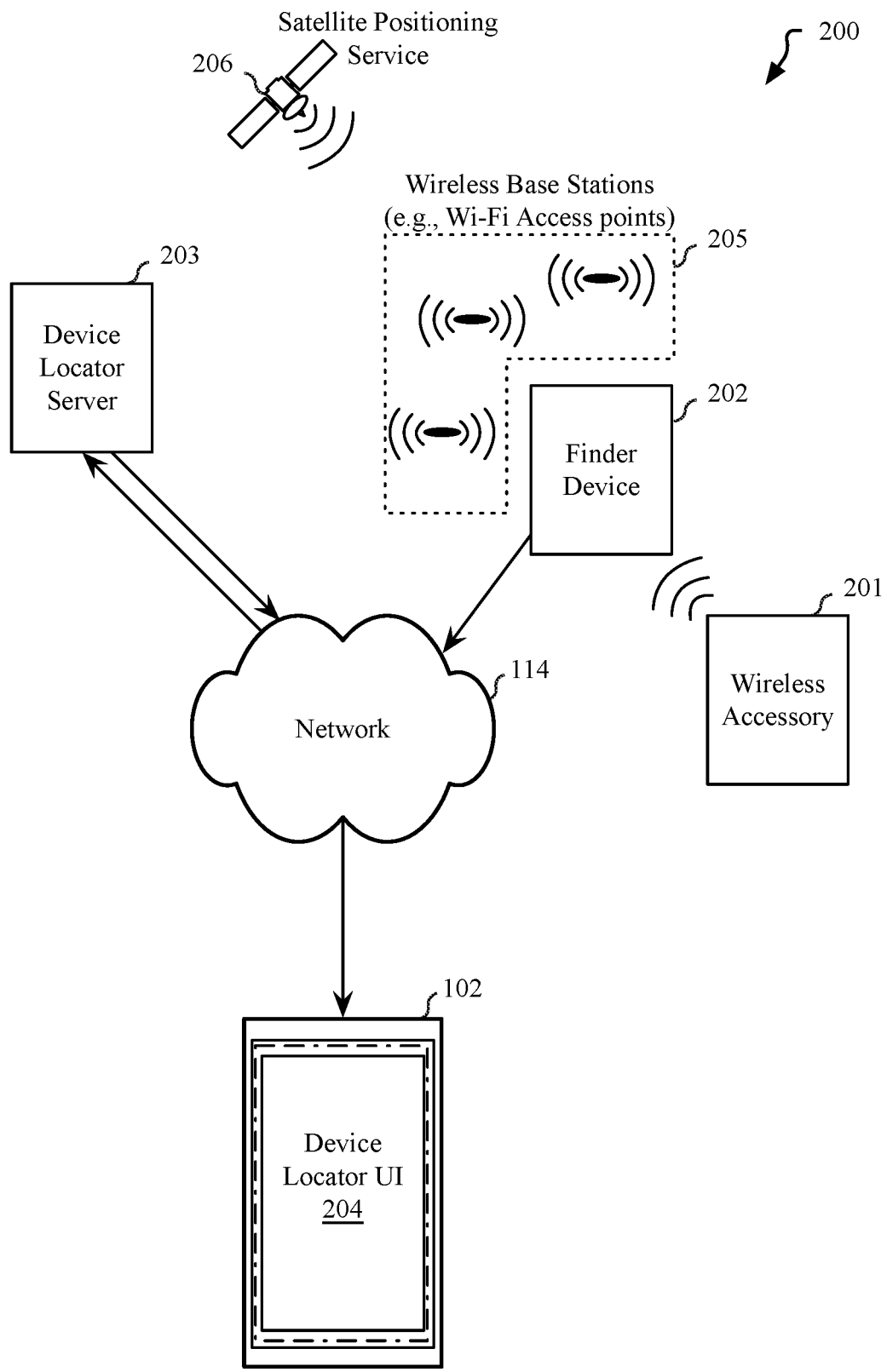
FIG. 2 illustrates a system to locate a wireless accessory that lacks access to a wide area network, according to an embodiment.

FIG. 2 illustrates a system 200 to locate a wireless accessory 201 that lacks access to a wide area network, according to an embodiment. The system 200 can also be used to locate a device that is unable to access a WAN or LAN, and thus cannot transmit the device location. In one embodiment, the wireless accessory 201 includes one or more wireless transceivers and can communicate, either directly or indirectly (e.g., through another device or computer) with a companion device (e.g., mobile device 102) over a wireless network or peer-to-peer communication link. Some examples of wireless accessory devices include but are not limited to wireless earbuds, headphones, headsets and other wearable devices (e.g., smartwatches, fitness bands, optical head-mounted displays). The wireless accessory 201 can also include other wireless devices such as game controllers or remote controls. The wireless accessory 201, in one embodiment, also includes smartphones, tablet computers, laptop computers, smart speaker devices, televisions, or television set top boxes that at least temporarily are unable to access a wide area network, such as the Internet (e.g., wide area network 114 as in FIG. 1). The wireless accessory can also be any other wireless device, including beacons or locator tags that can be attached to other devices or items to enable the tracking or locating of those devices or items. In one embodiment, the wireless accessory 201 can be paired with the mobile device 102 using a wireless technology standard, such as but not limited to Bluetooth. The wireless accessory 201 can also communicate with the mobile device 102 over wireless technologies such as Wi-Fi direct, Zigbee, or similar technologies. While the companion device to which the wireless accessory 201 is paired is generally referred to as a mobile device 102, companion devices are not limited to mobile devices. Companion devices, in some embodiments, can also include laptop or desktop devices and can additionally include some wearable accessories, such as but not limited to a smart watch device or a wearable display.

In one embodiment, the wireless accessory 201 can periodically transmit a wireless beacon signal. The wireless accessory 201 can transmit the beacon signal using one of a variety of wireless technologies described herein (e.g., Bluetooth, Wi-Fi, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the wireless accessory 201. In one embodiment, the beacon identifier is a public encryption key associated with the device.

The beacon signal can also convey information about the wireless accessory 201, such as a beacon type, device classification, battery level. In one embodiment the beacon signal can also convey device status, such as a lost status, alarm status, or a near owner status. The beacon signal can also include information that specifies battery life, charging status, and/or other status information. The lost status can indicate that the wireless accessory 201 has determined itself to be lost or has been placed into a lost state by the owner of the device. The alarm status can indicate that the wireless accessory 201 was placed in a state that the device should trigger an alarm if moved from a current location. The near owner status can indicate that the wireless accessory 201 has detected the nearby presence of the mobile device 102 associated with the owner of the accessory.

The beacon signal can be detected by a finder device 202, which is locally proximate to the wireless accessory 201. The finder device 202 can be a similar device as the mobile device 102 and can receive and transmitting data over a wide area network 114 and receiving and transmitting using similar wireless technologies as the wireless accessory 201 (e.g., Bluetooth, etc.). Particularly, the finder device 202 can receive data using the wireless protocol over which the beacon signal is transmitted. The finder device 202 can determine a location using one or more location and/or positioning services including, but not limited to a satellite positioning service 206 or a terrestrial positioning system using RF signals received from wireless base stations 205 such as Wi-Fi access points or cell tower transmitters of a cellular telephone network. In an embodiment, the finder device 202 periodically stores its location as determined based on the one or more location and/or positioning services. The stored location can be associated with a timestamp for which the location was determined. When the finder device 202 receives a beacon signal from the wireless accessory 201, the finder device 202 can transmit a location for the finder device over the wide area network 114 to a device locator server 203. The timestamp for a determined location for the finder device 202 can be correlated with a timestamp for which a beacon signal was received to associate a geographic location with a received beacon signal. In one embodiment, the wireless accessory 201 includes location determination capability via an integrated satellite positioning service (e.g., GPS) receiver. If the wireless accessory lacks access to a network to send a location to the device locator server 203, the wireless accessory can encode encrypted location data within the beacon signal 301. Finder device 202 can then relay the encrypted location data to the device locator server 203.

Where the wireless accessory 201 provides a public key within the beacon signal, the finder device 202 can encrypt the determined location data and transmit the encrypted location data to the device locator server 203 over the wide area network 114. In one embodiment, additional data can either be encrypted and transmitted along with the location data or transmitted unencrypted to the device locator server 203. For example, a received signal strength indicator (RSSI) for the beacon signal can be transmitted along with the location data. The RSSI data can then be used to determine the distance of the wireless accessory 201 from the finder device 202 and assist in triangulation on the owner device. Where the RSSI data is transmitted in an unencrypted state, in one embodiment the server can use RSSI information to reduce noise by discarding very weak signals if other, stronger signals are present. In one embodiment, UWB ranging data can also be provided, where such data is available.

In one embodiment, the finder device 202 can behave differently upon receiving a beacon signal from a wireless accessory 201 depending upon a device status conveyed by the wireless accessory 201. For standard beacon signals, the finder device 202 can place encrypted location data into a queue and transmit the location data to the device locator server 203 during a periodic transmission window. However, if the wireless accessory 201 is indicating an alarm state, the finder device 202 can transmit the location data to the device locator server 203 immediately. Additionally, the finder device 202 may not transmit the location data to the device locator server 203 if the beacon signal of the wireless accessory 201 indicates that the accessory is near the owner of the accessory. Alternatively, the finder device 202 may delay transmission of encrypted location data.

If the owner of the wireless accessory 201 wishes to locate the wireless accessory, the owner can access a device locator user interface (e.g., device locator UI 204) on the mobile device 102. The device locator UI 204 can be associated with a device locator application that is used to locate electronic devices and accessories that are registered with an online account of the user, such as a cloud services account or another type of online account. The device owner, using the device locator UI 204, can query the device locator server 203 for location data that may have been transmitted to the device locator server by a finder device 202 of the wireless accessory 201. In one embodiment, the mobile device 102 can transmit the public encryption key associated with the wireless accessory 201 to the device locator server 203. The device locator server 203 can then return any stored location data that corresponds with the public encryption key. The location data returned to the mobile device 102 can be encrypted data that is encrypted by the finder device 202 using the public encryption key. The mobile device 102 can use an associated private key to decrypt the encrypted location data. The decrypted location data can then be processed by the mobile device 102 to determine a most probable location for the wireless accessory 201. In various embodiments, the most probable location for the wireless accessory 201 can be determined by triangulation from multiple received locations and using other data, such as a beacon signal RSSI associated with each location and timestamp or UWB ranging data included within the location data.

Figure 3:
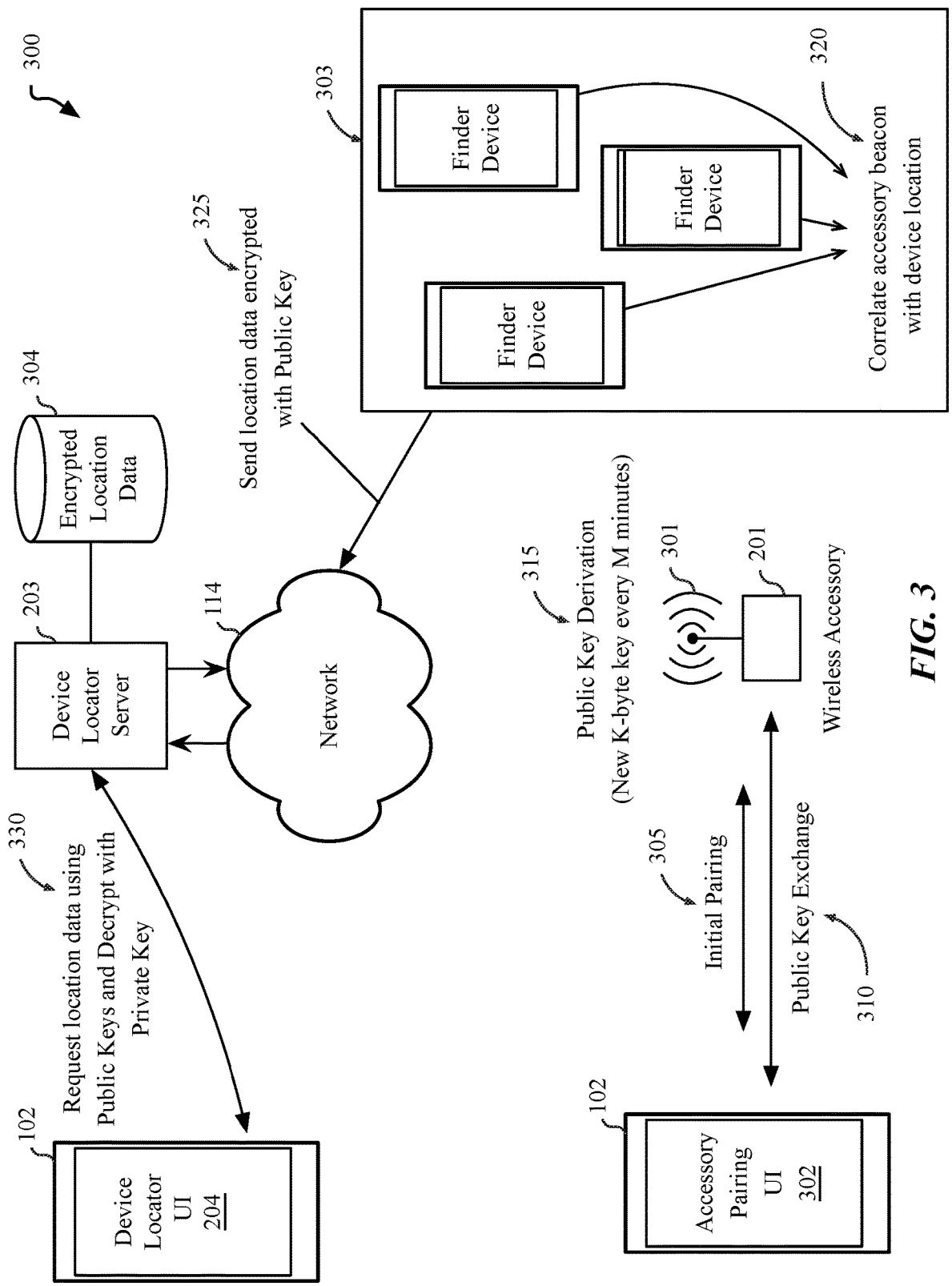
FIG. 3 illustrates a system for pairing and locating a wireless accessory, according to embodiments described herein.

FIG. 3 illustrates a system 300 for pairing and locating a wireless accessory, according to embodiments described herein. In one embodiment a mobile device 102 of a user of the wireless accessory 201 can present an accessory pairing UI 302 by which the user can pair the mobile device 102 with the wireless accessory 201. During an initial pairing (305) between the mobile device 102 and the wireless accessory, a public key exchange (310) can be performed between the mobile device and the wireless accessory. In one embodiment, during the public key exchange (310) the mobile device 102 and the wireless accessory 201 exchange public keys of public key pairs generated by the device and the accessory. In one embodiment the public key exchange (310) is a one-way transfer, in which the mobile device 102 transmits a public key of a public/private key pair to the wireless accessory 201. Alternatively, or additionally, the public key exchange (310) may be a Diffie-Hellman key exchange in which the device and the accessory establish a shared secret between two parties. In one embodiment, the public key exchange (310) additionally uses elliptic curve cryptography to establish the shared secret. For example, Elliptic-curve Diffie-Hellman (ECDH) can be used to enable the establishment of a public key pair and one or more shared secrets. In one embodiment, the one or more shared secrets include an anti-tracking secret, which can be used by the wireless accessory 201 to periodically derive additional public keys. In one embodiment, instead of using public key cryptography with a broadcasted public key, the wireless accessory can advertise a temporary identity and subsequently use identity-based encryption. With identity-based encryption, the public key is, or is derived from, some unique element of information about the identity of the user, such as an e-mail address. The entity that is to decrypt the encrypted information can obtain the decryption key from a trusted central authority.

After the wireless accessory 201 has been paired with the mobile device 102, the wireless accessory 201 can periodically broadcast a beacon signal 301 that includes device status information and a beacon identifier. In one embodiment the beacon identifier is a public key derived from a shared secret that is established during the public key exchange (310). Additionally, the wireless accessory 201 can periodically perform a public key derivation (315) to generate a new public key and begin broadcasting the new public key as the beacon identifier. The public key is a K-byte key, with a new K-byte key generated or rotated into use every M minutes. The value K and M can vary between embodiments. In one embodiment, a K value of 28 bytes is used. In one embodiment, a K value of 27 bytes is used. The value K can be determined at least in part based on the beacon length associated with the wireless protocol used to transmit the beacon signal 301. In one embodiment, the beacon signal can transmit a variant of beacon advertisement packet associated with a low-energy radio protocol, such as Bluetooth Low Energy.

The value M, in one embodiment, is 15 minutes, such that a new K-byte key is generated every 15 minutes. The public key can be derived deterministically based on a timestamp and an anti-tracking secret generated during the public key exchange 310. The public key derivation (315) process enables the wireless accessory 201 to use different keys over time, preventing the long-term association with a specific key with a specific device. The key can be derived based on an anti-tracking secret known only to the mobile device 102 and the wireless accessory 201, allowing the mobile device 102, and only the mobile device, to determine which public key will be broadcast by the wireless accessory 201 at any given timestamp. The anti-tracking secret can be generated along with an ECDH public key and transferred to the wireless accessory 201. The anti-tracking secret can then be used to enable the wireless accessory 201 to generate a sequence of public keys $P_i$. In one embodiment, the sequence of public keys $P_i=\lambda_i \cdot P$, which defines a group operation between a scalar or exponent value $\lambda_i$ and group elements, such as, for example, Elliptic Curve points P. The scalar or exponent value $\lambda=KDF(AT,i)$, where KDF is a key derivation function, AT is the anti-tracking secret, and i is a counter or timestamp.

In one embodiment, backtracking resistance can be enabled to protect the anti-tracking secret in the event the wireless accessory 201 is compromised. When backtracking resistance is enabled, the anti-tracking secret is transferred to the wireless accessory 201 but is not retained by the wireless accessory. Instead, the accessory computes a value $\lambda_{i+1}=H(\lambda_i||time)$, with $\lambda_0=AT$ and H being a cryptographic hash function. The wireless accessory 201 then stores $\lambda_i$ for a given time period i. If the wireless accessory 201 is compromised, only $\lambda_i$ for current and future values of i is exposed, without exposing the anti-tracking secret AT. In one embodiment, backtracking resistance is performed by periodically writing $\lambda_i$ to non-volatile memory of the wireless accessory 201. This approach is one of several that may be used. In various embodiments, other key security techniques may also be used. For example, a key generation and diversification technique as described below with respect to FIG. 15-16 may be used in one embodiment.

In one embodiment the wireless accessory 201 can transmit the beacon signal 301 every two seconds, although other beacon rates can be used, and the beacon rate can vary under certain circumstances. For example, the wireless accessory 201 can decrease a beacon rate when in a near owner state. Beacon rate can also vary based on accelerometer triggered events. For example, the wireless accessory 201 can increase the beacon rate when in an alarm state, which can be triggered by the accelerometer on the wireless accessory 201.

The wireless accessory 201 can enter the near owner state if, after transmitting the beacon signal 301, the wireless accessory 201 receives a reply from the mobile device 102 associated with the user of the accessory, which indicates that the mobile device 102 is within range of the wireless accessory. Additionally, while the wireless accessory is in the near owner state, the amount of data transmitted by the beacon signal 301 may be reduced. In one embodiment, the advertisement rate of the wireless accessory 201 may be reduced while wireless accessory is in the near owner state.

The wireless accessory 201 can enter an alarm state upon receiving a message from the mobile device 102 that indicates that the wireless accessory 201 should enter the alarm state. When in the alarm state, the wireless accessory can initially enter an armed state in which the wireless accessory 201 can reduce or cease the transmission of locator beacon signals, although other types of wireless signaling can persist. The wireless accessory 201 can remain in the armed state until the state is deactivated by the mobile device 102 or alarm is triggered. The alarm can be triggered, in one embodiment, upon detection of movement, for example, via an accelerometer within the wireless accessory 201. The alarm can also be triggered, in one embodiment, upon detection that the wireless accessory has moved out of range of the mobile device and is no longer in the near owner state. When the alarm is triggered, the rate at which the beacon signal 301 can be increased, to increase the speed by which the wireless accessory 201 can be located.

The beacon signal 301 transmitted by the wireless accessory 201 can be detected by a set of finder devices 303, which are other electronic devices that can receive the beacon signal transmitted by the wireless accessory and are transmit location and other data associated with the beacon signal 301 to the device locator server 203 via the wide area network 114. In one embodiment the set of finder devices 303 include variants of the mobile device 102 or can be other types of electronic devices. The set of finder devices 303 can include a variant of the finder device 202 of FIG. 2 and can determine similar location determination techniques. For example, the set of finder devices can perform operations (320) to correlate the beacon signal 301 received from the wireless accessory 201 with a device location associated with the finder device. As described with respect to FIG. 2, the device location can be determined via a satellite positioning service or a terrestrial positioning system that uses RF signals received from wireless base stations (e.g., Wi-Fi access points or cell tower transmitters). In one embodiment the set of finder devices 303 can also include stationary devices such as smart speaker devices, televisions, or television set top boxes that can receive the beacon signal 301.

The set of finder devices 303 can encrypt the location data with the beacon identifier (e.g., public key) received within the beacon signal 301 and send the location data (325) to the device locator server 203. The data sent by the set of finder devices 303 is sent anonymously and no identifying information for the finder devices is stored with the data sent by the finder devices.

The device locator server 203 can store encrypted location data in a data store 304, which in one embodiment can be a distributed database having multiple nodes. Hashes of the beacon identifier/public key of an accessory can be sent along with encrypted location data. The encrypted location data can be stored to a database node based on a hash of the beacon identifier. The encrypted location data can be indexed by the device locator server 203 using the hash of the beacon identifier. Sending the hash of the beacon identifier instead of the full beacon identifier prevents the storage of the full beacon identifier to the server. Other information can also be sent and stored with the location data, either in an encrypted or unencrypted state. The other information can include timestamps for when the beacon signal 301 was received, RSSI information for the received beacon, and/or ranging information determined, for example, via UWB ranging.

When the user or owner of the wireless accessory 201 wishes to locate the accessory, the user or owner can access the device locator UI 204 on the mobile device 102. The device locator UI 204 can be associated with a device locator application or feature of the mobile device 102. The device locator UI 204 may also have a web-based interface that can be accessed from the mobile device 102 or another type of electronic device, such as a laptop or desktop device. The mobile device 102, upon loading the device locator UI 204, can send a request (330) for location data to the device locator server 203. The request 330 can include a set of public key hashes, which can serve as beacon identifiers for the beacon data. The mobile device 102 can generate the set of public keys based on the secret information held by the mobile device 102 and the wireless accessory 201 and the timestamps over which the mobile device 102 wishes to receive location data. In one embodiment the set of public keys is the sequence of public keys $P_i$ that are generated based on the anti-tracking secret. The sequence of public keys $P_i$ corresponds to a matching sequence of private keys $d_i$. The mobile device 102 can generate the sequence of public keys, as well as the corresponding sequence of public keys $d_i$, where i is a counter or timestamp. In one embodiment, the mobile device 102 can generate and send hashes for the previous 24 hours of public keys within the request 330. If no data is found for 24 hours of public keys, the mobile device 102 can send hashed keys for an earlier period, back to a pre-determined location data retention limit.

The encrypted location data is stored and indexed based on a hash of the public key instead of the public key to prevent the provider of the location service data from storing data that can be used to tie the encrypted location data to a specific device, and thus a specific user or user account. The finder device sends the hash of the public key that is broadcast within the beacon signal 301 associated with an observation location. The owner of the device can query the device locator server 203 using a hash of the public key that is determined for a query period.

In some embodiments, if a location query is to be performed via the web-based interface from an electronic device, such as a laptop or desktop device, keys to enable the decryption of the location data may be required to be sent to the electronic device. In one embodiment, decryption keys for the location data may be sent to the server that provides the web-based interface to enable the server to decrypt location data, at least while the location data is being viewed through the web-based interface. Before location data is displayed via the web-based interface, a notice may be presented to inform the user that location decryption keys are being temporarily shared with the web-based interface server to enable location data to be decrypted and presented. In one embodiment, the sharing of the location decryption keys can be performed via an automatic and temporarily delegation of location query rights with a proxy account associated with the web-based interface.

In one embodiment, the wireless accessory 201 can be placed in a light lost mode. In the light lost mode, a set of future public keys can be generated for the wireless accessory and hashes of those public keys can be transmitted to the device locator server 203. The device locator server 203 can then notify the mobile device 102 if any location data is received that correspond with a key in the set of future public keys. In one embodiment, a finder device that sends a location for a wireless accessory that is in the light lost mode can be directed by the device locator server 203 to relay a message to the wireless accessory 201 that notifies the wireless accessory that it is in the light lost mode. A similar mechanism can be used to relay a message to the wireless accessory 201 that places the accessory in an explicit lost mode. The explicit lost mode can be enabled by the user via the device locator UI 204. In the explicit lost mode, the wireless accessory 201 cannot be paired with another device unless unlocked by the owner.

Figure 4A:
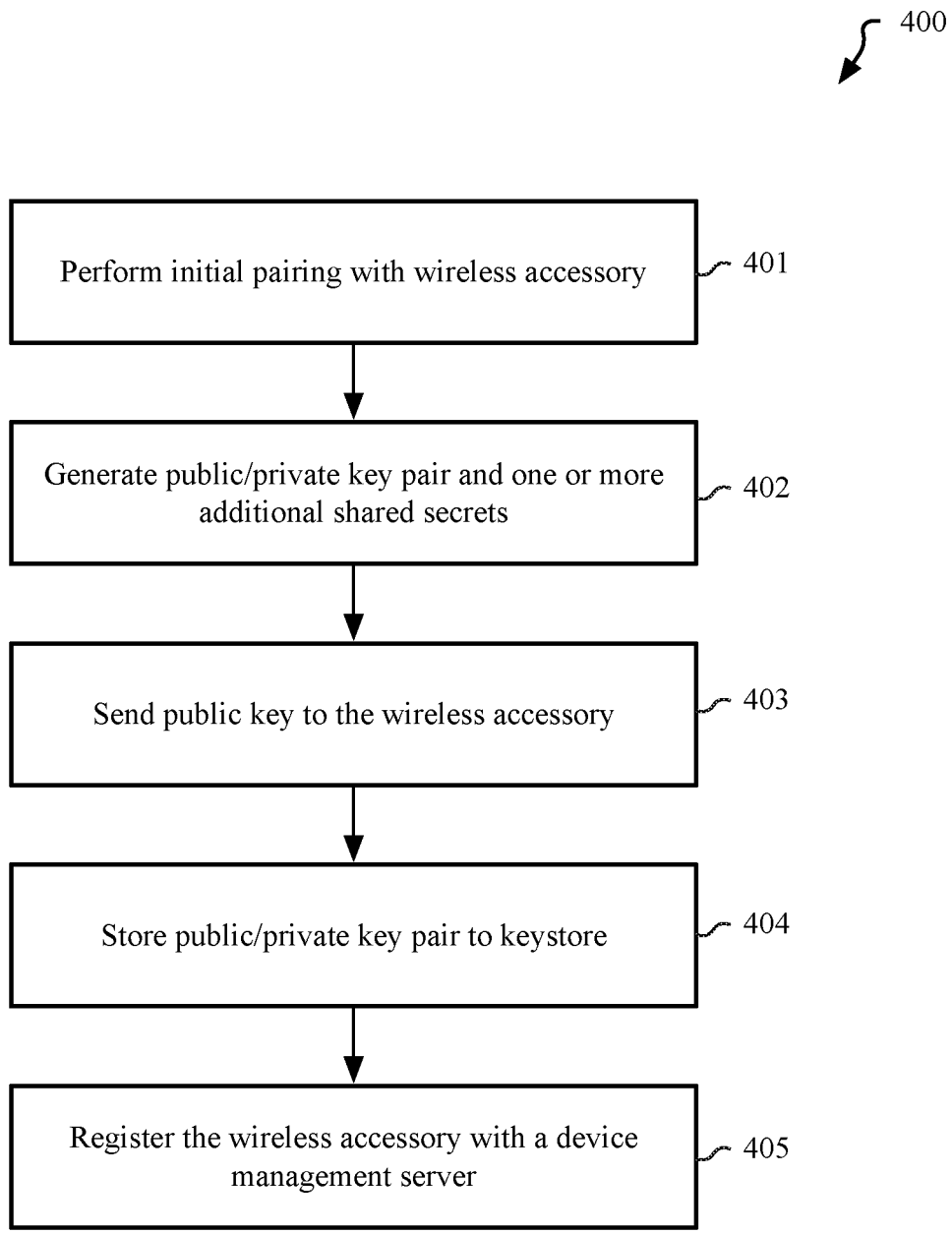
FIG. 4A-4C are flow diagrams illustrating methods for use with the device locator systems described herein.
Figure 4B:
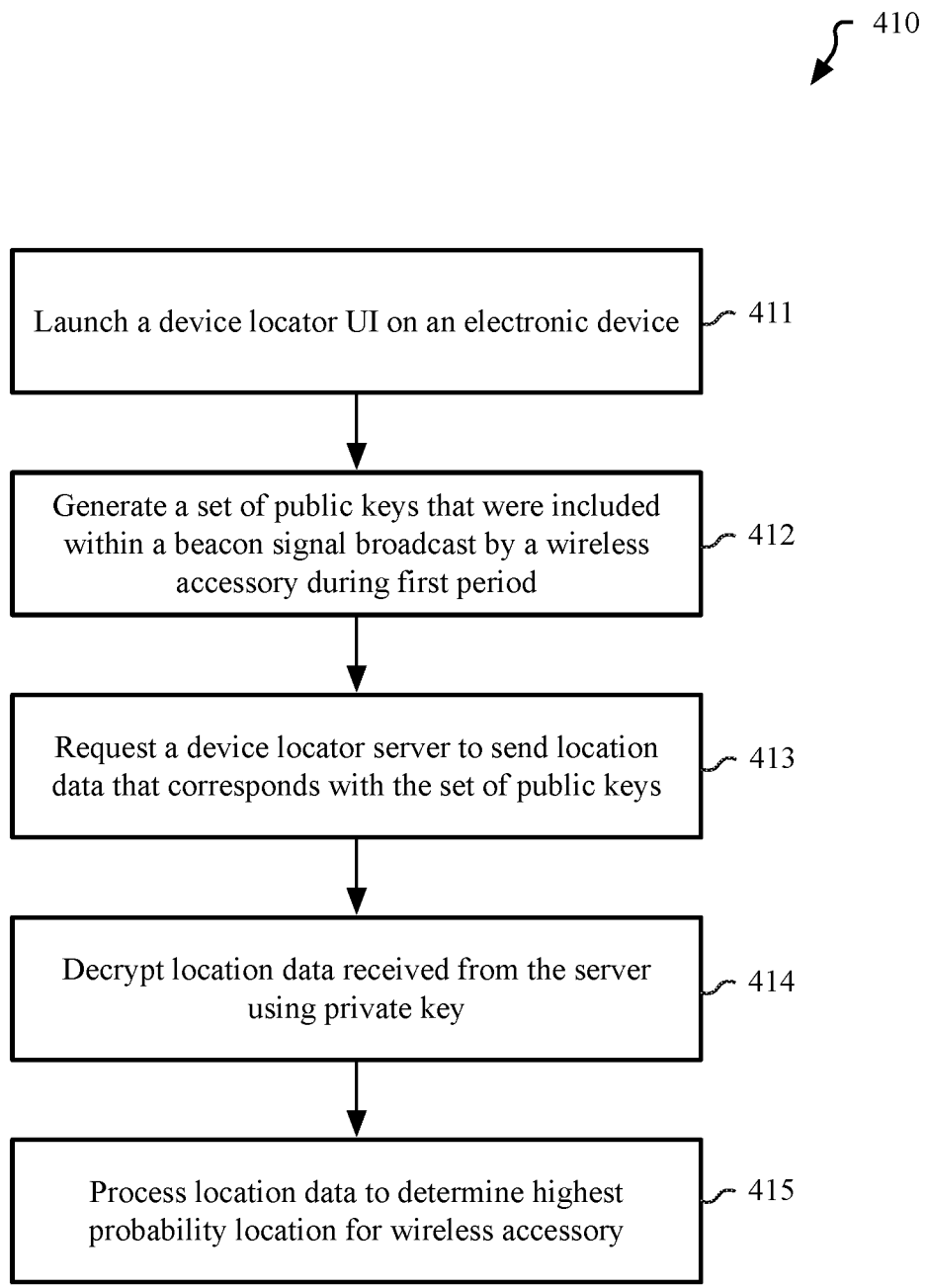
Figure 4C:
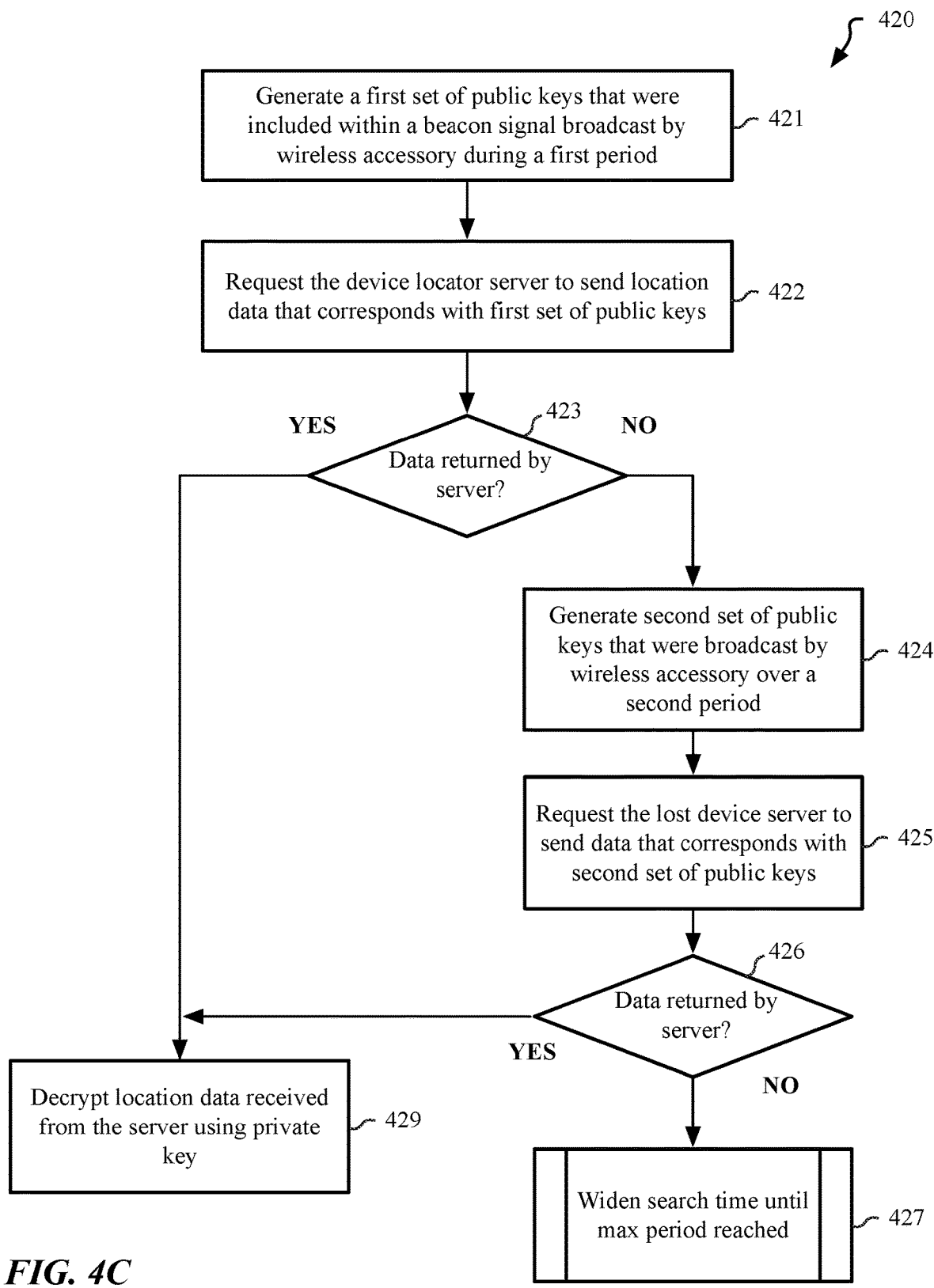

FIG. 4A-4C are flow diagrams illustrating methods for use with the device locator systems described herein. FIG. 4A illustrates a method 400 to pair a mobile device with a wireless accessory. FIG. 4B illustrates a method 410 to determine a location for a wireless accessory via a device locator server. FIG. 4C illustrates an additional method 420 to determine a location for a wireless accessory via a device locator server. Aspects of method 400, 410, and 420 are also illustrated in FIG. 2 and FIG. 3, as described above. For example, the description of the operations below refers to the mobile device 102, wireless accessory 201 and device locator server 203.

As shown in FIG. 4A, method 400 includes an operation (block 401) that performs an initial pairing with a wireless accessory. The initial pairing can be a Bluetooth pairing or another type of pairing using other wireless radio technologies. During the initial pairing, the mobile device and the wireless accessory can exchange identifiers, passkeys, or other credentials that enables a wireless data exchange to be performed between a mobile or another electronic device and the wireless accessory. On one embodiment the initial paring with the wireless accessory can include the exchange of credentials associated with the wireless protocol for which the pairing is performed, allowing all data exchanged wirelessly to have at least a first layer of encryption.

The mobile device can then generate a public/private key pair and one or more additional shared secrets (block 402). The device can then send the public key and one or more additional shared secrets to the wireless accessory (block 403). A variety of key generation techniques can be used. In one embodiment, a variant of ECDH is used to generate a public key pair for encryption. In one embodiment, the one or more additional shared secrets can include an anti-tracking secret that enables the wireless accessory to derive a new public key based on an existing public key.

After generating the public/private keypair and one or more additional shared secrets, the mobile device can store public/private key pair to a keystore (block 404). In one embodiment the keystore is a cloud-based keystore that can be synchronized with other devices associated with the same cloud services account, or family of cloud services accounts, to which the mobile device and wireless accessory are associated. The cloud-based keystore allows the wireless accessory to be located by other synchronized devices. The mobile device can then register the wireless accessory with a device management server (block 405). Registering the wireless accessory with the device management server can form an association between the wireless accessory and the cloud services account to which the mobile device is associated. The device management server can be associated with other cloud-based servers that are used to facilitate cloud-based services accessible to the mobile device, such as the device locator server 203 of FIG. 2 and FIG. 3.

As shown in FIG. 4B, method 410 includes an operation in which an electronic device launches a device locator UI (block 411). In response to launching the device locator UI, the electronic device, which can be a mobile device as described herein, or another electronic device associated with the same cloud services account as the mobile electronic device, can perform an operation to generate a set of public keys that were included within a beacon signal broadcast by a wireless accessory during a first period (block 412). The first period can be, for example, a previous 24 hours. The electronic device is aware of how often the wireless accessory is to generate or rotate to new public keys and, using a shared secret generated with the wireless accessory, can generate a set of public keys that correspond with the keys that were generated by the wireless accessory over the first period. The electronic device can then send the set of public keys within a request for the device locator server to send location data that corresponds with the set of public keys (block 413). In one embodiment, location data sent by the server in response to the request will be encrypted using the public key transmitted as the beacon identifier of the wireless accessory. The electronic device can decrypt the encrypted location data received by the server using the private key generated during the initial pairing with the wireless accessory (block 414). The electronic device can then process the location data to determine the highest probability location for the wireless accessory (block 415).

Figure 10:
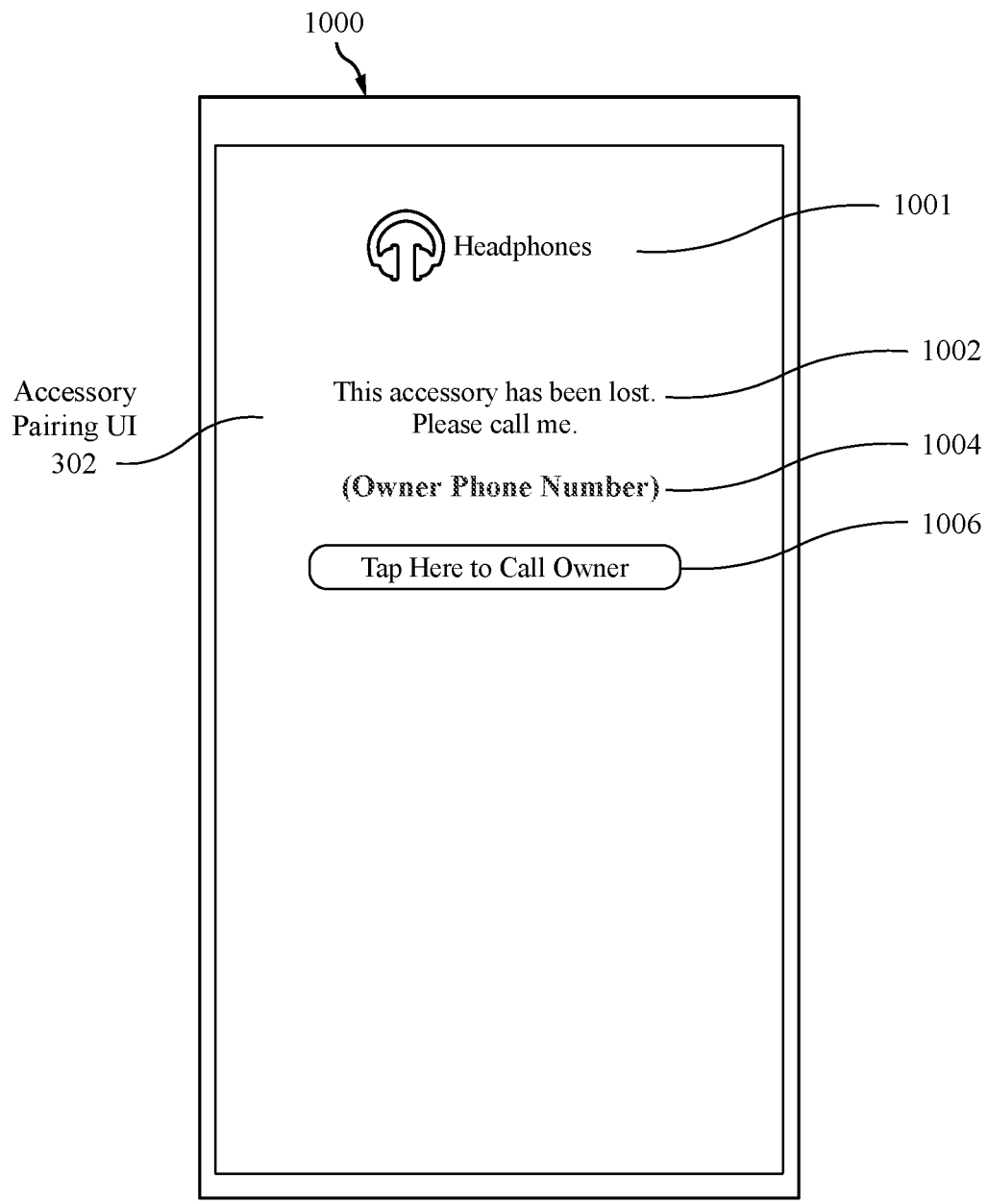
FIG. 10 illustrates an accessory pairing user interface that is displayed when attempting to pair with a lost wireless accessory, according to an embodiment.

Processing the location data can include a variety of different operations. In one embodiment the location data includes latitude and longitude information along with a timestamp for which the location was determined. The electronic device can triangulate based on the timestamps and remove noise or outlier locations. In one embodiment the location data specifies the location of the finder device that detected the beacon. The location data can additionally include UWB ranging information and/or RSSI information for the beacon detected by the finder device. The electronic device can analyze the UWB ranging information and/or RSSI information in context with the device locations to develop a more accurate location for the wireless accessory. Data that can be transmitted by a finder device and used for location processing is shown in FIG. 10 and described below.

As shown in FIG. 4C, method 420 includes operations that can be performed if the device locator server does not have location data to provide to the electronic device in response to a request. The electronic device can generate a first set of public keys that were included within a beacon signal broadcast by wireless accessory during a first period (block 421). The first period can be, for example, 24 hours, although other initial search periods can be used. The electronic device can perform a subsequent operation to request the device locator server to send location data that corresponds with first set of public keys (block 422). If the data is returned by the server (block 423, "yes"), the electronic device can decrypt the location data received from the server using the private key that corresponds with the set of public keys (block 429).

If data is not returned by the server (block 423, "no") the electronic device can generate a second set of public keys that were included within a beacon signal broadcast by the wireless accessory during a second period (block 424). The second period can be the 24, 48, or another number of hours before the first period. The electronic device can then request for the device locator server to send data that corresponds with the second set of public keys (block 425). If, in response to the request, data is returned by the server (block 426, "yes"), method 420 can proceed to block 429, in which the electronic device decrypts the received data. If data is not returned by the server (block 426, "no"), or the server sends a reply that indicates data is not available, method 420 includes for the electronic device can widen the search time by requesting successively older time periods until the max period is reached (block 427).

Figure 5:
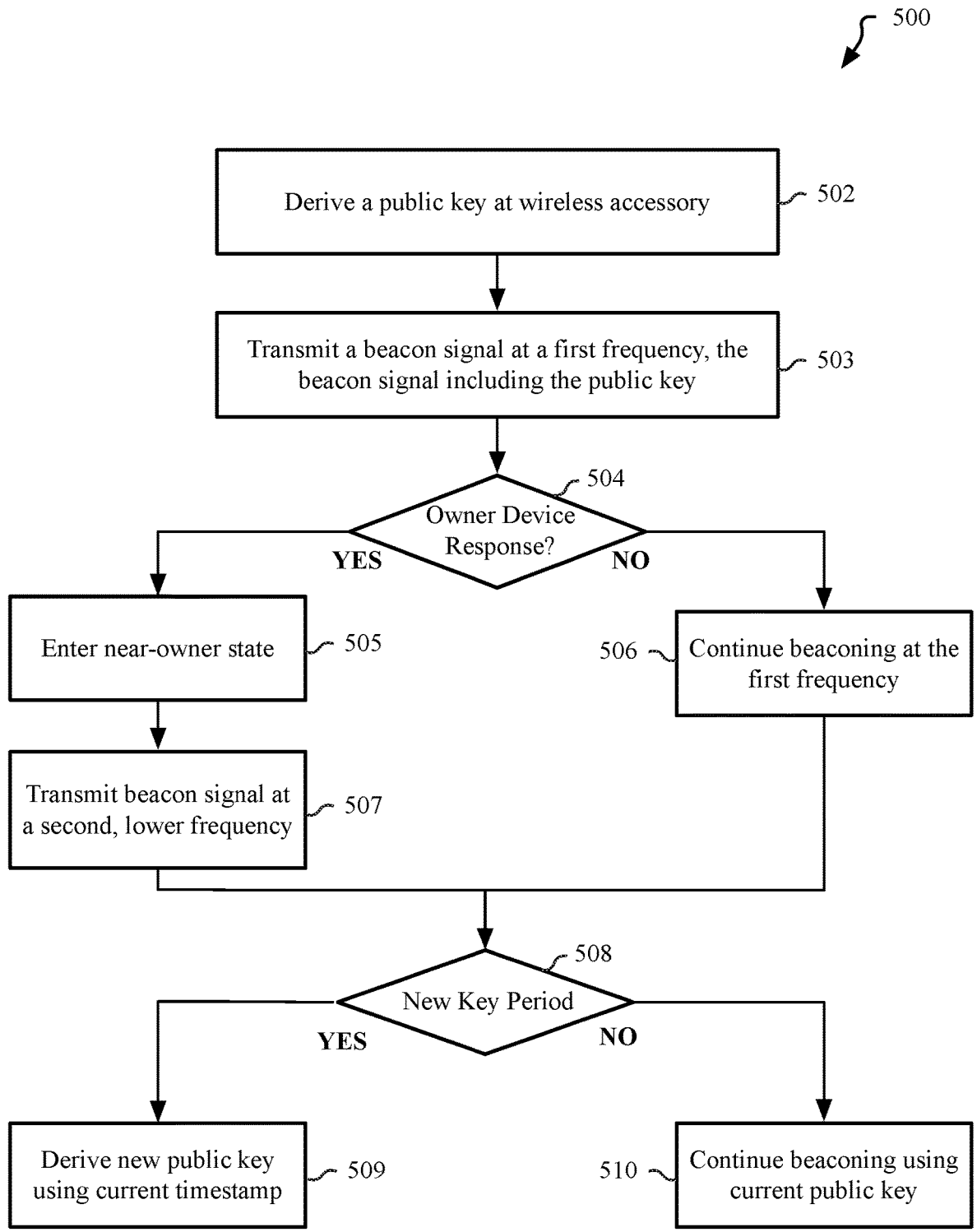
FIG. 5 is a flow diagram illustrating a method of broadcasting a signal beacon at a wireless accessory, according to an embodiment.

FIG. 5 is a flow diagram illustrating a method 500 of broadcasting a signal beacon at a wireless accessory, according to an embodiment. Aspects of method 500 are also illustrated in FIG. 2 and FIG. 3. Method 500 includes for the wireless accessory to derive a public key (block 502). The public key can be derived based on a shared secret and a timestamp determined based on a clock or time keeping device of the wireless accessory. The wireless accessory can then transmit a beacon signal at a first transmission interval, where the beacon signal includes the public key (block 503). The first transmission interval can vary, and in one embodiment is one beacon every two seconds.

After transmitting a beacon signal, the wireless accessory can listen for a response from the owner device. If the wireless signal receives a response from the owner device (block 504, "yes"), the wireless accessory can enter a near owner state (block 505) and begin to transmit the beacon signal at a second, slower transmission interval (block 507). If the wireless accessory does not receive a response from the owner device (block 504, "no"), the wireless accessory can continue beaconing at the first transmission interval (block 506).

Method 500 additionally includes for the wireless device, while beaconing, to rotate the public key every M minutes, where the value of M can vary across embodiments and/or based on the device state. Based on a timer expiration, counter, or another mechanism, the wireless accessory can determine whether the accessory has entered a new key period (block 508). While the wireless accessory has not entered a new key period (block 508, "no"), the accessory can continue beaconing using the current public key (block 510). When the wireless accessory detects that it has entered a new key period (block 508, "yes") the accessory can derive a new public key using the current timestamp (block 509). In one embodiment the new public key can be derived using an existing public key, a timestamp, and an anti-tracking secret.

Figure 6A:
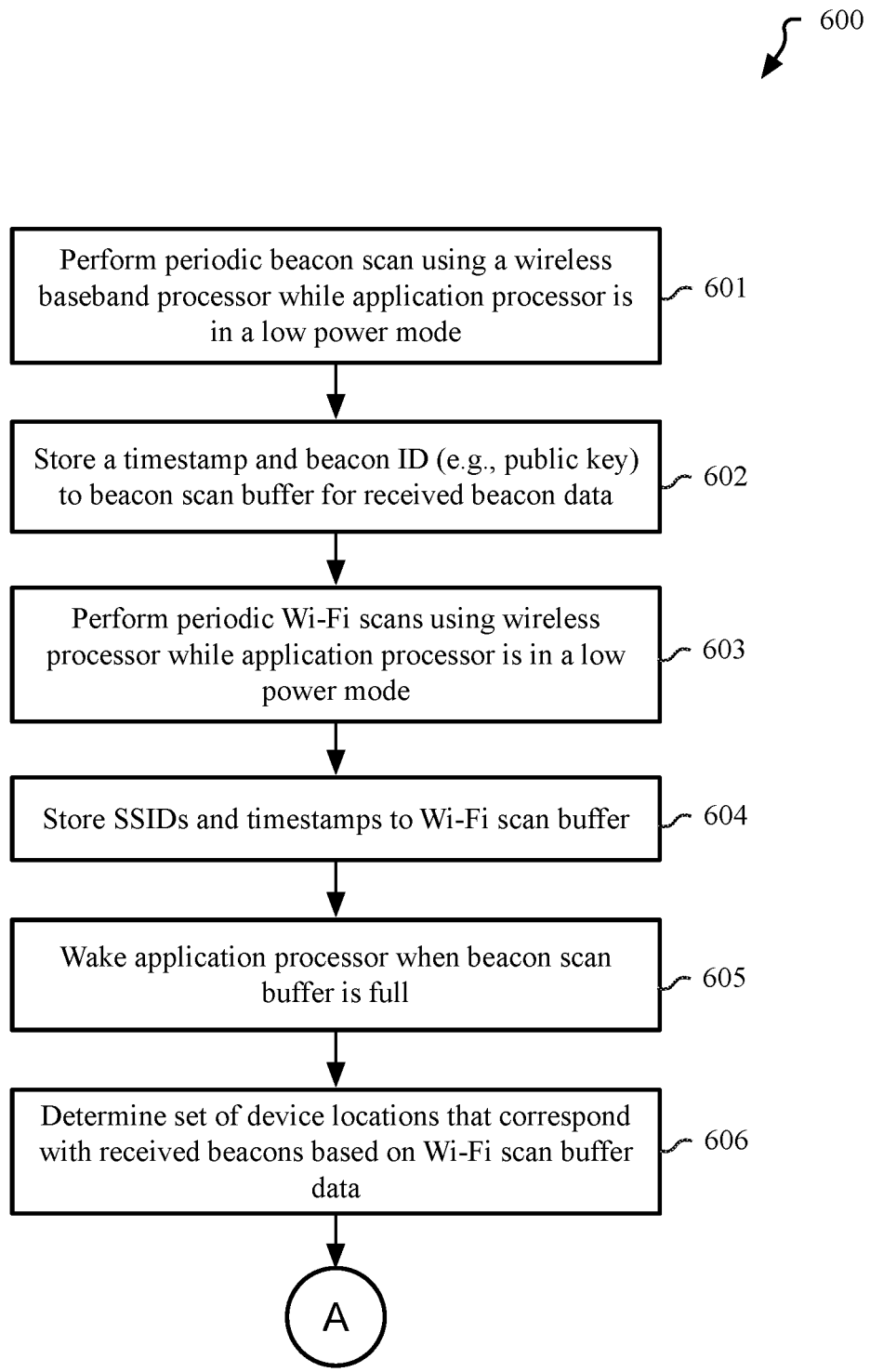
FIG. 6A-6B illustrate operations of a method that can be performed by a finder device, according to embodiments described herein.
Figure 6B:
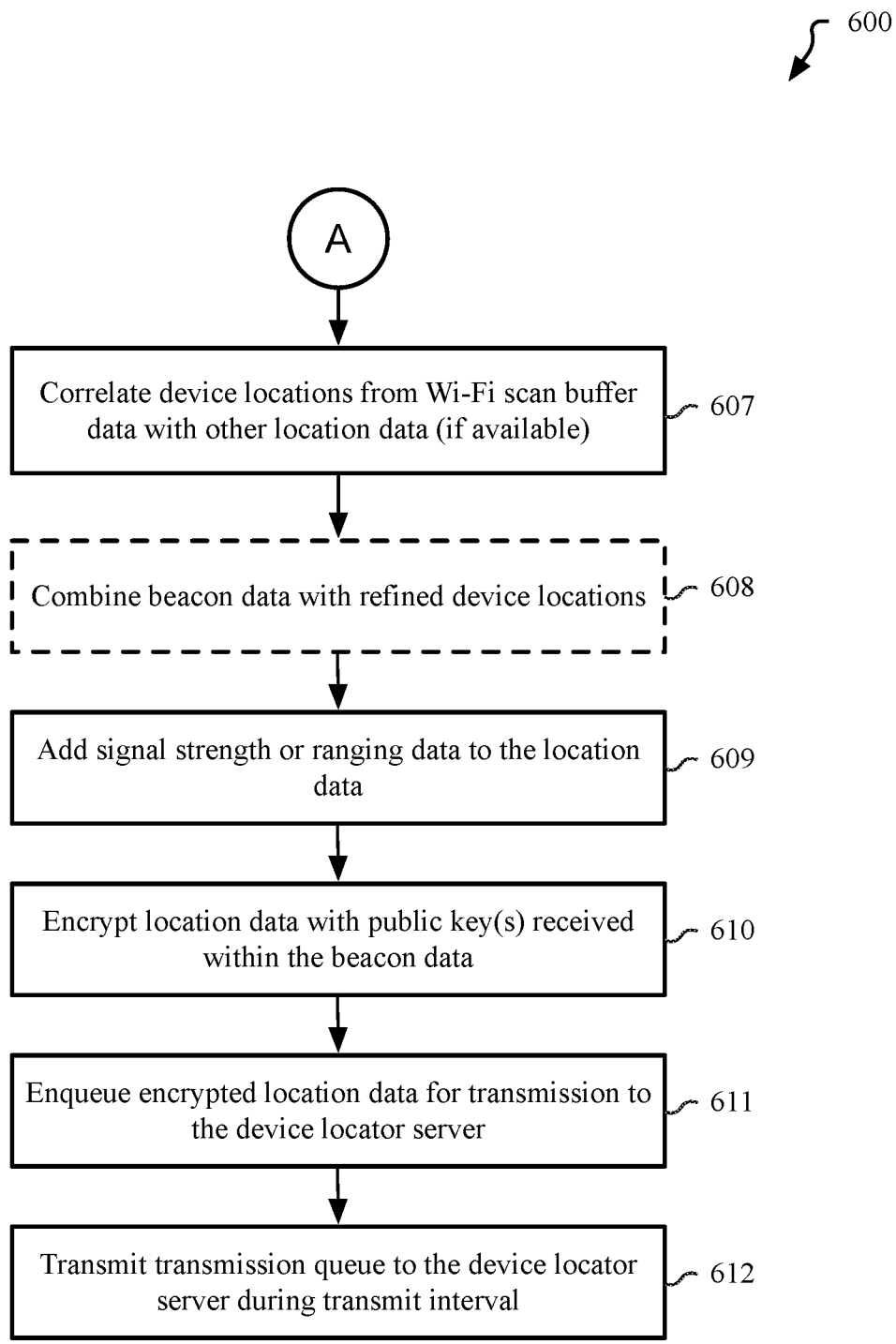

FIG. 6A-6B illustrate operations of a method 600 that can be performed by a finder device, according to embodiments described herein. Aspects of method 600 are also illustrated in FIG. 2 and FIG. 3.

As shown in FIG. 6A, method 600 includes for the finder device to perform a periodic beacon scan using a wireless baseband processor while an application processor of the finder device is in a low power mode (block 601). While the beacon scan can also be performed when the application processor is active, beacon scans can be performed by the wireless processor and a wireless radio receiver as a low power operation while the finder device is idle, inactive, or otherwise in a low power state. The finder device can store a timestamp and a beacon identifier to a beacon scan buffer for any beacon data received by the finder device (block 602). The beacon identifier, in one embodiment, is a public key that is generated by the wireless device based on a timestamp and a shared secret generated with the mobile device of the owner.

Method 600 additionally includes for the finder device to perform periodic Wi-Fi scans using the wireless processor while application processor is in a low power mode (block 603). While the Wi-Fi scans can also be performed when the application processor is active, Wi-Fi scans can be performed by the wireless processor and a wireless radio receiver as a low power operation while the finder device is idle, inactive, or otherwise in a low power state. The finder device can then store Wi-Fi service set identifiers (SSIDs) and scan timestamps to a Wi-Fi scan buffer on the finder device (block 604).

In one embodiment, the Wi-Fi scan buffer is a rolling buffer that stores the most recently detected SSIDs, while overwriting older detected SSIDs. In one embodiment the beacon scan buffer can be a fixed-size buffer having space for a pre-determined number of entries. The finder device can wake the application processor when the beacon scan buffer becomes full (block 605) and correlate those beacon scan with the most recently detected SSIDs in the Wi-Fi scan buffer. That correlation can enable the finder device to determine a set of device locations that correspond with received beacons based on Wi-Fi scan buffer data (block 606).

Method 600 continues in FIG. 6B and includes for the finder device to correlate device locations from the Wi-Fi scan buffer data with other location data if other location data is available (block 607), to generate refined device locations. If refined device locations are generated, the finder device can optionally combine the beacon data with refined device locations (block 608). The finder device can also add a receive signal strength indicator (RSSI) or ranging data to the location data (block 609). The signal strength and ranging data (e.g., UWB ranging data) can be gathered when the beacon signal is received by the finder device. The finder device can then encrypt the location data with one or more public keys received within the beacon data (block 610). The signal and ranging data may be encrypted along with the location data or can be send unencrypted along with the encrypted location data. The finder device can enqueue encrypted location data for transmission to the device locator server (block 611). The device locator server can be one of multiple cloud services servers to which communication is generally performed in a batched and throttled manner. A batch of encrypted data can be gathered and placed in the transmission queue until a transmit interval arrives, during which the finder device can transmit data to the cloud services servers (block 612). The encrypted data can be sent along with hashes of the beacon identifiers that correspond with the encrypted locations.

Figure 7:
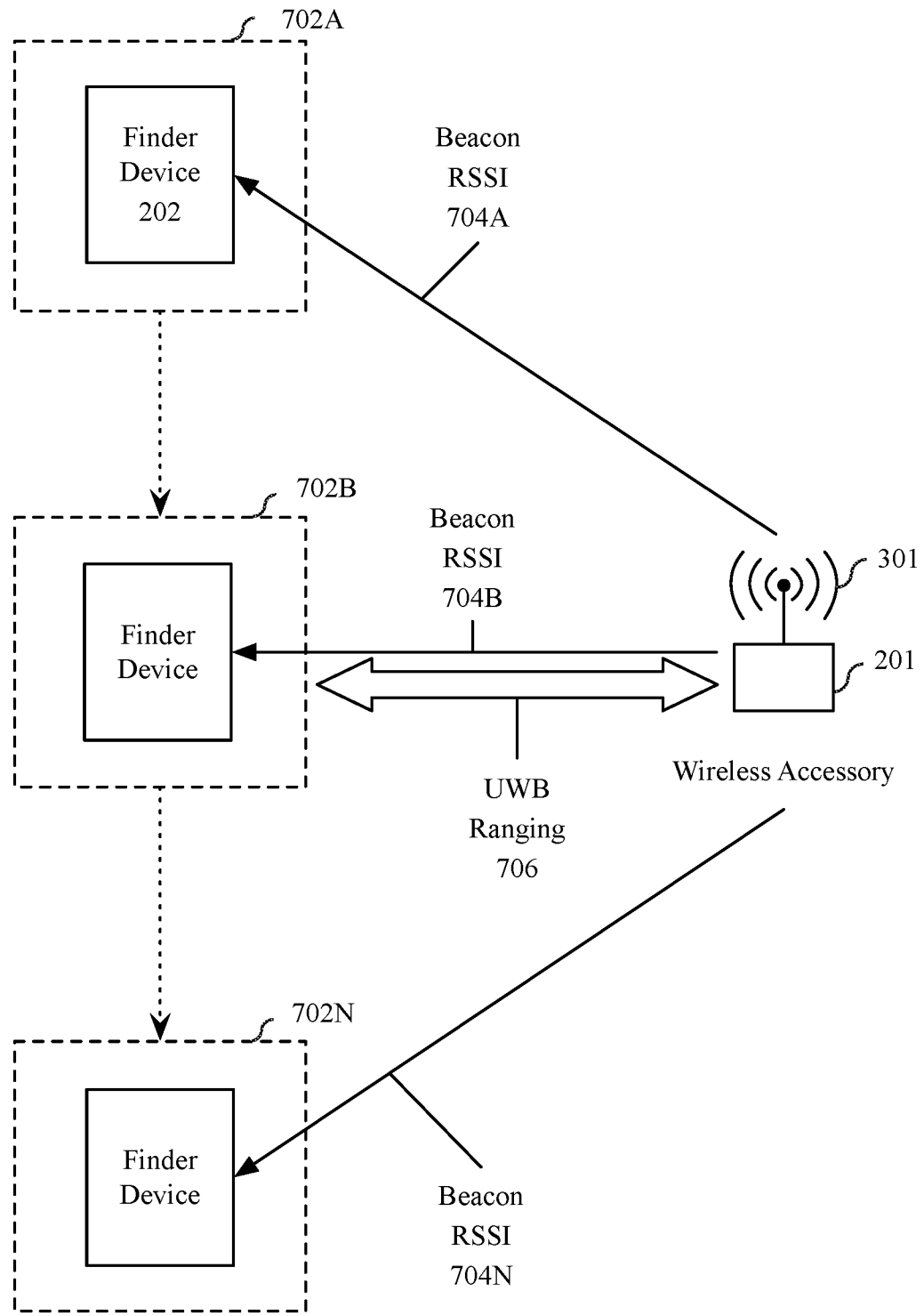
FIG. 7 illustrates the gathering of signal and ranging data by a finder device, according to an embodiment.

FIG. 7 illustrates the gathering of signal and ranging data by a finder device, according to an embodiment. In one embodiment, the finder device 202 can gather signal strength information (e.g., RSSI 704A-704N) for a beacon signal 301 received from the wireless accessory 201 across multiple locations 702A-702N. The finder device 202 can also represent multiple finder devices, such as the set of finder devices 303 in FIG. 3, where each finder device detects the beacon signal at a different location. Each finder device 202 can send different locations and signal strengths and the location and signal strength data received from the multiple finder devices will be aggregated by the device locator server. In one embodiment, where a finder device and the wireless device each include UWB radios, UWB ranging 706 can be performed if the finder device and the wireless device are within range of UWB transmissions. UWB ranging and signal strength data can be transmitted along with location data for the finder devices to the device locator server.

The owner device can retrieve the RSSI or UWB information from the device locator server along with location data, which in one embodiment is provided the form of latitude and longitude information, along with timestamps for which the locations were determined. The owner device can then use the location data, timestamps, and signal information to triangulate a most probable location for the wireless accessory 201.

Figure 8:
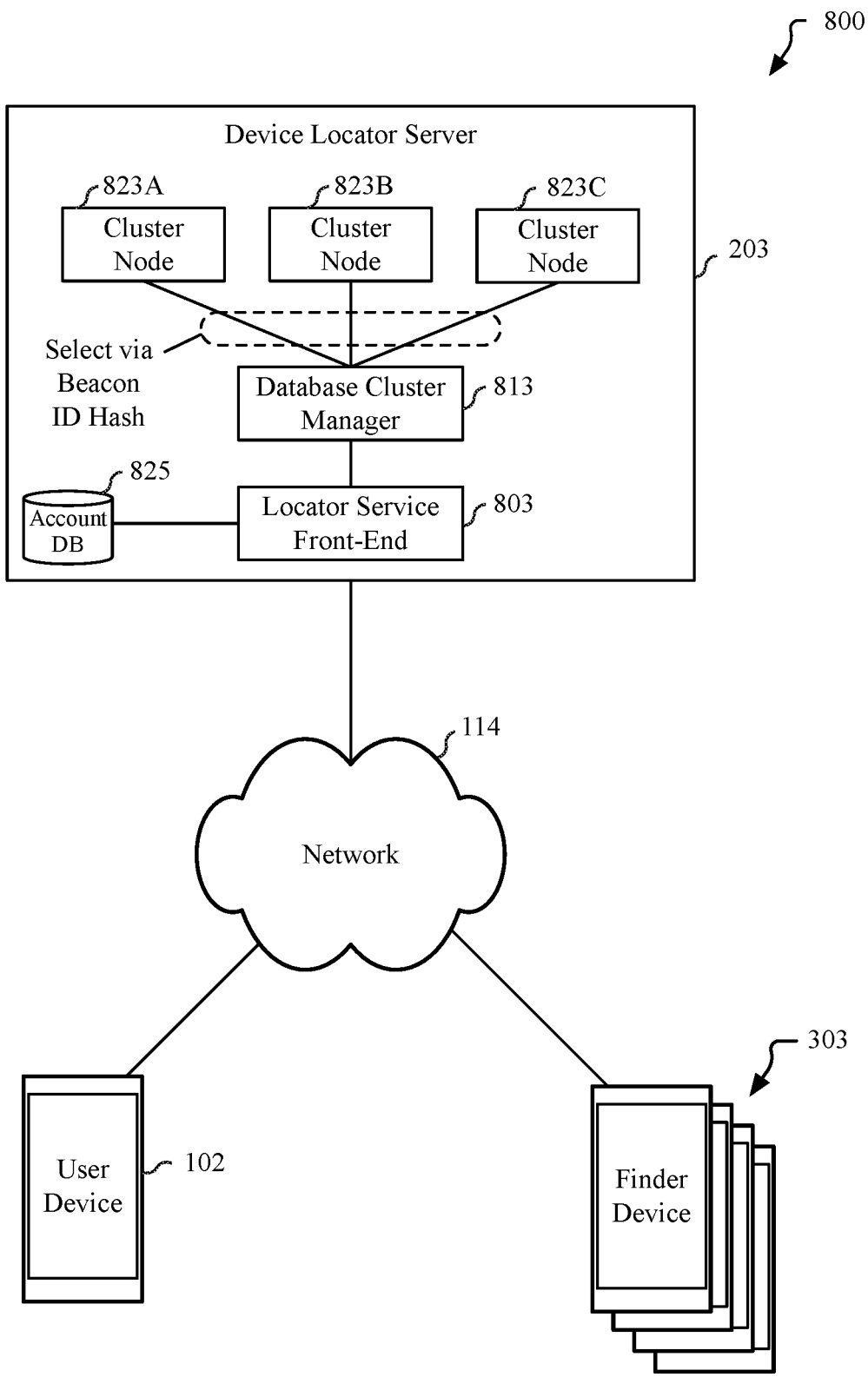
FIG. 8 illustrates a networked system for locating devices and wireless accessories, according to an embodiment.

FIG. 8 illustrates a networked system 800 for locating devices and wireless accessories, according to an embodiment. The system 800 also illustrates an exemplary server architecture for the device locator server 203, according to an embodiment. In one embodiment the device locator server 203 is a cluster of interconnected server devices, which may be physical or virtual servers within a single datacenter or distributed across multiple datacenters and/or geographic locations. As described above, the device locator server 203 can communicate with a mobile device 102 of an accessory owner or user and the set of finder devices 303 over a wide area network 114. The mobile device 102 includes a UI provided by a local or web application that enables the location of a wireless accessory and the finder devices 303 receive beacon signals from wireless accessories and transmits location data associated with the received signals to the device locator server 203.

In one embodiment the device locator server 203 includes a locator service front-end 803, an account database 825, a database cluster manager 813, and a set of database cluster nodes 823A-823C. The locator service front-end 803 is a front-end interface to which the mobile device 102 and the set of finder devices 303 can communicate. The account database 825 stores account profile data for accounts of a cloud service provider to which the mobile device 102 and the finder devices 303 are associated. The database cluster manager 813 can configure the database cluster nodes 823A-823C as a distributed location database that can store location, signal, and ranging data in association with beacon identifiers for signal beacons received by the set of finder devices 303.

In one embodiment, the account database 825 can contain a list of devices that are associated with each cloud services account. In response to a request to locate a given device, including a wireless accessory as described herein, the account database 825 can verify that the request is coming from a device that is authorized to request the location of the given device. In one embodiment, when a user launches a device locator UI and communicates with the locator service front-end 803, the locator service front-end can communicate with the account database 825 and provide a current or last known location for each device that is associated with a requesting user, including devices and/or wireless accessories associated with other users that are in a family of accounts associated with the requesting user.

In one embodiment, the database cluster manager 813 can select a database cluster node 823A-823C to which beacon data is to be stored by hashing the beacon ID associated with a set of location data. Each database cluster node 823A-823C can be associated with a range of hash values. The database cluster manager can then store location data to the cluster node that corresponds with the range of hash values associated with the hash of a given beacon ID. Although three database cluster nodes are illustrated, embodiments are not limited to any specific number of nodes and greater or fewer nodes may be used.

Figure 9A:
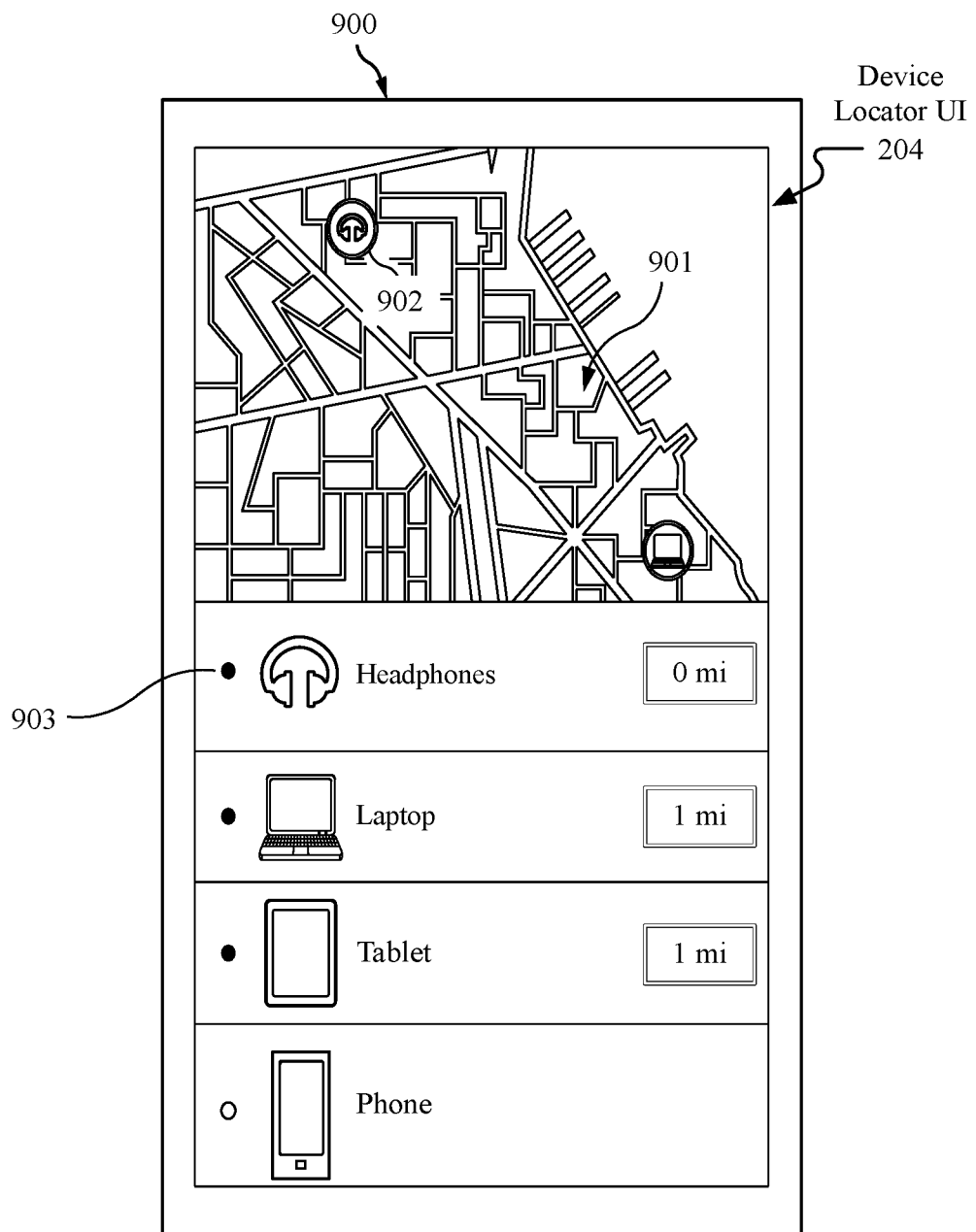
FIG. 9A-9C illustrate a device locator user interface, according to an embodiment.
Figure 9B:
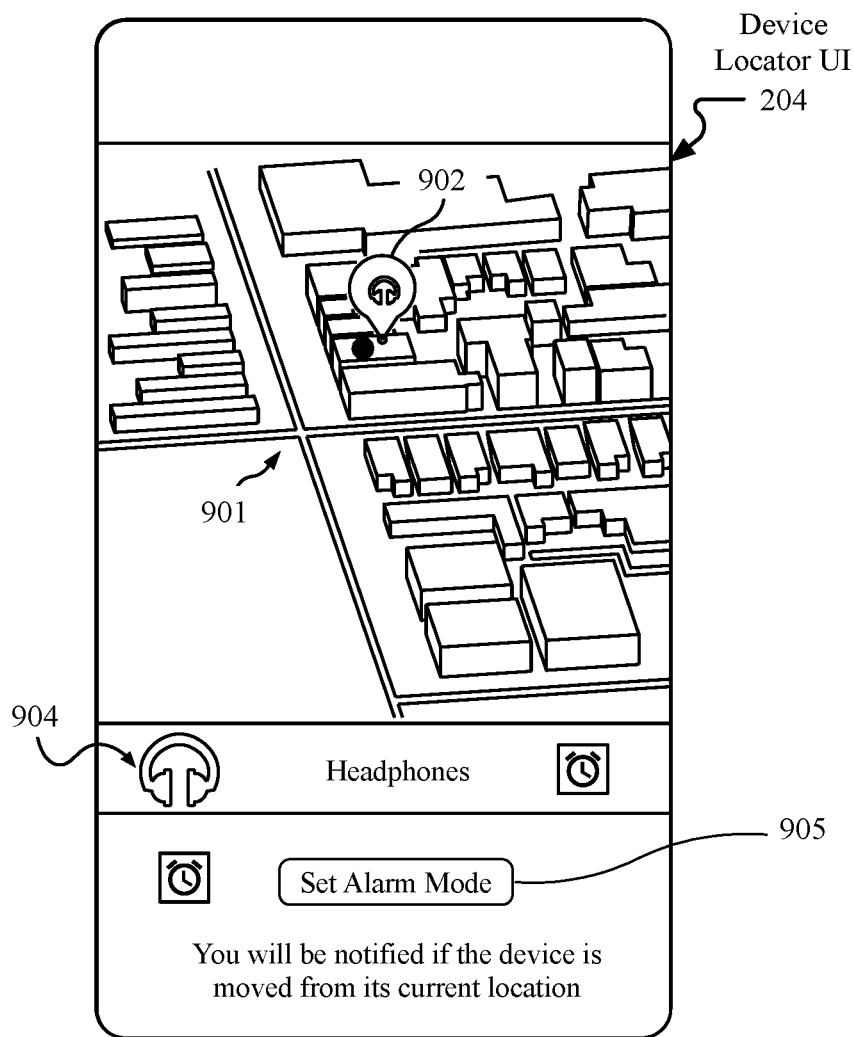
Figure 9C:
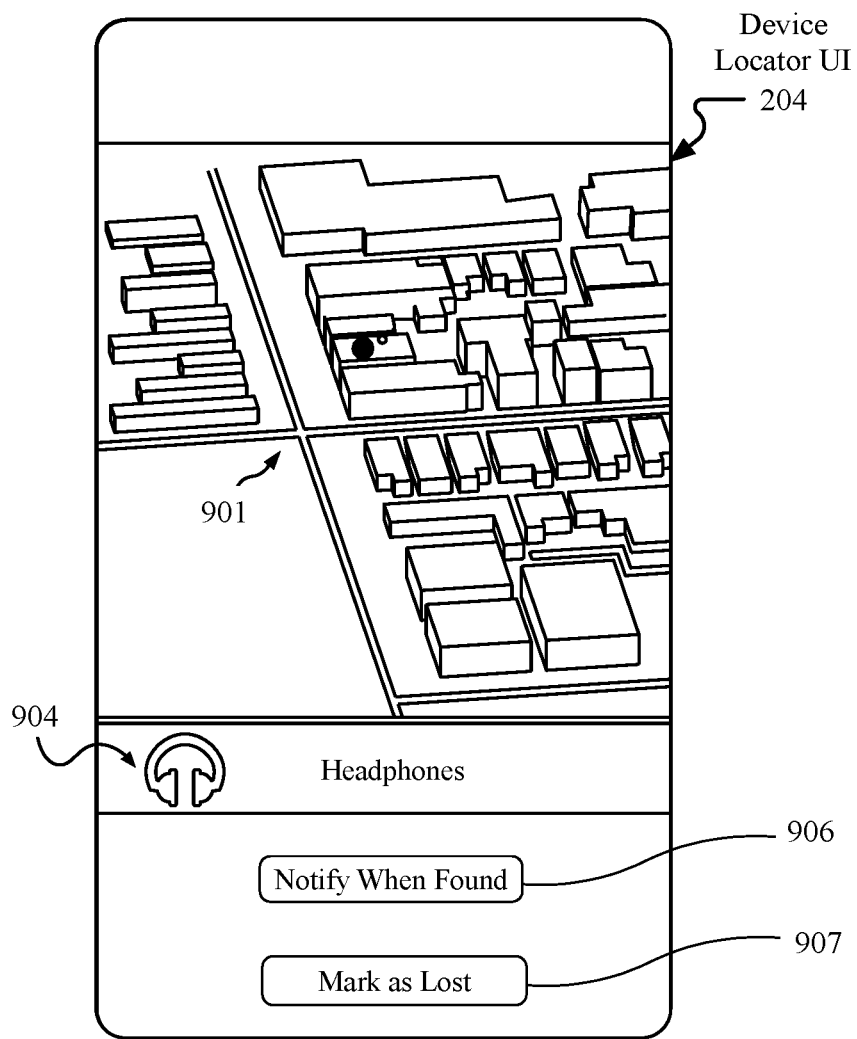

FIG. 9A-9C illustrate a device locator UI 204, according to an embodiment. FIG. 9A shows a first graphical user interface of the device locator UI 204, according to an embodiment, which shows a location for various electronic devices and wireless accessories of a user. FIG. 9B shows a second graphical user interface of the device locator UI 204, according to an embodiment, which enables a wireless accessory to be set to an alarm mode. FIG. 9C shows a third graphical user interface of the device locator UI 204, according to an embodiment, which enables a wireless accessory to be set to a lost mode.

As shown in FIG. 9A, the device locator UI 204 can be displayed on an electronic device 900, which can be a mobile device, or any other type of electronic device described herein. The device locator UI 204 can present a unified graphical interface through which multiple different types of devices and accessories can be located, including wireless devices with network or cellular access and wireless accessories without native network access. The device locator UI 204 can include a map 901 with a marker 902 that shows the current or last known location of a wireless device or accessory. The marker 902 can be an icon, image, graphic or any other user interface element that identifies the accessory and conveys a location for the accessory. A selectable element 903 in the device locator UI can present a description or name of the wireless device or accessory and can show an estimated distance between the wireless device or accessory and the current location of the electronic device 900.

As shown in FIG. 9B, the device locator UI 204 can present a second user interface that enables a wireless accessory to be set to an alarm mode. The second user interface can be displayed, in one embodiment, in response to the selection of the selectable element 903 shown in FIG. 9A. The second user interface can present a user interface element 904 that represents and/or describes the wireless accessory in question, as well as the map 901 and marker 902 that show the current or last known location of the wireless accessory. In one embodiment, the device locator UI 204 can present a selectable element 905, such as a button or another user interface element, that allows a user of the device locator UI 204 to place a selected wireless accessory into an alarm mode. While in the alarm mode, the wireless accessory can be configured to trigger a notification to the user if the wireless accessory is moved from its current location.

In one embodiment the wireless accessory can detect movement via an accelerometer or another type of motion sensor within the wireless accessory. The notification can be initiated by the wireless accessory by setting a flag in the data packet transmitted by the beacon signal of the wireless accessory that indicates the wireless accessory alarm has been triggered. In various embodiments, other trigger or notification modes can be used. In one embodiment, the alarm can optionally be triggered by the mobile device upon detection that the wireless accessory has moved out of range of the mobile device and is no longer in the near owner state. In one embodiment, the alarm can optionally be triggered when the wireless accessory is out of range of, or otherwise cannot be located by, any of the devices associated with the account or family of user accounts to which the wireless accessory is associated.

As shown in FIG. 9C, the device locator UI 204 can present a third graphical user interface that enables a wireless accessory to be set to a lost mode. In one embodiment, when a wireless accessory cannot be located via the device locator UI 204, the map 901 will not display a marker that indicates a location for the accessory. The device locator UI 204 can present the user interface element 904 that represents and/or describes the wireless accessory in question and a set of selectable user interface elements. One selectable user interface element 906 can present the option to notify the user when the accessory is found. When notify when found is enabled, in one embodiment the wireless accessory can be placed into a light lost mode. The electronic device associated with the device locator UI 204 can generate a set of public keys that the wireless accessory will broadcast with the beacon signal during a future time period (e.g., next 24 hours, next 48 hours, etc.). If a signal is detected by a finder device using one of the future keys, the device locator server can notify one or more electronic devices associated with the user.

Another selectable user interface element 907 can mark the wireless accessory as "lost" and place the wireless accessory into an explicit lost mode. When explicitly placed into lost mode, the wireless accessory will be unable to be paired with other devices until the accessory is unlocked by the user or owner that places the device into lost mode. When sending a request to place a wireless accessory into lost mode, the requesting user can be required to enter authenticating information to ensure that the requesting user is authorized to request that lost mode be initiated on the lost accessory. The authenticating information can include a username or password associated with an account of a user, such as a cloud services account to which the user, electronic device, and wireless accessory are associated. The authenticating information can also include biometric information, such as a fingerprint or facial recognition data, voice recognition, iris recognition, and other biometric identification information.

In one embodiment, a message and contact information provided by the requesting user can be displayed on the user device to alert a person who finds the lost wireless accessory on how to contact the requesting user. In one embodiment, the message and contact information can be displayed when another user attempts to pair another electronic device with the lost accessory.

FIG. 10 illustrates an accessory pairing UI 302 that is displayed when attempting to pair with a lost wireless accessory, according to an embodiment. In one embodiment, when an electronic device 1000 that is different from the electronic device 900 of FIG. 9A and is not associated with the registered user or owner of a wireless accessory attempts to pair with a lost wireless accessory, the accessory pairing UI of the electronic device can be displayed as shown in FIG. 10. In one embodiment, the accessory pairing UI 302 can display a name or description 1001 associated with the wireless accessory, as well as a message 1002 entered by the user of the accessory upon placing the accessory into lost mode. Contact information 1004 can also be displayed, along with a user interface element 1006, such as a button, that enables the electronic device 1000 to contact the requesting user by using the provided contact information 1004.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g., the provider of a software library) or creator of another set of APIs.

Figure 11:
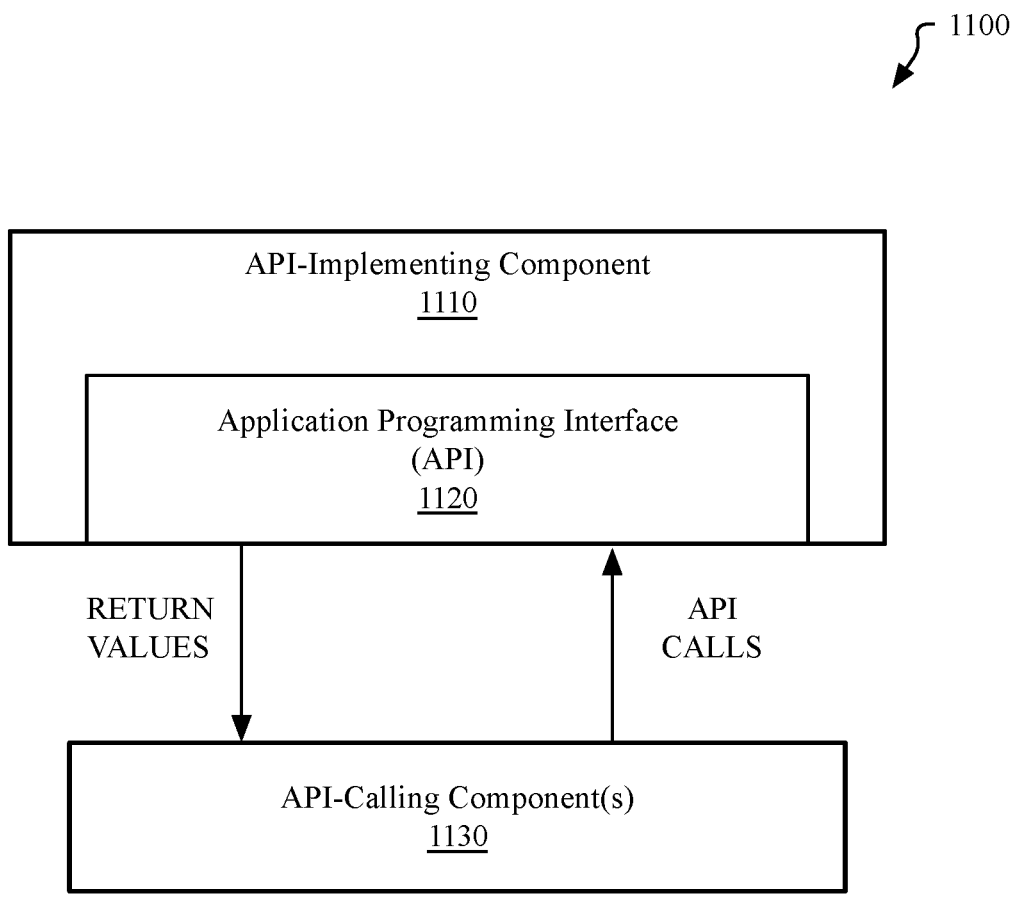
FIG. 11 is a block diagram illustrating an exemplary API architecture, which may be used in some embodiments of the invention.

FIG. 11 is a block diagram illustrating an exemplary API architecture, which may be used in some embodiments of the invention. As shown in FIG. 11, the API architecture 1100 includes the API-implementing component 1110 (e.g., an operating system, a library, a device driver, an API, an application program, software or other module) that implements the API 1120. The API 1120 specifies one or more functions, methods, classes, objects, protocols, data structures, formats and/or other features of the API-implementing component that may be used by the API-calling component 1130. The API 1120 can specify at least one calling convention that specifies how a function in the API-implementing component receives parameters from the API-calling component and how the function returns a result to the API-calling component. The API-calling component 1130 (e.g., an operating system, a library, a device driver, an API, an application program, software or other module), makes API calls through the API 1120 to access and use the features of the API-implementing component 1110 that are specified by the API 1120. The API-implementing component 1110 may return a value through the API 1120 to the API-calling component 1130 in response to an API call.

It will be appreciated that the API-implementing component 1110 may include additional functions, methods, classes, data structures, and/or other features that are not specified through the API 1120 and are not available to the API-calling component 1130. It should be understood that the API-calling component 1130 may be on the same system as the API-implementing component 1110 or may be located remotely and accesses the API-implementing component 1110 using the API 1120 over a network. While FIG. 11 illustrates a single instance of the API-calling component 1130 interacting with the API 1120, it should be understood that other API-calling components, which may be written in different languages (or the same language) than the API-calling component 1130, may use the API 1120.

The API-implementing component 1110, the API 1120, and the API-calling component 1130 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 12:
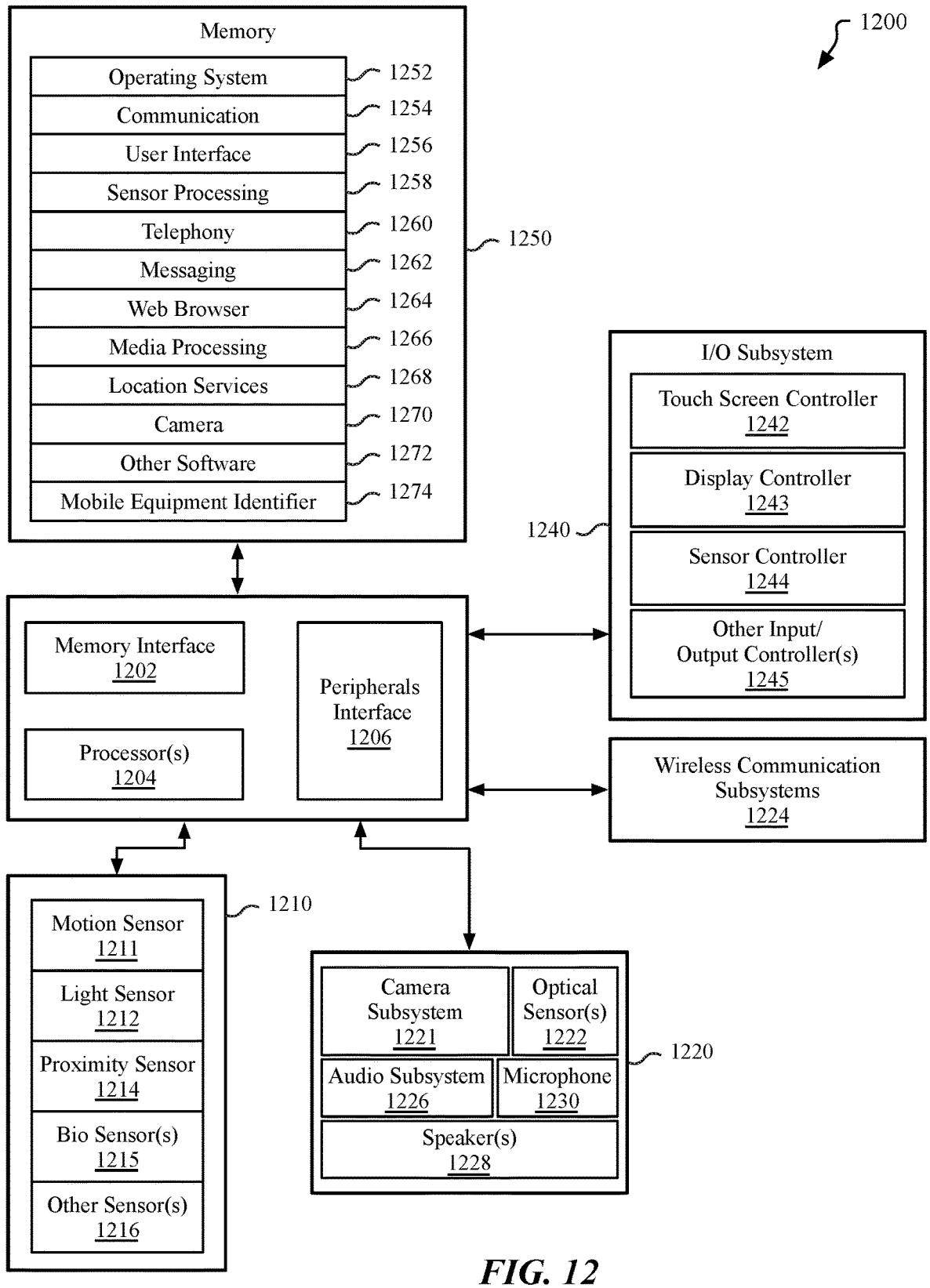
FIG. 12 is a block diagram of a device architecture for a mobile or embedded device, according to an embodiment.

FIG. 12 is a block diagram of a device architecture 1200 for a mobile or embedded device, according to an embodiment. The device architecture 1200 includes a memory interface 1202, one or more processors 1204 (e.g., data processors, image processors and/or graphics processors), and a peripherals interface 1206. The various components can be coupled by one or more communication buses or signal lines. The various components can be separate logical components or devices or can be integrated in one or more integrated circuits, such as in a system on a chip integrated circuit.

The memory interface 1202 can be coupled to memory 1250, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1206 to facilitate multiple functionalities. For example, a set of sensors 1210 including a motion sensor 1211, a light sensor 1212, and a proximity sensor 1214 can be coupled to the peripherals interface 1206 to facilitate the mobile device functionality. One or more biometric sensor(s) 1215 may also be present, such as a fingerprint scanner for fingerprint recognition or an image sensor for facial recognition. Other sensors 1216 can also be connected to the peripherals interface 1206, such as a positioning system (e.g., GPS receiver), a temperature sensor, or other sensing device, to facilitate related functionalities.

The device architecture 1200 additionally includes an audio/video system 1220. A camera subsystem 1221 and an optical sensor 1222, e.g., a charged coupled device (CCD) or a complementary metal-oxide semiconductor (CMOS) optical sensor, can be utilized to facilitate camera functions, such as recording photographs and video clips. An audio subsystem 1226 can be coupled to a speaker 1228 and a microphone 1230 to facilitate voice-enabled functions, such as voice recognition, voice replication, digital recording, and telephony functions. In smart media devices described herein, the audio subsystem 1226 can be a high-quality audio system including support for virtual surround sound.

Communication functions can be facilitated through one or more wireless communication subsystems 1224, which can include radio frequency receivers and transmitters and/or optical (e.g., infrared) receivers and transmitters. The specific design and implementation of the wireless communication subsystems 1224 can depend on the communication network(s) over which a mobile device is intended to operate. For example, a mobile device including the illustrated device architecture 1200 can include wireless communication subsystems 1224 designed to operate over a GSM network, a CDMA network, an LTE network, a Wi-Fi network, a Bluetooth network, or any other wireless network. In particular, the wireless communication subsystems 1224 can provide a communications mechanism over which a media playback application can retrieve resources from a remote media server or scheduled events from a remote calendar or event server.

The I/O subsystem 1240 can include a touchscreen controller 1242 and/or other input controller(s) 1245. For computing devices including a display device, the touchscreen controller 1242 can be coupled to a touch sensitive display system 1246 (e.g., touchscreen). The touch sensitive display system 1246 and touchscreen controller 1242 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1246. Display output for the touch sensitive display system 1246 can be generated by a display controller 1243. In one embodiment, the display controller 1243 can provide frame data to the touch sensitive display system 1246 at a variable frame rate.

In one embodiment, a sensor controller 1244 is included to monitor, control, and/or processes data received from one or more of the motion sensor 1211, light sensor 1212, proximity sensor 1214, or other sensors 1216. The sensor controller 1244 can include logic to interpret sensor data to determine the occurrence of one of more motion events or activities by analysis of the sensor data from the sensors.

In one embodiment, the I/O subsystem 1240 includes other input controller(s) 1245 that can be coupled to other input/control devices 1248, such as one or more buttons, rocker switches, thumb-wheel, infrared port, USB port, and/or a pointer device such as a stylus, or control devices such as an up/down button for volume control of the speaker 1228 and/or the microphone 1230.

In one embodiment, the memory 1250 coupled to the memory interface 1202 can store instructions for an operating system 1252, including portable operating system interface (POSIX) compliant and non-compliant operating system or an embedded operating system. The operating system 1252 may include instructions for handling basic system services and for performing hardware dependent tasks. In some implementations, the operating system 1252 can be a kernel.

The memory 1250 can also store communication instructions 1254 to facilitate communicating with one or more additional devices, one or more computers and/or one or more servers, for example, to retrieve web resources from remote web servers. The memory 1250 can also include user interface instructions 1256, including graphical user interface instructions to facilitate graphic user interface processing.

Additionally, the memory 1250 can store sensor processing instructions 1258 to facilitate sensor-related processing and functions; telephony instructions 1260 to facilitate telephone-related processes and functions; messaging instructions 1262 to facilitate electronic-messaging related processes and functions; web browser instructions 1264 to facilitate web browsing-related processes and functions; media processing instructions 1266 to facilitate media processing-related processes and functions; location services instructions including GPS and/or navigation instructions 1268 and Wi-Fi based location instructions to facilitate location based functionality; camera instructions 1270 to facilitate camera-related processes and functions; and/or other software instructions 1272 to facilitate other processes and functions, e.g., security processes and functions, and processes and functions related to the systems. The memory 1250 may also store other software instructions such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. A mobile equipment identifier, such as an International Mobile Equipment Identity (IMEI) 1274 or a similar hardware identifier can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions may be implemented in hardware and/or in software, including in one or more signal processing and/or application specific integrated circuits.

Figure 13:
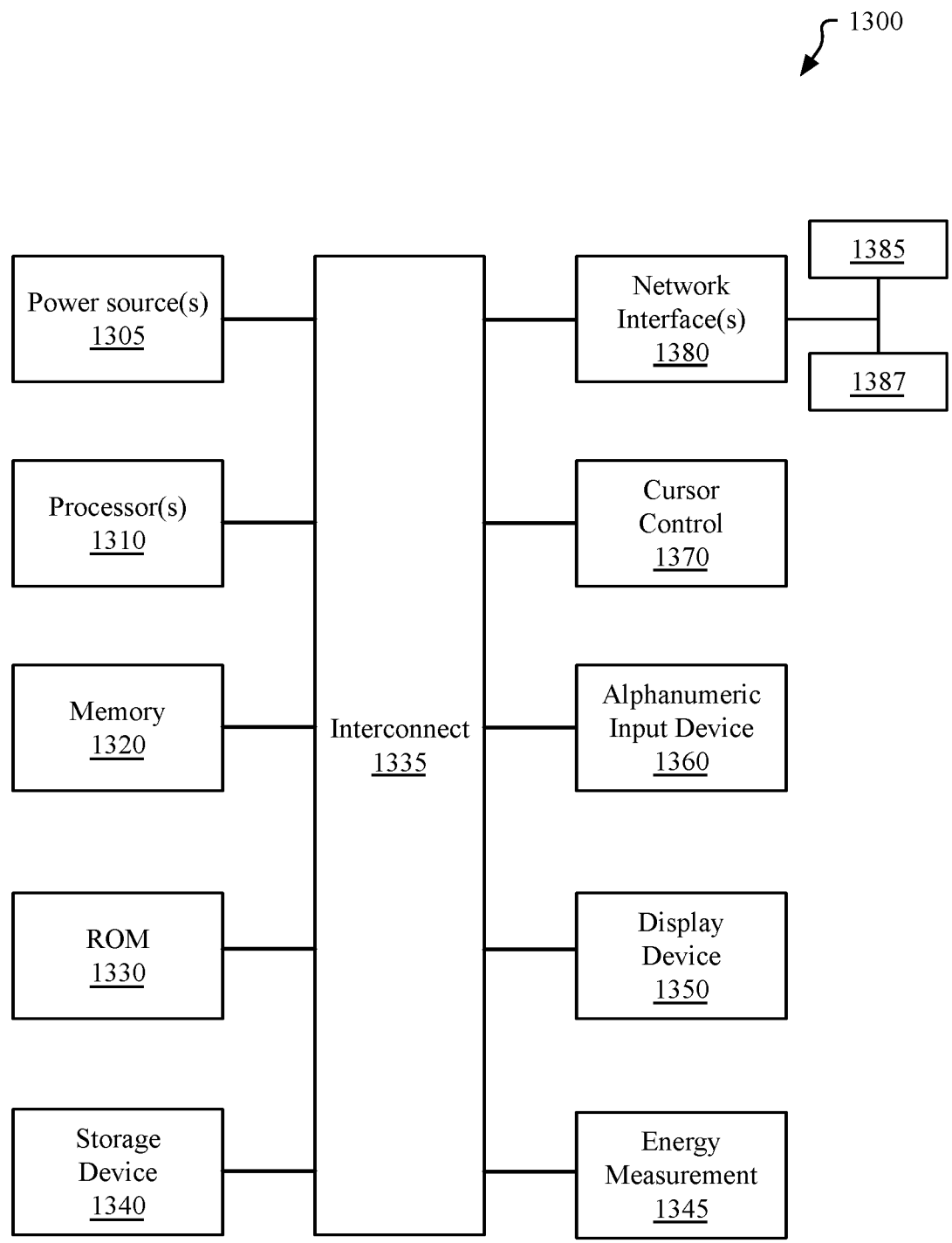
FIG. 13 is a block diagram of a computing system, according to an embodiment.

FIG. 13 is a block diagram of a computing system 1300, according to an embodiment. The illustrated computing system 1300 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1300 can be used to provide the computing device and/or a server device to which the computing device may connect.

The computing system 1300 includes an interconnect 1335 (e.g., bus, fabric) to enable communication between components of the computing system 1300. One or more processor(s) 1310 can coupled with the interconnect 1335. The computing system 1300 further may include memory 1320 in the form of random-access memory (RAM) or other dynamic storage device coupled to the interconnect 1335. The memory 1320 may store information and instructions that may be executed by processor(s) 1310. The memory 1320 may also be main memory that is used to store temporary variables or other intermediate information during execution of instructions by the processor(s) 1310.

The computing system 1300 may also include read only memory (ROM) 1330 and/or another data storage device 1340 coupled to the interconnect 1335 that may store information and instructions for the processor(s) 1310. The data storage device 1340 can be or include a variety of storage devices, such as a flash memory device, a magnetic disk, or an optical disc and may be coupled to computing system 1300 via the interconnect 1335 or via a remote peripheral interface.

The computing system 1300 may also be coupled, via the interconnect 1335, to a display device 1350 to display information to a user. The computing system 1300 can also include an alphanumeric input device 1360, including alphanumeric and other keys, which may be coupled to interconnect 1335 to communicate information and command selections to processor(s) 1310. Another type of user input device includes a cursor control 1370 device, such as a touchpad, a mouse, a trackball, or cursor direction keys to communicate direction information and command selections to processor(s) 1310 and to control cursor movement on the display device 1350. The computing system 1300 may also receive user input from a remote device that is communicatively coupled via one or more network interface(s) 1380.

The computing system 1300 further may include one or more network interface(s) 1380 to provide access to a network, such as a local area network. The network interface(s) 1380 may include, for example, a wireless network interface having antenna 1385, which may represent one or more antenna(e). The computing system 1300 can include multiple wireless network interfaces such as a combination of Wi-Fi, Bluetooth®, near field communication (NFC), and/or cellular telephony interfaces. The network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, the network interface(s) 1380 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1300 can further include one or more power sources 1305 and one or more energy measurement systems 1345. Power sources 1305 can include an AC/DC adapter coupled to an external power source, one or more batteries, one or more charge storage devices, a USB charger, or other power source. Energy measurement systems include at least one voltage or amperage measuring device that can measure energy consumed by the computing system 1300 during a predetermined period of time. Additionally, one or more energy measurement systems can be included that measure, e.g., energy consumed by a display device, cooling subsystem, Wi-Fi subsystem, or other frequently used or high-energy consumption subsystem.

Encryption for Wireless Accessory Locating and Communication

Figure 14:
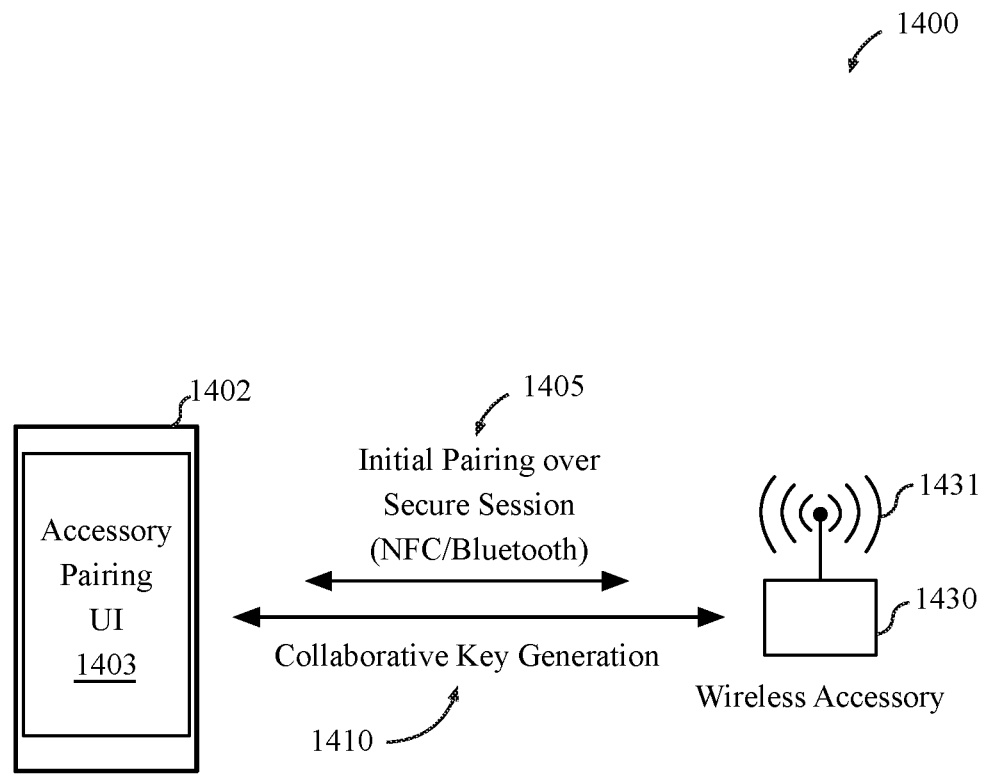
FIG. 14 illustrates a system in which key generation is performed collaboratively between an owner device and a wireless accessory, according to an embodiment.

FIG. 14 illustrates a system 1400 in which key generation is performed collaboratively between an owner device 1402 and a wireless accessory 1430, according to an embodiment. The owner device can be a version of mobile device 102 described herein. The wireless accessory 1430 can be a variant of wireless accessory 201 descried herein. The illustrated system 1400 can be used to implement a variant of initial pairing 305 and public key exchange 310 shown in the system 300 of FIG. 3, in which initial pairing 1405 is performed over a secure data session and the public key exchange 310 is a process of collaborative key generation 1410 that is performed between the owner device 1402 and the wireless accessory 1430. Furthermore, while a wireless accessory 1430 is illustrated and described, the device location functionality described herein can be applied to any electronic device without an independent network connection to allow the device to update its location at a device location server and with at least one wireless radio that is capable of broadcasting a beacon signal 1431.

Collaborative key generation can begin after an initial pairing 1405 performed over a secure session. In one embodiment the initial pairing can be performed over an NFC initiated Bluetooth connection. An NFC data exchange between the owner device 1402 and the wireless accessory 1430 can be used to establish or exchange a shared secret that is used to encrypt a Bluetooth connection. The encrypted Bluetooth connection can then be used to exchange data that is used to generate cryptographic material for use in locating the wireless accessory 1430.

Key Hierarchy for Collaborative Key Generation

Figure 15:
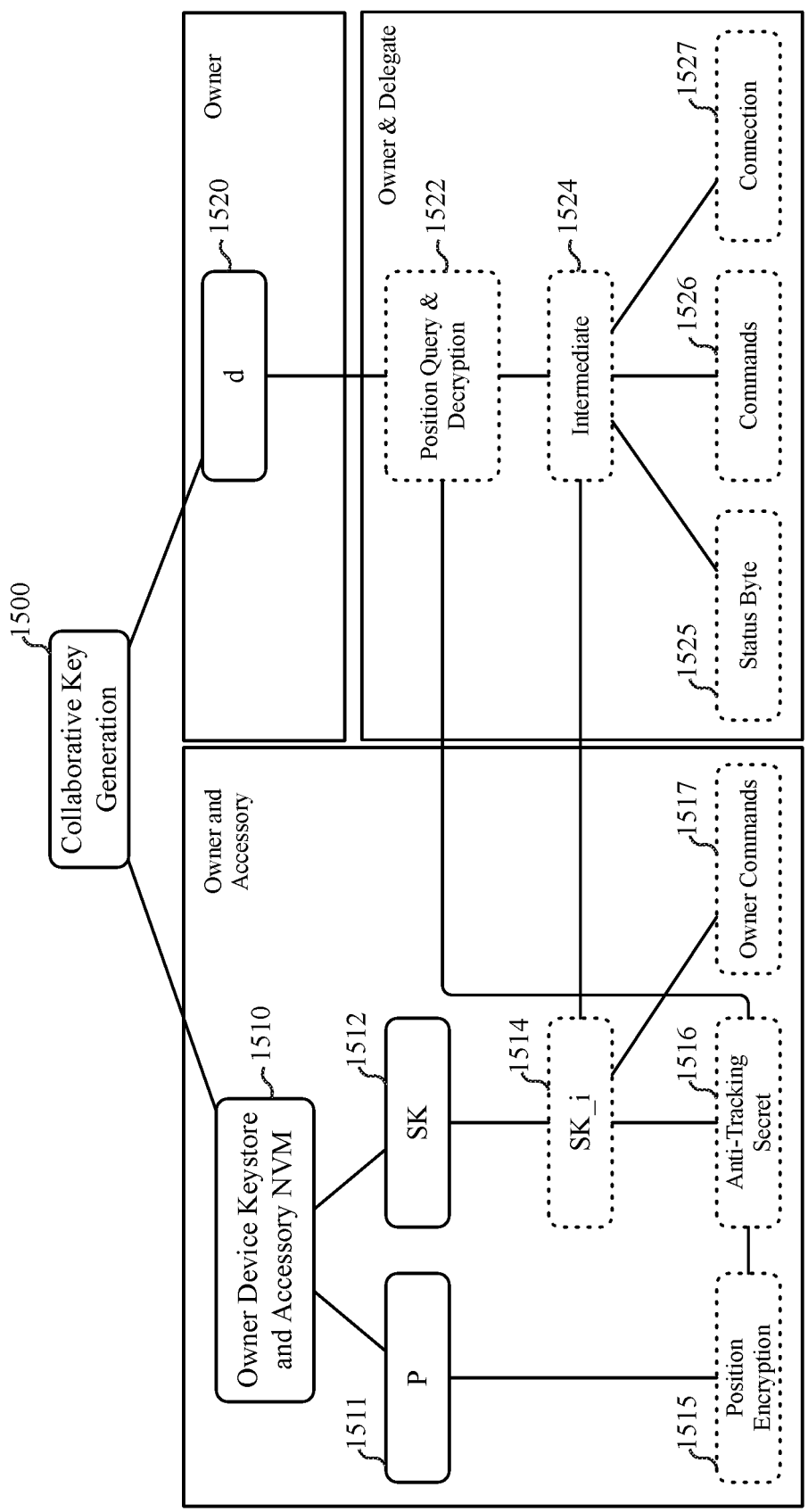
FIG. 15 illustrates a key hierarchy for collaborative key generation, according to an embodiment.

FIG. 15 illustrates a key hierarchy 1500 for an encryption scheme described herein. The key hierarchy includes three sets of keys. A first set of keys is stored on the owner and accessory devices. A second set of keys is stored on the owner device. A third set of keys is stored on the owner device and any potential delegate devices. Each set of keys may be stored securely on the respective devices, with the keys being encrypted during storage. In one embodiment the first set of keys are held in a storage object 1510 that is stored to the owner device keystore and the non-volatile memory of the accessory device. The first set of keys include a public key 1511, a secret key 1512, and derivatives of those keys. A second set of keys includes a device key 1520 that is stored only on the owner device. The third set of keys includes position query and decryption keys 1522, intermediate keys 1524, status byte keys 1525, command keys 1526, and connection keys 1527, which may be delegated to a delegate device.

The public key 1511 is used to derive further keys that are broadcast with a wireless beacon and encrypt location data for the accessory. The public key 1511 cannot be used directly, as direct use of the public key may allow observers to track the accessory. Thus, diversified position encryption keys 1515 are derived based on a set of anti-tracking secrets 1516. The anti-tracking secrets 1516 are derived from a set of diversified secret keys 1514. The diversified secret keys 1514 are derived from the secret key 1512. In one embodiment, the set of diversified secret keys 1514 includes at least one key for each privacy window. The diversified secret keys 1514 can be used to derive a set of anti-tracking secrets 1516 and owner command keys 1517. The anti-tracking secrets 1516 are used to derive the diversified position encryption keys 1515 that are broadcast by the accessory device and used to encrypt the location of the accessory device that is uploaded to a location server by a finder device. The set of diversified position encryption keys 1515, anti-tracking secrets 1516, and owner keys also include at least one key per privacy window.

In one embodiment, device key 1520 can be used to derive a set of position query and decryption keys 1522, which are cryptographically related to the set of diversified position encryption keys 1515, and anti-tracking secrets 1516. The set of diversified secret keys 1514 can also be used to derive the set of intermediate keys 1524. The set of intermediate keys 1524 can be used to derive the set of status byte keys 1525, command keys 1526, and connection keys 1527. As with the diversified position encryption keys 1515, diversified secret keys 1514, anti-tracking secrets 1516, and owner command keys in the first set of keys, each set of keys in the third set of keys (e.g., owner and delegate keys) are derived for specific privacy windows and are only valid during the specific privacy window for which those keys are derived. Collaborative key generation can be used to generate the public key 1511, secret key 1512, and device key 1520, with the privacy window keys derived based on the collaboratively generated keys.

Collaborative Key Generation Process

Figure 16:
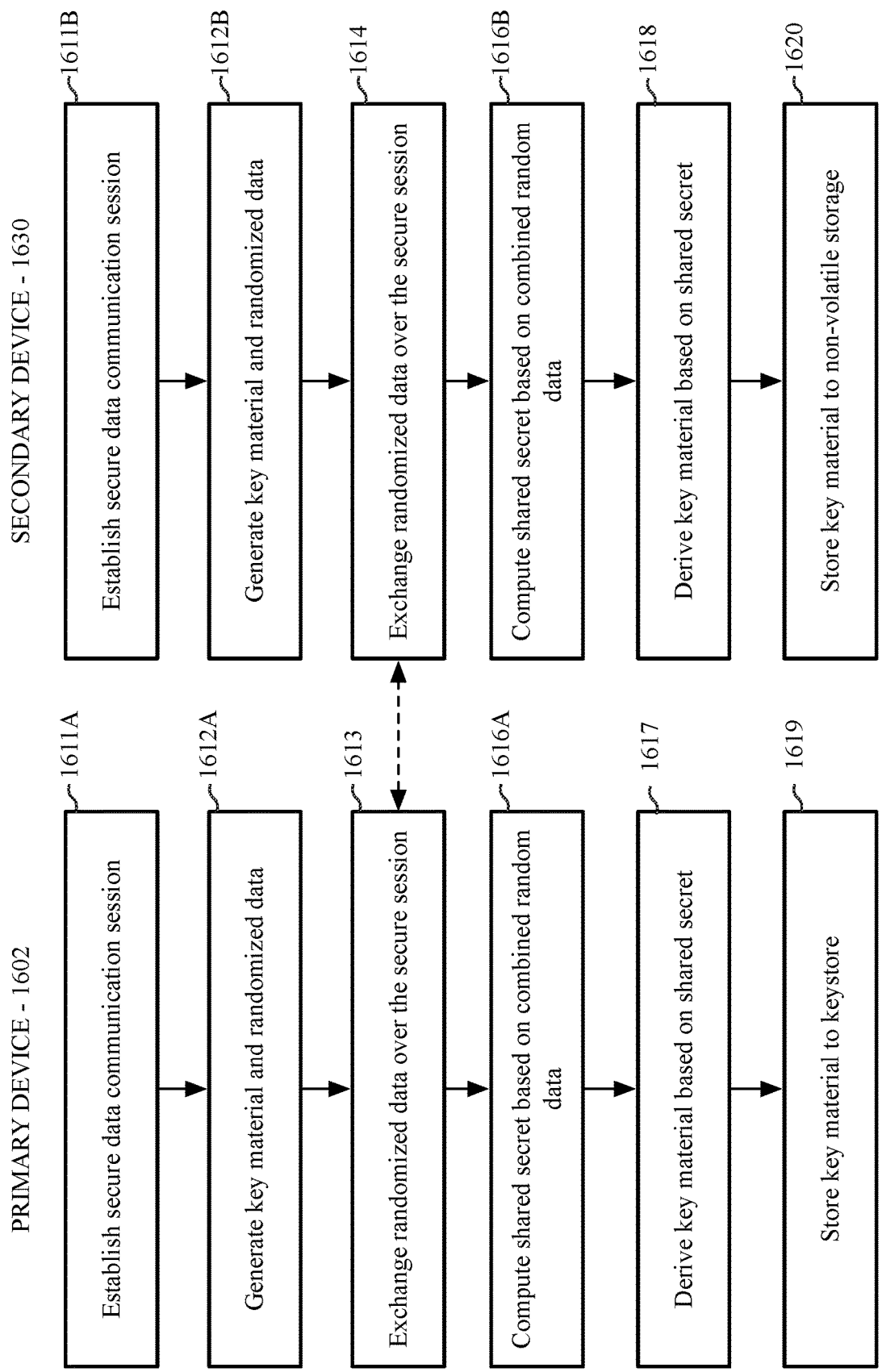
FIG. 16 illustrates a process of collaborative key generation, according to an embodiment.

FIG. 16 illustrates a process of collaborative key generation, according to an embodiment. In one embodiment, collaborative key generation can be performed by a primary device 1602 and a secondary device 1630. The primary device 1602 can be an owner device, for example, the user device 1402 as in FIG. 14, or equivalent devices described herein. The secondary device 1630 can be, for example, the wireless accessory 1430 as in FIG. 14, or equivalent devices described herein.

During collaborative key generation, the primary device 1602 and the secondary device 1630 collaboratively generate key pair $\{d, P\}$ and secret key SK. During the process, the secondary device 1630 is unable to learn private key d and neither device can bias P or SK. The collaborative key generation process also prevents the primary device 1602 from having full control over the secret key SK and key pair $\{d, P\}$, which an adversary could exploit by extracting secrets from one device to reprogram those onto another legitimate device.

In one embodiment, the primary device 1602 and the secondary device 1630 can perform operations 1611A-1611B to establish a secure data communication session. The secure data communication session can be a secure Bluetooth connection, which is established via an exchange of secret data via an out-of-band (OOB) mechanism, such as a password, identification number, or an NFC data exchange. The secure data communication session can also be established via a wired connection, such as via an accessory interface cable that connects the primary device 1602 and the secondary device 1630.

The devices can then perform operations 1612A-1612B to generate key material and randomized data. In one embodiment, the secondary device 1630, during operation 1612B, can generate a P-224 elliptic curve scalar value s and a random value r. During operation 1612A, the primary device 1602 can generate a P-224 elliptic curve scalar value s' and a 32-byte random value r'. The primary device can additionally compute a value $S'=s'\cdot G$, where G is the elliptic curve generator parameter.

The primary device 1602 and the secondary device 1630 can then perform operation 1613 and operation 1614 to exchange randomized data over the secure session. During operation 1613, the primary device 1602 can send $\{S', r'\}$ to the secondary device 1630, which in one embodiment is an 89-byte transfer. During operation 1614, the secondary device 1630 can send a commitment value to the primary device 1602, where commitment=Hash(s||r). In one embodiment, commitment is a 32-byte value. The secondary device 1630 can also send values $\{s,r\}$ to the primary device 1602.

The primary device 1602 and the secondary device 1630 can then perform operations 1616A-1616B to compute shared secret data based on combined random data. The secondary device 1630 can compute $P=S'+s\cdot G$. The primary device 1602 can confirm that commitment=Hash(s||r). The primary device 1602 can also compute $d=s'+s \pmod{q}$ and $P=d\,G=(s'+s)\,G=s'\,G+s\cdot G=S'+s\cdot G$. Both the primary device 1602 and the secondary device 1630 can then compute shared secret key SK=KDF(x(P), r||r'). In one embodiment, |SK|=32 bytes. The primary device 1602 and the secondary device 1630 can then derive key material based on the shared secret in operation 1617 and operation 1618. The primary device 1602 can store key material to a keystore, such as a shared cloud keystore, in operation 1619. The secondary device 1630 can store key material to local non-volatile storage in operation 1620.

In one embodiment, the devices can derive key material based on the secret key using the techniques described below. The secondary device 1630 can derive $SK_i$ for period i=⌋counter/N⌊ where counter is the current value of an internal counter and N is the number of seconds for each privacy window. For example, for a 15-minute privacy window, N=900. The owner device can derive $SK_i$ by setting either $$i = \left\lfloor \frac{UT_{lookup} - UT_{NVM}}{N} \right\rfloor; i = \left\lfloor \frac{UT_{now} - UT_{NVM}}{N} \right\rfloor; \text{ or}$$

$$i = \left\lfloor \frac{UT_{delegate} - UT_{NVM}}{N} \right\rfloor,$$

where $UT_{lookup}$ is the time corresponding to the period that position reports should be retrieved for, $UT_{now}$ is the current time, and $UT_{delegate}$ is the delegation period that a delegate is allowed to control the secondary device 1630. $UT_{NVM}$ refers to the time when the secondary device 1630 was provisioned by the primary device 1602, which can be retrieved from the non-volatile memory of the secondary device 1630. In one embodiment the primary device 1602 can set $SK_0=SK_{NVM}$ and compute $SK_{j+1}=KDF$ ($SK_j$, "update") for j=0, . . . , i−1, where $|SK_x|=32$ bytes for any x, although the size of each key can vary across embodiments.

Using diversified secret key $SK_i$, owner command key $OK_j$ and anti-tracking secret $AT_i$ can be generated. In one embodiment, $OK_j=KDF$ ($SK_i$, "owner"). Additionally, $AT_i=(u_i, v_i)=KDF$ ($SK_i$, "diversify"), where ($u_i$, $v_i$) represent coordinates of an elliptic curve point. In one embodiment, $AT_i$ is a 72-byte secret, although the size can vary across embodiments.

Diversified public key $P_i$ is a diversified version of public key P. $P_i$ can be derived without knowledge of private device key d and can be used instead of P as the position encryption key to prevent long term tracking of the secondary device 1630. Where $AT_i=(u_i, v_i)$, $P_i=u_i \cdot P + v_i \cdot G$. In one embodiment, $u_i$ and $v_i$ are turned into valid scalars per FIPS 186-4, B.5.1 Per-Message Secret Number Generation Using Extra Random Bits. For example, $u_i:=(u_i \bmod (n-1))+1$ and $v_i:=(v_i \bmod (n-1))+1$ with n being the order of base point G, as defined for P-224.

Diversified key $d_i$ is the diversified private key d and can be passed to delegates without revealing d. Having $AT_i$ and $SK_i$, the primary device 1602 can compute $d_i=(d \cdot u_i+v_i)$. A set of $d_i$ keys can be provided to a delegate device. The delegate device can then compute $P_i=d_i \cdot G$. The primary device 1602 and the delegate can use $P_i$ to query the location of the secondary device 1630 at a location server.

Intermediate key $IK_i=KDF$ ($SK_i$, "intermediate") can be computed by the primary device 1602 and shared with a delegate without revealing private key d. The delegate (and the primary device 1602) can compute status byte key $BK_i$, command key $CK_i$, and connection key $LTK_i$. $BK_i$ is the encryption key used to protect secrets transmitted via the status byte, which is broadcast by the secondary device 1630 while beaconing, where ($BK_i$, $BIV_i$)=KDF ($IK_i$, "status"). $CK_i$ is the command key used to ensure authenticity of commands send to the secondary device 1630, where $CK_i=KDF$ ($IK_i$, "command"). $LTK_i$ is the connection key that is used to establish a connection to the secondary device 1630, where $LTK_i=KDF$ ($IK_i$, "connect"). In one embodiment, each key is a 32-byte key and $BIV_i$ is a 16-byte value, although the sizes may vary across embodiments.

Entry into Near Owner State

Figure 17:
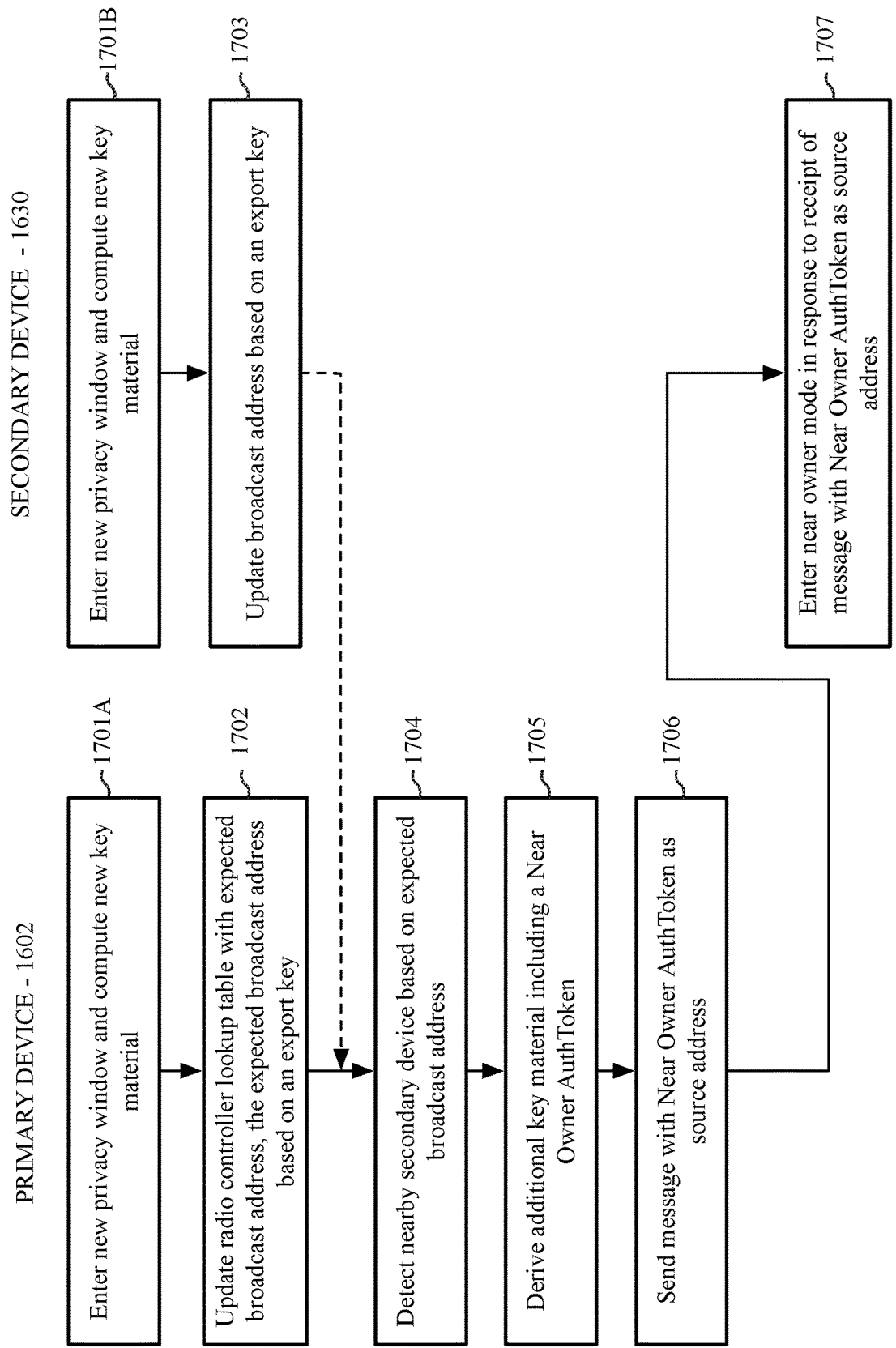
FIG. 17 is a flow diagram of a process of entering a near owner state at a secondary device, according to an embodiment.

FIG. 17 is a flow diagram of a process of entering a near owner state at a secondary device, according to an embodiment. In one embodiment, a primary device 1602 can place a secondary device 1630 into a near owner state when the primary device 1602 detects the nearby presence of the secondary device 1630. In one embodiment, the secondary device 1630 is placed into the near owner state before certain commands may be issued. The secondary device 1630 can be placed into the near owner state using a token that is derived in part based on a command key $CK_i$ and a diversified public key $P_i$.

In one embodiment, the primary device 1602 and secondary device 1630 can perform operations 1701A-1701B to enter a new privacy window and compute new key material. The primary device 1602 and secondary device 1630 can each compute new key material for privacy window i from keys P, SK, or d as described above.

The primary device 1602 can perform an operation 1702 to update a radio controller lookup table with an expected broadcast address. The expected broadcast address can be based on an export key. The secondary device 1630 can perform an operation 1703 to update a broadcast address based on the export key. The primary device 1602 and the secondary device 1630 can derive the export key based on the computed key material for the privacy window.

In one embodiment, the export key is a reduced-bit representation of the diversified public key $P_i$. The reduced-bit representation can be a compressed or compacted representation of the diversified public key that stores a reduced number of elliptic curve coordinates. In one embodiment, the export key is compacted representation $x(P_i)$, where $|x(P_i)|=28$ bytes, where only the x coordinate of an elliptic curve point is provided. In one embodiment, an indicator for which of the two valid y coordinates that corresponds with the x coordinate may also be provided.

In one embodiment, the broadcast address of the secondary device 1630 is updated by encoding bytes of the export key into the hardware address of the secondary device, for example, by setting the most significant set of bytes of the hardware address to the corresponding bytes of the export key. The primary device 1602 can then update a radio controller (e.g., Bluetooth Controller) lookup table to look for the updated hardware address.

The primary device 1602 can perform an operation 1704 to detect a nearby secondary device based on an expected broadcast address. The primary device 1602 can then perform an operation 1705 to derive additional key material, which can include a near owner authorization token. In one embodiment a 1:1 mapping exists between a diversified public key $P_i$ and a corresponding near owner authorization token, allowing the tokens to be precomputed for multiple privacy windows. In such embodiment, a near owner authorization token for the privacy window can be derived as:

NearOwnerAuthToken$_i$=MostSignificant6Bytes(MAC ($CK_i,x(P_i)$||"NearOwnerAuthToken"))

The primary device 1602 perform an operation 1706 to send a message with the near owner authorization token as the source address. In one embodiment the message is a Bluetooth network packet that is sent with the near owner authorization token as the Bluetooth source hardware address. The secondary device 1630 can then enter near owner mode in response to receipt of message with near owner authorization token as the source address.

Connection and Command Tokens

Figure 18:
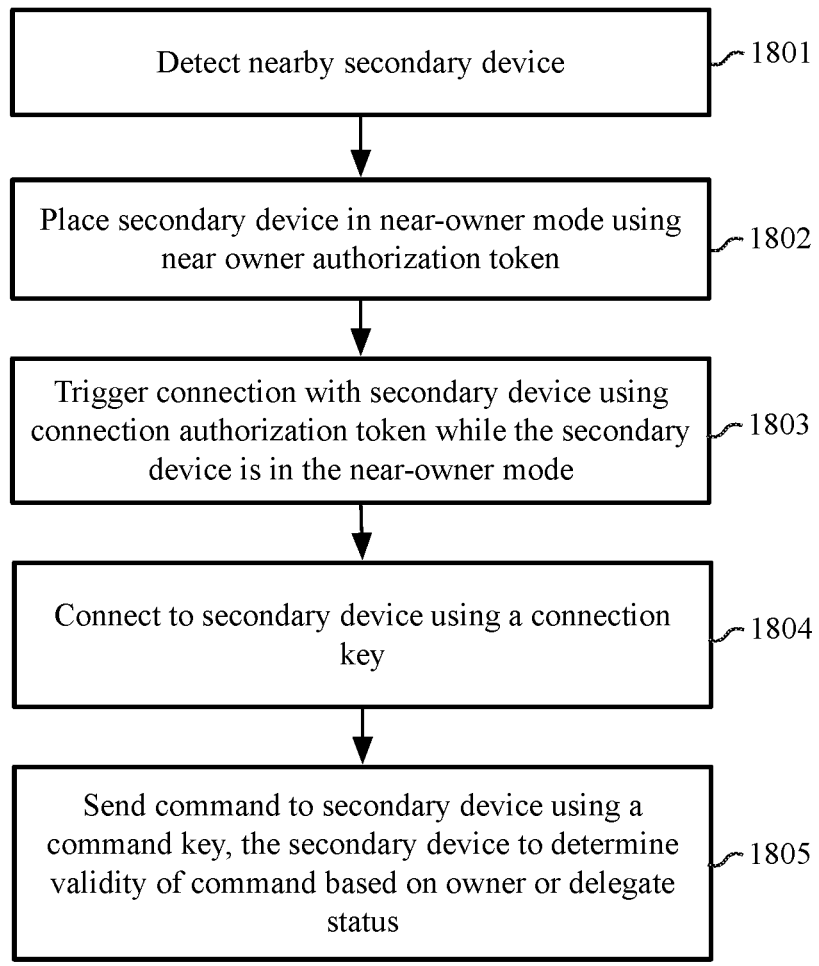
FIG. 18 is a flow diagram of a process to connect to and command a secondary device, according to an embodiment.

FIG. 18 is a flow diagram of a process to connect to and command a secondary device, according to an embodiment. The process can be performed by a primary device to connect to and command a secondary device in a manner that is secured by the keys and tokens described herein.

In one embodiment, a primary device can perform an operation 1801 to detect a nearby secondary device. For example, the primary device can detect a secondary device that is within wireless range. The secondary device can be a paired secondary device. During operation 1802, the primary device can place the secondary device in near owner mode using a near owner authorization token. The primary device can detect a nearby secondary device and place the secondary device in near owner mode as described above with respect to FIG. 17.

The primary device can then perform an operation 1803 to trigger a connection with the secondary device using a connection authorization token while the secondary device is in the near owner mode. The primary device and the secondary device can each compute a connection authorization token as:

$$\text{ConnectionAuthToken}_i = \text{MostSignificant6Bytes}(\text{MAC}(CK_p, x(P_i) \| \text{``ConnectionAuthToken''}))$$

In the above equation, MAC refers to a message authentication code. The secondary device can place ConnectionAuthToken$_i$ into the wireless controller lookup table. The primary device can send a connection request from a hardware address equal to ConnectionAuthToken$_i$, triggering a connection request. The primary device can then perform an operation 1804 to connect to the secondary device using a connection key. For example, the primary device and the secondary device can establish a wireless connection, such as but not limited to a Bluetooth connection, using connection key LTK$_i$. In one embodiment, to prevent repeated battery-draining attacks using an incorrect LTK$_i$, responses to tokens may be rate-limited.

The primary device can then perform an operation 1805 to send a command to secondary device using a command key. Some commands can only be issued by an owner device using an owner command key OK$_i$. For such commands, the owner device can send a command to the secondary device via a command composed as:

$$\text{send<command>} \| \text{MAC}(OK_p, x(P_i) \| \text{``OwnerCommand''} \| \text{<command>} \| \text{<counter>})$$

In the command composition, counter is a 32-bit integer that monotonically increases with every valid owner command sent to the secondary device. The counter value may be reset each privacy period. The primary device and the secondary device each keep track of the counter value. In one embodiment, if the secondary device receives a command with an invalid hardware address, the secondary device will discard the command, not increment the counter value, and terminate the connection. While authenticated commands that use a command key are described, some commands may be non-authenticated commands that do not require the presence of a command key. A device can support both authenticated and non-authenticated commands. In one embodiment, some commands may be authenticated or non-authenticated depending on the state of the secondary device.

In one embodiment, the secondary device can determine the validity of the command in part based on an owner or delegate status associated with the primary device and whether the primary device has the proper keys for the attempted command. Delegation is described in further detail below.

Delegation of Functionality to a Delegate Device

Figure 19:
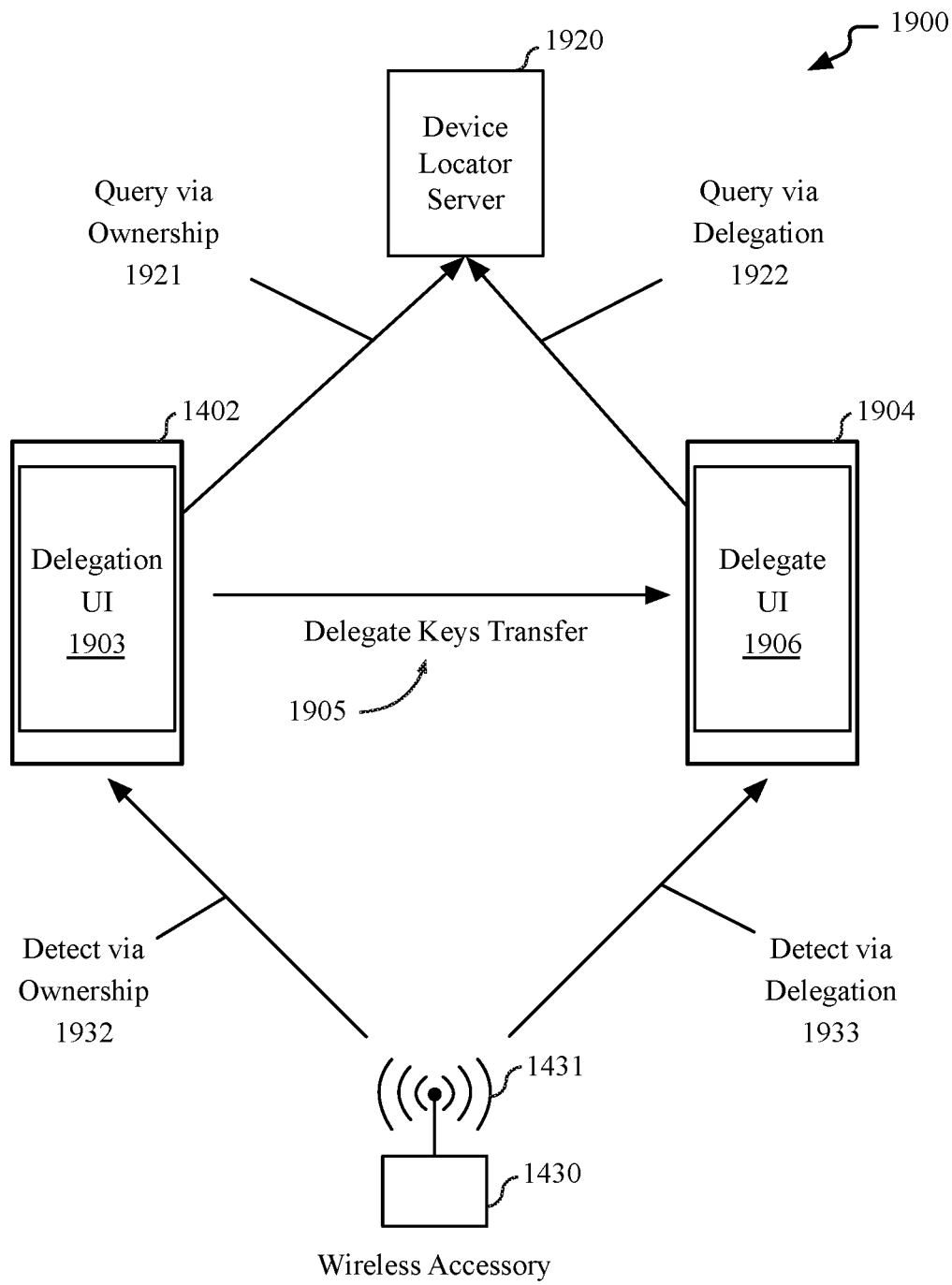
FIG. 19 illustrates a system in which access to a wireless accessory can delegated to a user for a period of time.

FIG. 19 illustrates a system 1900 in which access to a wireless accessory can delegated to a user for a period of time. In one embodiment the system 1900 includes an owner device 1402, a delegate device 1904, a device locator server 1920, and a wireless accessory 1430. The owner device 1402 and delegate device 1904 can each be a variant of mobile device 102 as described herein. The wireless accessory 1430 can be a variant of wireless accessory 201 as described herein. The device locator server 1920 can be a variant of location device server 203 as described herein. The wireless accessory 1430 may also be a generic secondary device 1630 as depicted in FIG. 16.

A user of the owner device 1402, via a delegation UI 1903, can delegate all or a subset of ownership features to the delegate device 1904 via a transfer 1905 of delegate keys. Delegation can be performed by the owner device 1402 by generating keys in the third set of keys (owner & delegate keys) depicted in FIG. 15 for a predetermined number of privacy windows and providing those keys to the delegate device 1904 via the transfer 1905 of delegate keys. The transferred delegate keys can enable the delegate device 1904, via a delegate UI 1906, to perform a set of operations including but not limited to tracking, accessing, using, or controlling the wireless accessory 1430. For example, the delegate keys can be used to derive additional keys that can allow the delegate device 1904 temporary use of the wireless accessory 1430 in the same manner as the owner device 1402. Alternatively, specific features can be delegated to the delegate device 1904. For example, the owner device 1402 can delegate to the delegate device 1904 the ability to detect 1933 the wireless accessory via a beacon signal 1431 transmitted by the wireless accessory 1430 in the same manner in which the owner can detect 1932 the wireless device. The owner device 1402 can also delegate the ability to query 1922 a location of the wireless accessory 1430 via the device locator server 1920 in the same manner as the owner device 1402 can query 1921 the location of the wireless accessory 1430.

The specific functionality that is delegated to the delegate device 1904 can be determined in part based one the specific keys that are provided to the delegate device 1904. For example, and with reference to FIG. 15, position query and decryption keys 1522 can be delegated to enable the delegate to perform position query and decryption of a secondary device location. Delegation of the intermediate key 1524 may enable a delegate to derive status byte keys 1525, command keys 1526, and connection keys 1527. Alternatively, individual functionality can be delegated by providing individual keys.

Figure 20:
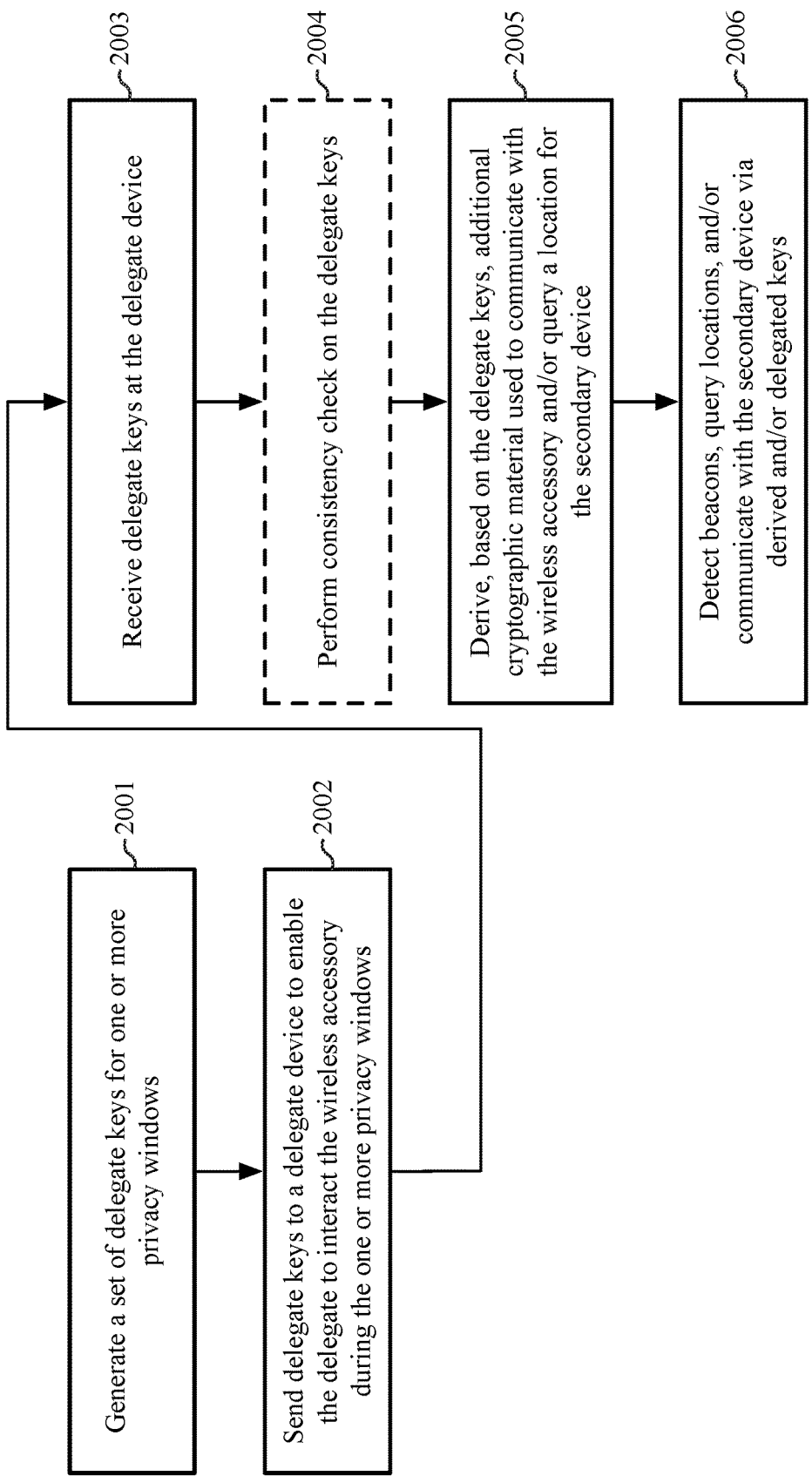
FIG. 20 is a flow diagram of a process to delegate functionality to a delegate device, according to an embodiment.

FIG. 20 is a flow diagram of a process to delegate functionality to a delegate device, according to an embodiment. In one embodiment, an owner device 1402 can perform an operation 2001 to generate a set of delegate keys for one or more privacy windows, as described in further detail above. The owner device 1402 can then perform an operation 2002 send delegate keys to a delegate device 1904 to enable the delegate to interact with the wireless accessory during the one or more privacy windows. The functionality to be delegated to the delegate device 1904 can be determined at least in part based on the specific keys that are generated and provided to the delegate device.

The delegate device 1904 can then perform an operation 2003 to receive delegate keys at the delegate device. The delegate device can optionally perform a consistency check operation 2004 to verify that the delegate keys are valid. The consistency check operation 2004 can include performing a consistency check to ensure that the keys have not been corrupted. Where an elliptic curve cryptosystem is in use, the consistency check can include performing cryptographic verification to ensure that the keys define valid elliptic curve points.

The delegate device 1904 can then perform an operation 2005 to derive, based on the delegate keys, additional cryptographic material used to communicate with the secondary device accessory and/or query a location for the secondary device. The additional cryptographic material can include child-keys in the key hierarchy (e.g., status byte, command, or connection keys based on an intermediate key). If such keys are directly provided, the additional cryptographic material may also include tokens that are used to communicate with or command the secondary device to which access is delegated.

The delegate device 1904 can then perform an operation 2006 to detect beacons, query locations, and/or communicate with the secondary device via the derived and/or delegated derived keys. In some embodiments, a delegate device 1904 can perform a subset of the operations of a primary device described herein (e.g., primary device 1602). Individual functions can be delegated, where those delegated functions are defined at least in part based on the delegated keys. Delegated functionality is valid only for the privacy windows for which keys are provided. In one embodiment, some command functionality cannot be delegated. For example, unpairing and repairing may be limited only to owner devices and cannot be delegated.

In one embodiment, functionality that may be delegated includes the ability to track or find a secondary device. A delegate may be able to find a device for a period of time, while not being able to locate or track the device outside of a delegation period. In one embodiment, functionality can be delegated for a secondary device while explicitly excluding the ability to track the secondary device via a location server during the delegate period, although the delegate may be able to locate the device if the device is nearby. In one embodiment, a user associated with an online account that has been designated as a parent account may automatically be delegated the ability to locally or remotely locate a secondary device associated with an online account that has been designated as a related child account. In one embodiment, the ability to remove a secondary device from a "lost" state may be delegated.

In one embodiment, the ability to mute a tracking alarm associated with a secondary device may be delegated. For example, in one embodiment a primary device as described herein can be configured to notify a user of the device if a secondary device that is not owned by or delegated to the primary device appears to be following the primary device, for example, if an un-owned or un-delegated secondary device is persistently detected, particularly while in motion. In such embodiment, the primary device can be configured to notify the user of the persistent and/or multi-location presence of such a secondary device. Such notifications can be used to notify the user of potential surreptitious tracking of a user via a hidden secondary device (e.g., by placing a beaconing wireless device within a bag of a user). However, scenarios may arise in which a beaconing secondary device may be legitimately following the user. For example, a secondary device within or attached to the bag of another individual (e.g., child, passenger) within a vehicle may trigger the tracking notice. The ability to mute such notices may be delegated, such that tracking warnings will not be received for such devices.

Secondary Device Recovery

Figure 21A:
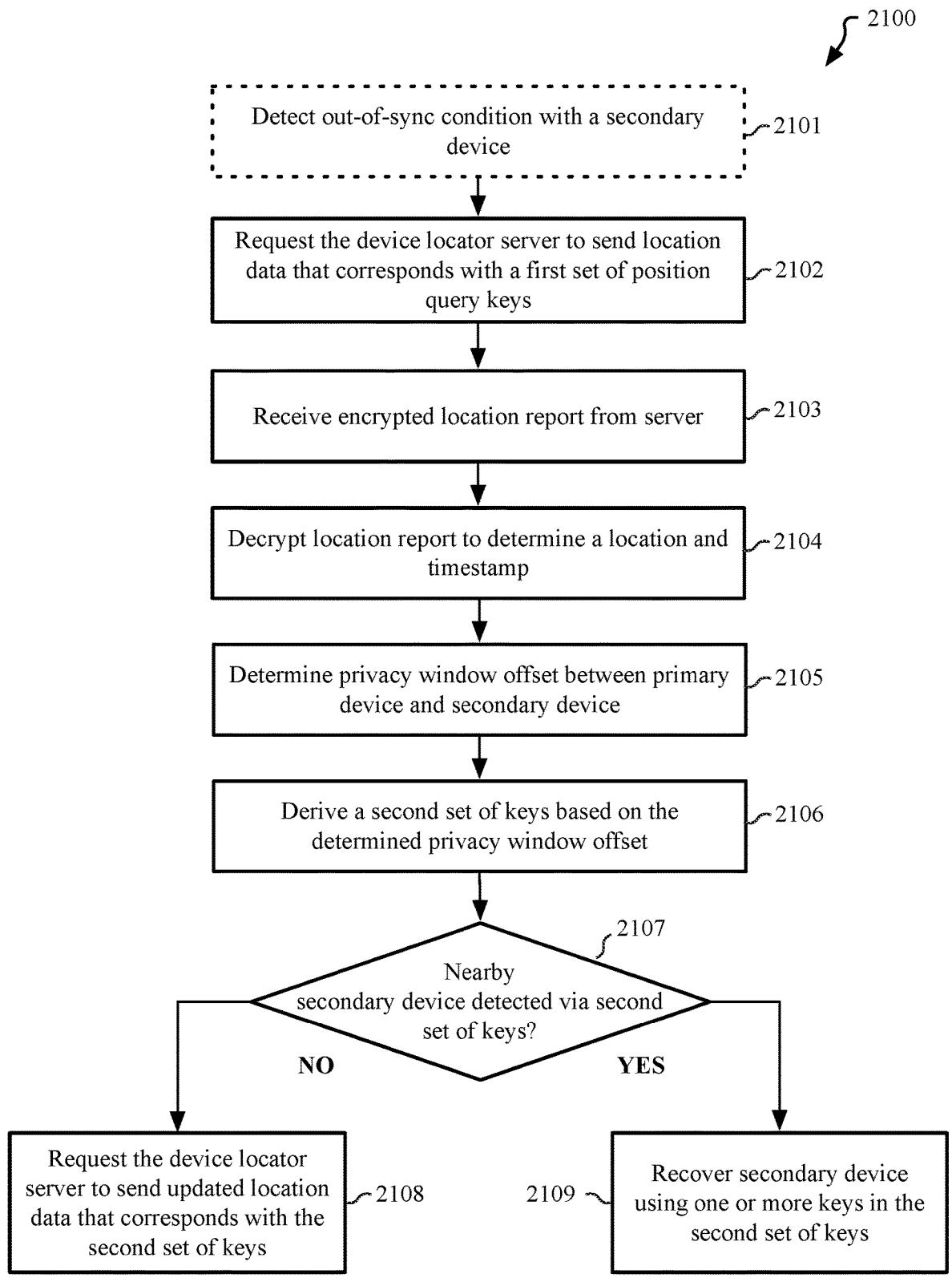
FIG. 21A-21B illustrate methods to recover an out-of-sync secondary device, according to embodiments.
Figure 21B:
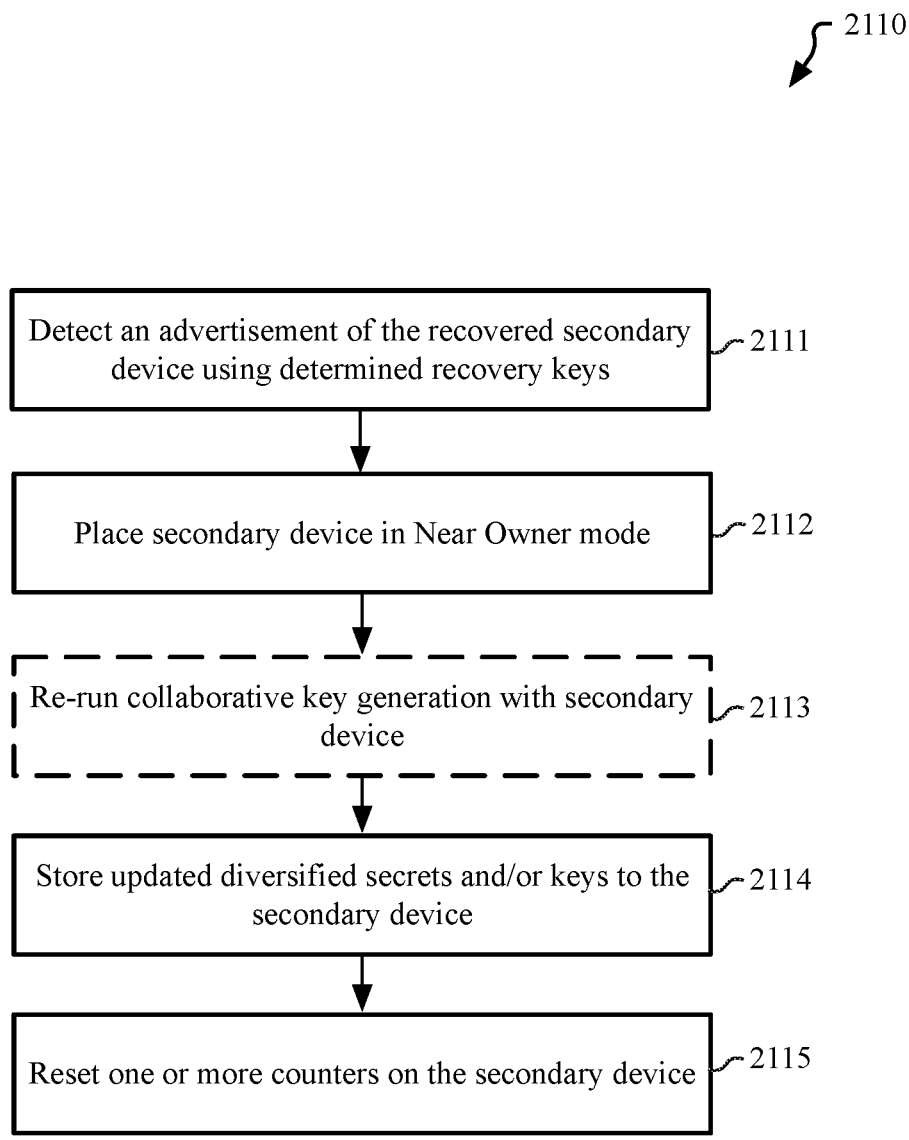

FIG. 21A-21B illustrate methods 2100, 2110 to recover an out-of-sync secondary device, according to embodiments. If the secondary device runs out of battery or has its battery removed, the internal counters within the device may stop incrementing. The counters of the secondary device may resume incrementing when the battery is re-charged or re-inserted. Accordingly, the counter on the secondary device that is used to generate keys for each privacy window may fall out-of-sync with the primary device. To recover an out-of-sync secondary device, the primary device can determine the current counter value of the secondary device, re-sync with the privacy window of the secondary device, and then recover the secondary device by resetting the secret key stored on the device. FIG. 21A shows a method 2100 of re-syncing with a privacy window of an out-of-sync secondary device. FIG. 21B shows a method 2110 of recovering the secondary device after re-syncing to the privacy window of the secondary device.

As shown at FIG. 21A, a primary device can optionally perform an operation 2101 to detect an out-of-sync condition with the wireless accessory. In one embodiment, operations 2101 can be performed by detecting the nearby presence of a valid secondary device to which the primary device is paired but which the primary device cannot connect to or directly command the keys associated with the current privacy window. In one embodiment, the primary device can detect (or assume) the presence of a potential out-of-sync condition, via stored status byte information. For example, if the primary device detects that that the secondary device entered a critically low-power state before going offline or becoming undetected for a period of time, the primary device may set an internal flag that indicates that the diversified cryptographic material on the secondary device may be broadcasting out-of-sync with the diversified cryptographic material for the primary device due to out-of-sync privacy windows caused by the out-of-sync counters.

At whatever point the secondary device is re-powered and begins broadcasting, finder devices can upload location data to a location server. The location data may have a timestamp associated with privacy window i (e.g., a current window) but may be indexed by an out-of-sync diversified public key $P_j$. The primary device can re-sync with the secondary device via location records for the device that are uploaded by finder devices. The primary device can gather this data by requesting location records from the location server until location data corresponding with a requested position query key is returned. The requests may be batched or successive, depending on the configuration of the device location server.

In one embodiment, the primary device can perform an operation 2102 to request the device locator server to send location data that corresponds with a first set of position query keys. The first set of position query keys can be the set of keys associated with privacy window and/or counter range that begins at the current privacy window and extends back to privacy window x, where in one embodiment, privacy window x corresponds with the last known window in which the secondary device was located or detected. The primary device can then perform an operation 2103 to receive an encrypted location report from the device location server, where the encrypted location report corresponds to one of the position query keys. Upon receipt of at least one location report, the primary device can perform an operation 2104 to decrypt the location report to determine a past location for the secondary device and timestamp for the location report.

In one embodiment the primary device can perform operation 2105 to determine a privacy window offset between the primary device and the secondary device. The privacy window offset can be determined based on the difference between the counter for a timestamp associated with a received location report and the counter associated with the privacy window of the keys that encrypt the location report data. For example, if the secondary device location report has a timestamp associated with privacy window i and the location data is encrypted with keys from privacy window j, the counter difference may be determined as (j−i). The primary device can then perform operation 2106 to derive a second set of keys based on the determined privacy window offset. The primary device can then adjust an internal counter by j−i and derive $SK_{recovery}$ based on the adjusted counter. Derivative keys for the second set of keys can be derived based on $SK_{recovery}$.

The primary device can then perform an operation 2107 to determine if a nearby secondary device has been detected via keys via the second set of keys. If the secondary device is not detected nearby, the primary device may perform an operation 2108 to request the device locator server to send updated location data that corresponds with a location query key in the second set of keys, which can enable the user to locate and move closer to the location of the secondary device to attempt recovery. If the secondary device is detected nearby during operation 2107, the primary device can perform an operation 2109 to recover the secondary device using one or more keys (e.g., connection and/or command keys) in the second set of keys. The operation to recover the secondary device can include transmitting a new secret key to the secondary device and/or resetting a counter on the secondary device.

As shown in FIG. 21B, the primary device can begin the method 2110 of recovering the secondary device by performing an operation 2111 to detect an advertisement of the recovered secondary device using the determined recovery keys, for example, the keys based on $SK_{recovery}$ in operation 2106. Alternatively, in one embodiment a dedicated recovery key can be pre-established during pairing and the secondary device may be recovered using the pre-established recovery key. The use of the pre-established recovery key may be limited to a period of time after a user performs a specific operation or activity on the secondary device, such as removing and replacing the battery or pressing a button on the secondary device.

The primary device can detect the advertisement by updating a wireless controller lookup table to search for a beaconing device having a hardware address containing MostSignificant6Bytes(x($P_{recovery}$)). Once the secondary device is detected, the primary device can perform an operation 2112 to place the secondary device in near owner mode a near owner authorization token. In one embodiment the primary device can detect the nearby secondary device and place the secondary device in near owner mode as described above with respect to FIG. 17.

In one embodiment, the primary device and the secondary device can optionally perform operation 2113 to re-run the collaborative key generation process as depicted in FIG. 16. Re-running the collaborative key generation process can further secure the secondary device against compromise against a scenario in which an adversary may have been able to extract material from non-volatile memory of the secondary device while the device was unpowered. The primary device can then perform an operation 2114 to store updated diversified secrets and/or keys to the secondary device. The updated diversified secrets may be based on re-generated key material (e.g., P, SK, d). The primary device can also recover the secondary device by provisioning a new $SK_{NVM}$. The primary device can also perform an operation 2115 to command the secondary device to reset one or more counters. For example, the internal time for the secondary device can be reprogrammed during recovery.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the system can use an instruction set which may be an extension to an instruction set architecture for a particular type of microprocessor. Accordingly, in an embodiment, the system can provide a hardware-accelerated mechanism for performing cryptographic operations to improve the speed of performing the functions described herein using these instruction sets.

Computing System with a Secure Processor

Figure 22:
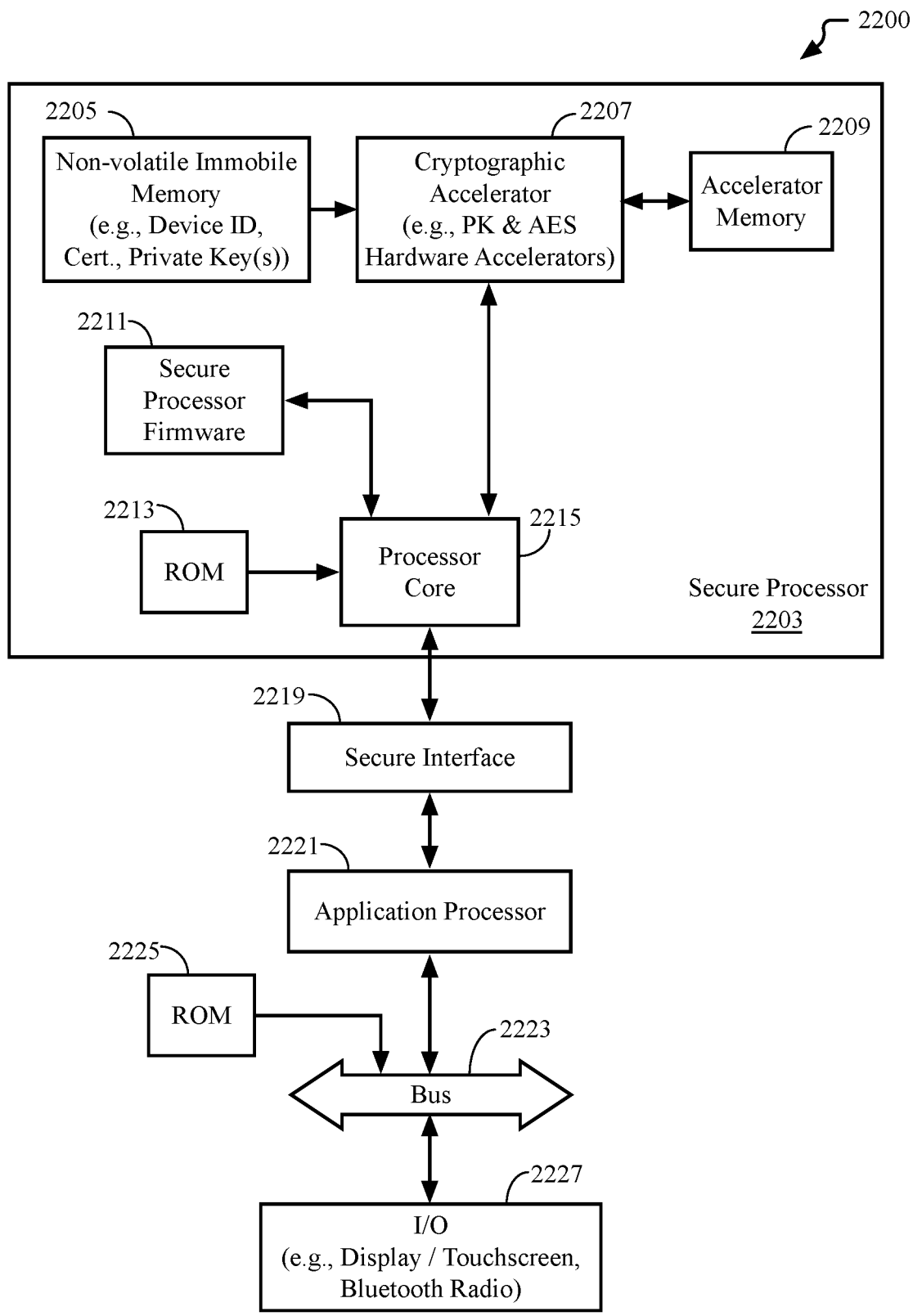
FIG. 22 illustrates a computing system including a secure processor, according to an embodiment.

FIG. 22 illustrates a computing system 2200 including a secure processor, according to an embodiment. In one embodiment the illustrated secure processor 2203 includes logic to accelerate cryptographic operations described herein. The computing system 2200 can enable a device to perform secure accelerated cryptographic operations, to provide secure storage for a subset of private keys, and to enable the encryption of other private keys. A version of the computing system 2200 can be included in a primary device (e.g., smartphone) and a secondary device (e.g., computing device, wearable device, wireless accessory) as described herein.

The computing system 2200 includes an application processor 2221 that is communicably coupled with a secure processor 2203 via a secure interface 2219. The computing system 2200 can be a portion of any of the client devices described herein. Additionally, the computing system 2200 can be included into one or more of the servers described herein. In one embodiment, the secure processor 2203 can be implemented as a system on chip. In another embodiment, the application processor 2221 and the secure processor 2203 can be implemented on a system on chip and include one or more processors and memory controllers and other components on a single integrated circuit.

The secure processor 2203 can perform cryptographic operations as described herein, as well as other system security operations such as encrypting user files or verifying code signatures, processing user passcodes, or performing other security operations. The cryptographic operations can be performed in part by the secure processor core 2215 by executing software stored as firmware 2211 in the secure processor 2203. The secure processor core 2215 can also be coupled to a ROM 2213 which can be trusted software that can validate the software in the firmware 2211 before allowing that firmware to execute by checking a code signature of the firmware and verifying that the signature code indicates that the firmware is valid and has not been corrupted before allowing the firmware to be executed by the secure processor core 2215.

The secure processor 2203 can also include a cryptographic accelerator such as cryptographic accelerator 2207 which can perform asymmetric cryptography as well as symmetric cryptography using a hardware accelerator. The cryptographic accelerator 2207 can be coupled to a memory 2205, which can be a non-volatile and immutable memory that is used to store, in a secure manner, a device identifier or a set of device identifiers and a set of one or more certificates and private keys which are hidden from the rest of the system and are not readable by the rest of the system in one embodiment. The cryptographic accelerator 2207 has access to the private keys and other data within the memory 2205 and access to the memory 2205 is not allowed for components outside of the secure processor 2203. In one embodiment, the cryptographic accelerator 2207 can be coupled to an accelerator memory 2209 which can be a scratch pad memory used to perform the cryptographic operations that are performed by the cryptographic accelerator 2207. The application processor 2221 can be coupled to one or more buses 2223 which are coupled to one or more input and output (I/O) devices 2227, such as a touchscreen display a Bluetooth radio, an NFC radio, a Wi-Fi radio, etc. Other input and output devices can be included. The application processor 2221 is also coupled to an application processor ROM 2225, which provides software to boot the application processor. Similarly, the ROM 2213 provides code to boot the secure processor core 2215 within the secure processor 2203.

Delegate Key Sharing System

Figure 23:
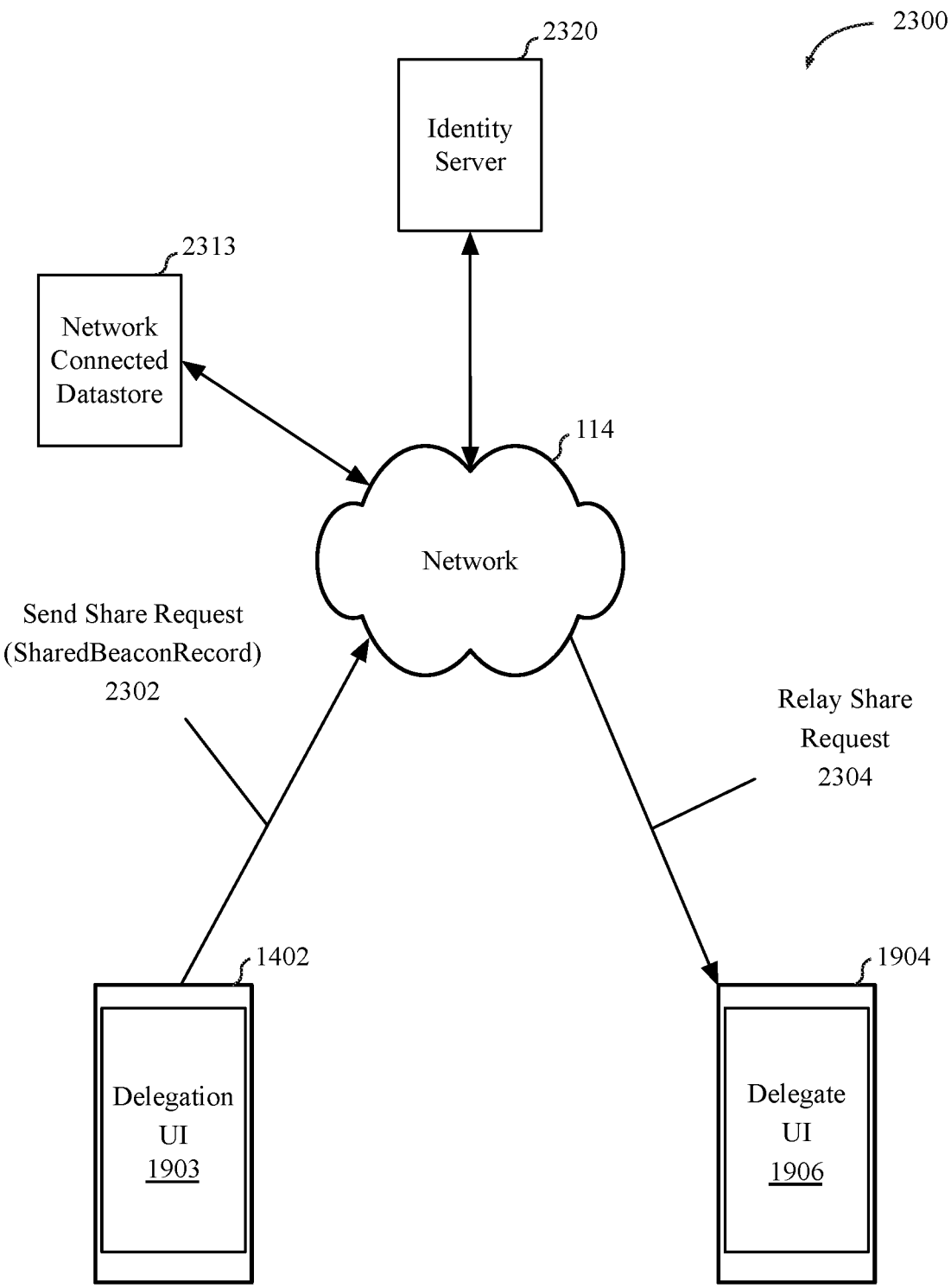
FIG. 23 illustrates a system to enable the sharing of delegate keys via a cloud storage system.

FIG. 23 illustrates a system 2300 to enable the sharing of delegate keys via a cloud storage system. System 2300 includes a network 114 that enables communication between an owner device 1402 and a delegate device 1904 to which keys may be shared to enable the delegate device to perform actions with a wireless accessory. The owner device 1402 and delegate device 1904 can configure a key sharing arrangement by which pre-computed delegate keys can be shared. System 2300 also includes a network connected datastore 2313 that can be used to store a record of the key sharing arrangement and an identity server 2320 that enables the owner device 1402 and delegate device 1904 to be located via the network 114 using identity handles for accounts associated with the devices. While network 114 is a wide-area network, such as the internet, communication between the owner device 1402 and the delegate device 1904 may also take place over a local network.

The identity server 2320 includes one or more networked server devices that provide services related to acquiring information relating to users, user accounts, and/or devices associated with users and user accounts. When the owner device 1402 and delegate device 1904 connect to the network 114, the devices can register with an identity management infrastructure that includes the identity server 2320 to receive an encrypted identification token for the device. The identification token can be based on one or more user or account identifiers and a unique entity or device identifier, which can be combined to generate an entity or device token that at least quasi-uniquely identifies each device. The identification token can be used by the owner device 1402 and delegate device 1904 to register for various services provided via the identity management infrastructure. The identification token for each device can be associated with an online user account associated with the device.

In one embodiment, the owner device 1402 and delegate device 1904 can communicate via a channel established by or routed through the identity server 2320. For example, the devices can send device information request messages to the identity server 2320 to acquire information to enable the transmission of messages to one or more electronic devices associated with a handle. A handle can be an email address, a phone number, and/or another piece of information that can be used to identify a user or to identify an account associated with a user. Using the handle associated with a user or user account, a mobile device can acquire information, such as a push token, that allows the mobile device to contact the set of mobile devices associated with the handle. In one embodiment, the identity server 2320 can also act as a relay for message between the owner device 1402 and delegate device 1904.

The network connected datastore 2313 is a remote storage location that can be used to store data on behalf of the owner device 1402 and delegate device 1904. The network connected datastore 2313 can be a server, a network addressed storage location, a collection of computing devices, or can be part of a cloud storage system that presents virtualized network storage. A shared beacon record can be created that represents the key sharing stream for a wireless accessory having a specified universally unique identifier (UUID). The shared beacon record can be stored on the network connected datastore 2313 and securely shared between the owner device 1402 and delegate device 1904.

In one embodiment the owner device can select a user via the delegation UI 1903 to which a subset of functionality associated with an accessory device (e.g., wireless accessory 1430) will be delegated. The owner device 1402 can then send, via the network 114, a share request message 2302 that includes the shared beacon record. The share request message 2302 can be sent directly to the delegate device 1904 via the network 114, with the network address of the delegate device 1904 being resolved via the identity server 2320. If the owner device 1402 cannot send a direct message to the delegate device 1904, a relay share request 2304 can be sent to the delegate device via the identity server 2320. The user of a delegate device 1904 can accept or decline a sharing offer via a delegate UI 1906. If the sharing offer is accepted, the shared beacon record, which is stored to the network connected datastore 2313, can be marked as accepted and used to track the sharing arrangement.

Figure 24:
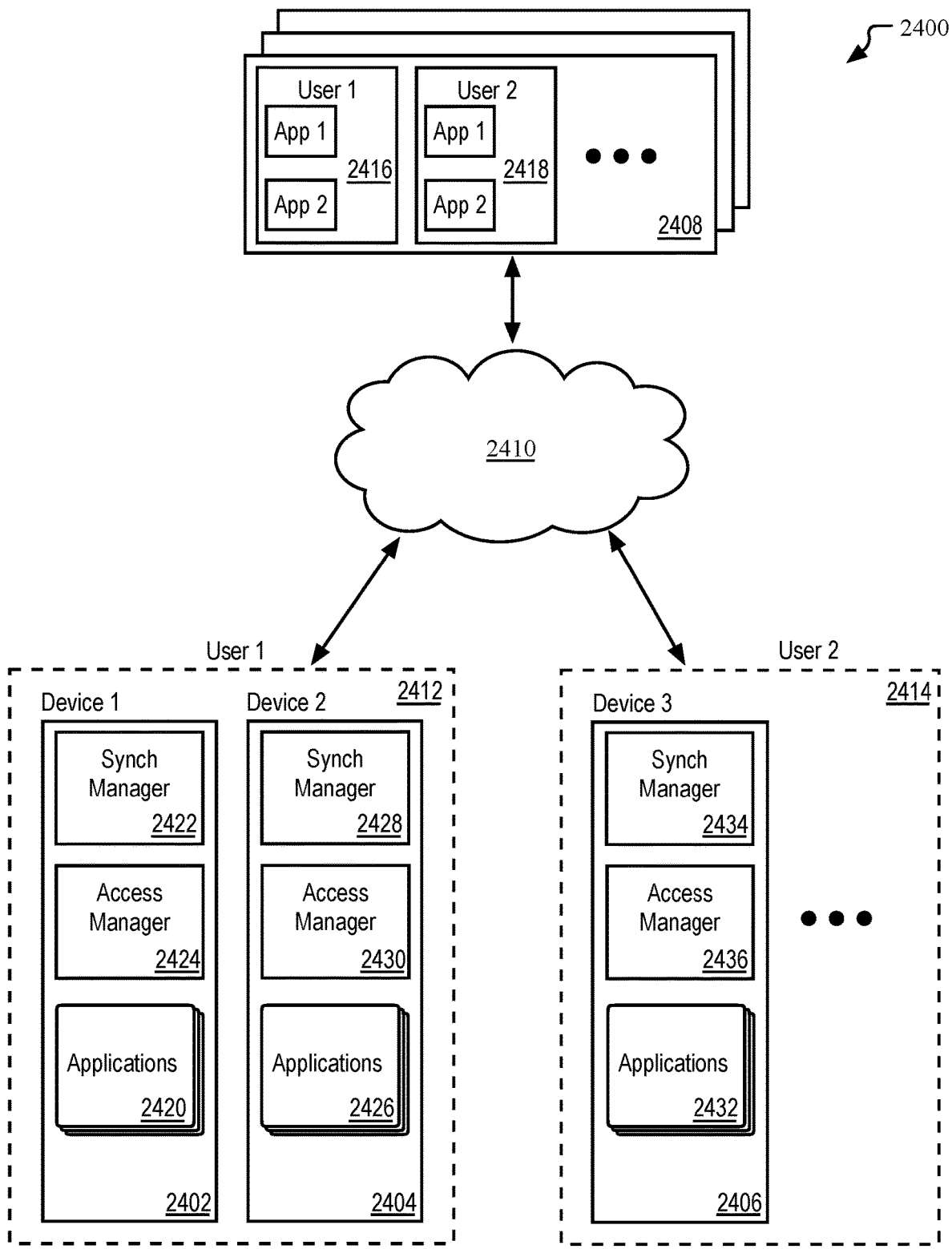
FIG. 24 is a diagram illustrating a system for securely storing data items, according to an embodiment.

FIG. 24 is a diagram illustrating a system 2400 for securely storing data items, according to an embodiment. The system 2400 includes a first device 2402, a second device 2404, a third device 2406, and a remote storage location 2408. The first device 2402, second device 2404, third device 2406, and remote storage location 2408 are communicatively coupled together using one or more networks 2410. The one or more networks 2410 can include an instance of the wide area network 114 described herein and can include both wired and wireless networks. The network 2410 can be, for example, part of a local area network, or a wide area network such as the Internet. The system 2400 can be used to enable devices to share beacon records associated with a key sharing arrangement between an owner and delegate device.

The first device 2402, second device 2404, and third device 2406 can each be, but are not limited, to mobile devices and may represent any of owner device 1402 or delegate device 1904. The first device 2402, the second device 2404, and the third device 2406 can include, for example, desktop or laptop computing devices, mobile devices, tablet devices, personal data assistants, wearable devices, or other computing devices. Each of the first device 2402 and the second device 2404 can be associated with a first user or user account 2412. Similarly, the third device 2406, and one or more other devices not shown can be associated with a second user or user account 2414. The remote storage location 2408 can additionally be coupled to many other devices that are associated with one or more different users or different user accounts.

In one embodiment the devices can be associated with the respective users or user accounts by forming an association between a unique or quasi-unique device key or device identifier for each device with a unique or quasi-unique account key or account identifier for each account. For example, a key or device identifier for the first device 2402 and second device 2404 can be associated with a key or account identifier for user or user account 2412. A key or device identifier for the third device 2406 can be associated with a key or user account identifier for user or user account 2414. Such association can be used to enable authenticated access to account-based storage on the remote storage location 2408.

The remote storage location 2408 can be a single storage location or multiple storage locations. For example, a server, a network addressed storage location, a collection of computing devices, or as part of a cloud storage system presenting virtualized network storage.

The remote storage location 2408 includes separate logical containers for storing data from different users/user accounts and application combinations. In some examples, a logical container could be a directory in a file system, a data structure, a database, or another kind of data organizational unit. For example, the first user or user account 2412 can have containers 2416 on the remote storage location 2408, one for each individual application associated with the user or user account. Similarly, the second user or user account 2414 can have containers 2418 for respective applications. Application data items received from individual devices (e.g., the first device 2402) are stored in respective containers for that application. The remote storage location 2408 can include a storage manager that can create and manage containers as well as generate notifications for devices.

The first device 2402 includes one or more applications 2420, a synchronization manager 2422, and an access manager 2424. The one or more applications 2420 can include various types of applications such as productivity applications, system applications, games, etc. Each application can be associated with a unique key or other identifier that can be used to identify the application and to identify particular access permissions of that application. In some implementations, one or more application 2420 is sandboxed such that it is isolated from each other application.

The synchronization manager 2422 manages sending data items to the remote storage location 2408 and receiving information (e.g., data items or notifications) from the remote storage location 2408. The access manager 2424 presents available data items to applications of the applications 2420 in response to a query from the respective applications. The access manager 2424 applies one or more access policies to determine what data items will be visible to a particular application of the applications 2420.

The second device 2404 similarly includes one or more applications 2426, a synchronization manager 2428, and an access manager 2430. The applications 2420 and application 2426 can include one or more of the same applications. The third device 2406 similarly includes one or more applications 2432, a synchronization manager 2434, and an access manager 2436.

Figure 25A:
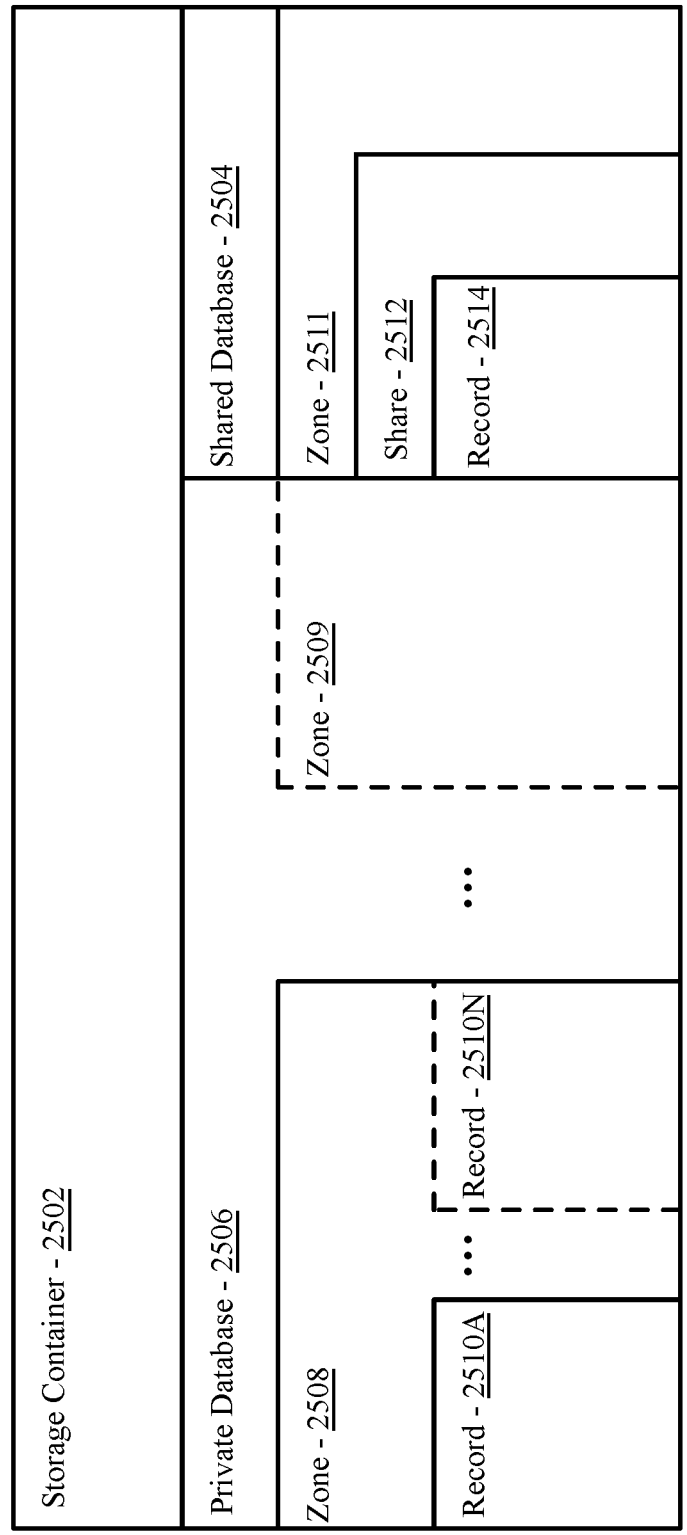
FIG. 25A-25B illustrate storage containers and records of a datastore that can be used to enable key sharing for a wireless accessory.
Figure 25B:
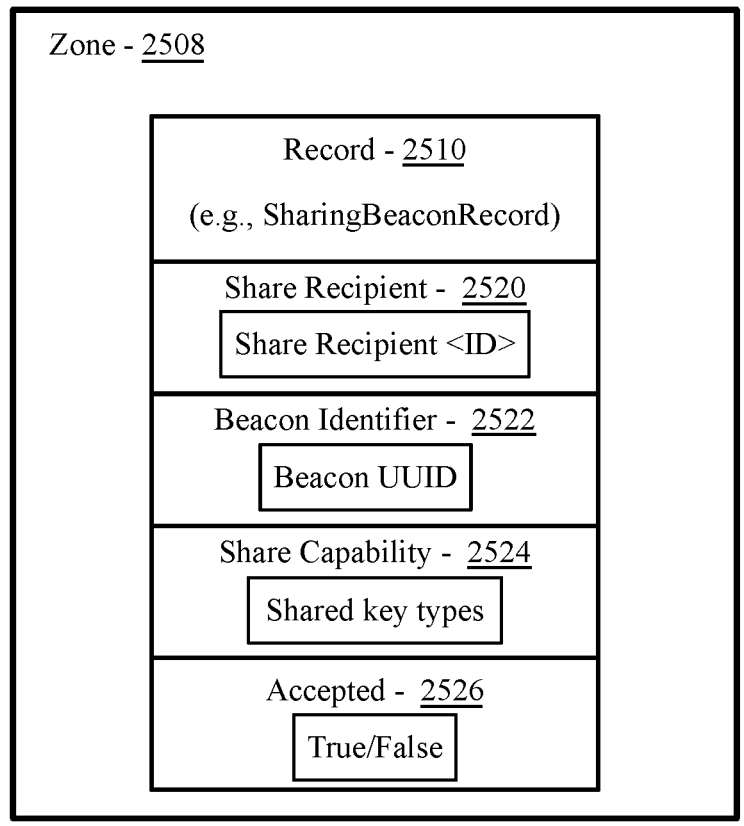

FIG. 25A-25B illustrate storage containers and records of a network connected datastore that can be used to enable key sharing for a wireless accessory. FIG. 25A illustrates a storage container 2502 of a storage system 2500 that can be used to store cloud storage records. FIG. 25B illustrates a storage zone 2508 and cloud storage record 2510 that can be used to store a shared beacon record.

As shown in FIG. 25A, the storage container 2502 includes a shared database 2504 and a private database 2506, which are storage locations for shared and private data respectively. The shared database 2504 includes data that has been shared with an account associated with the storage container. Such data can be encrypted using keys that are generated based on a secret that is shared between users with legitimate access to the share. Data written to the private database 2506 is visible only to the user to which the private database 2506 is associated unless that data is shared with other users. Data within the private database 2506 that is shared with other users can be stored to a shared database 2504 of those users.

Data in the private database 2506 can be divided into one of multiple zones (e.g., zone 2508, zone 2509). Each zone is associated with a set of asymmetric encryption keys. The encryption keys can be different for each zone, such that access to each zone can be separately managed. In one embodiment, an Elliptic Curve Integrated Encryption Scheme (ECIES) is used in which each zone has an associated EC key pair. However, various asymmetric encryption techniques can be used to encrypt the zones and the encryption used for the zones is not limited to any particular encryption algorithm or technique. Data within the zones can be further encrypted using different encryption algorithms such as a variant of the advanced encryption standard (AES) such as AES-256.

Each zone can include multiple records. For example, zone 2508 can include multiple records 2510A-2510N. In one embodiment each record 2510A-2510N can store a set of fields, where each field can contain various types of data, such as strings, numbers, dates, locations, references, or files). Zone 2509 can store records in a manner similar to zone 2508.

Data in the shared database 2504 can be arranged similarly to private database 2506. For example, the shared database 2504 can include one or more zones (e.g., zone 2511). The shared database 2504 can also include one or more shares (e.g., share 2512) that can be made accessible to users associated with other online accounts. One or more records (e.g., record 2514) can be stored within the share 2512. In one embodiment, the zone 2511, share 2512, and record 2514 can be separately encrypted.

As shown in FIG. 25B, record 2510 in zone 2508 can be a shared beacon record that is used to store a record of a sharing arrangement. Record 2510 can represent any one of multiple records 2510A-2510N. Record 2510 can include multiple fields including a share recipient field 2520, beacon identifier field 2522, share capability field 2524, and an accepted field 2526. Record 2510 can be shared by an owner of a wireless accessory with a sharee/delegate via the network connected datastore described herein (e.g., network connected datastore 2313).

The share recipient field 2520 can store a share recipient identifier, which can be an identity handle for an account associated with the cloud data store. The share recipient identifier can be used to specify the account to which delegate keys are to be transmitted. The share recipient can use the delegate keys to perform a subset of the actions that an owner can perform using the shared wireless accessory. The beacon identifier field 2522 can store a beacon UUID, which is an identifier for the wireless accessory for which delegate keys will be shared. A set of delegate keys for a pre-determined period of time can be transmitted after the initial establishment of a share. The owner can periodically send a new set of delegate keys to the share recipient identifier specified by the share recipient field 2520. The sharee/delegate can also use the beacon UUID to request a new set of keys if the pre-determined period of time expires before new keys are sent by the owner.

The share capability field 2524 can be used to specify the set of capabilities that will be shared with the sharee/delegate. The capabilities granted to a sharee or delegate can be determined based on the set of keys that are shared. For example, with reference to FIG. 15, the ability to query a device locator server for a location of the accessory can be granted by sharing position query and decryption keys 1522. The ability to decode status byte information (e.g., battery level, device status, etc.) can be delegated via status byte keys 1525. The ability to connect to and issue commands to the accessory can be granted by sharing command keys 1526, and connection keys 1527. In one embodiment, sharing intermediate keys 1524 may allow the delegate to derive the status byte keys 1525, command keys 1526, and connection keys 1527. Different capabilities may be shared separately. For example, a delegate may be able to cause a wireless accessory to play a sound when near the accessory to enable the accessory to be located but may not be able to query for the accessory location to see the accessory on a map.

The accepted field 2526 can be used to indicate whether record 2510 has been accepted by the sharee. When record 2510 is created and shared, the accepted field 2526 is initially set to false. If the recipient of the share accepts the share, the recipient can set their instance of record 2510 to accepted and send a notice to the owner. When the owner receives notice that the share has been accepted, the owner can update their instance of record 2510 to accepted.

Figure 26A:
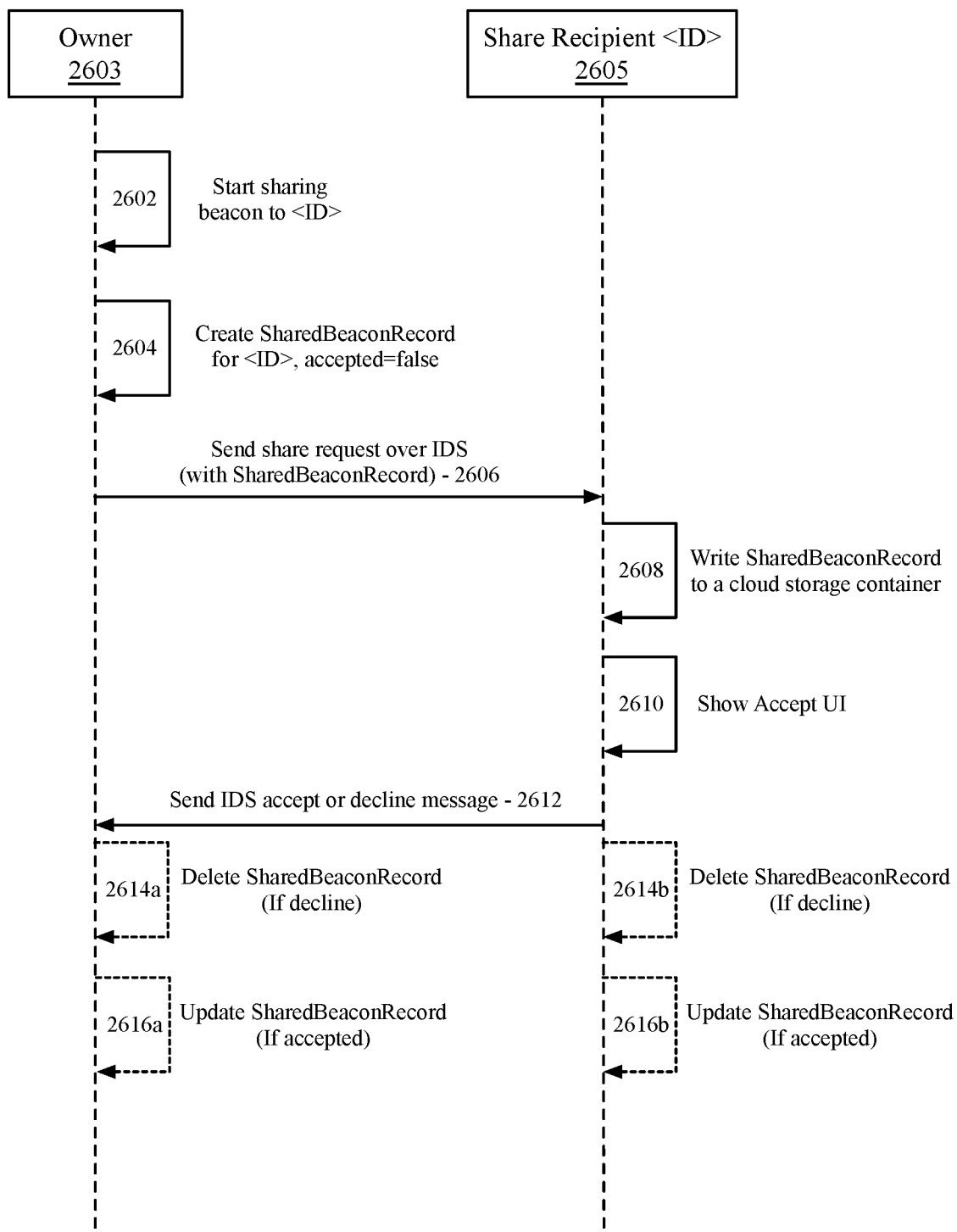
FIG. 26A-26C are sequence diagrams of operations to configure the sharing of keys for a wireless accessory.
Figure 26B:
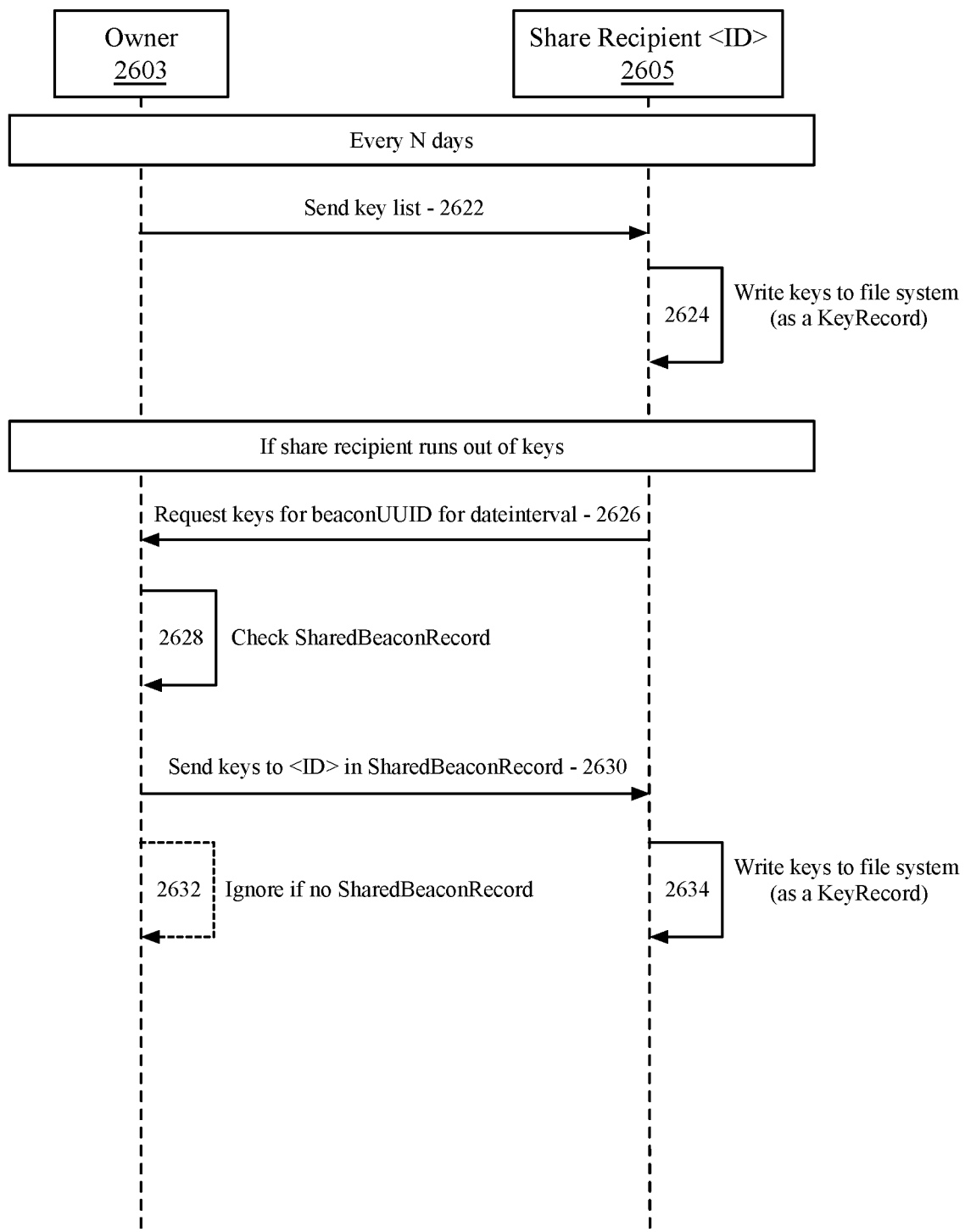
Figure 26C:
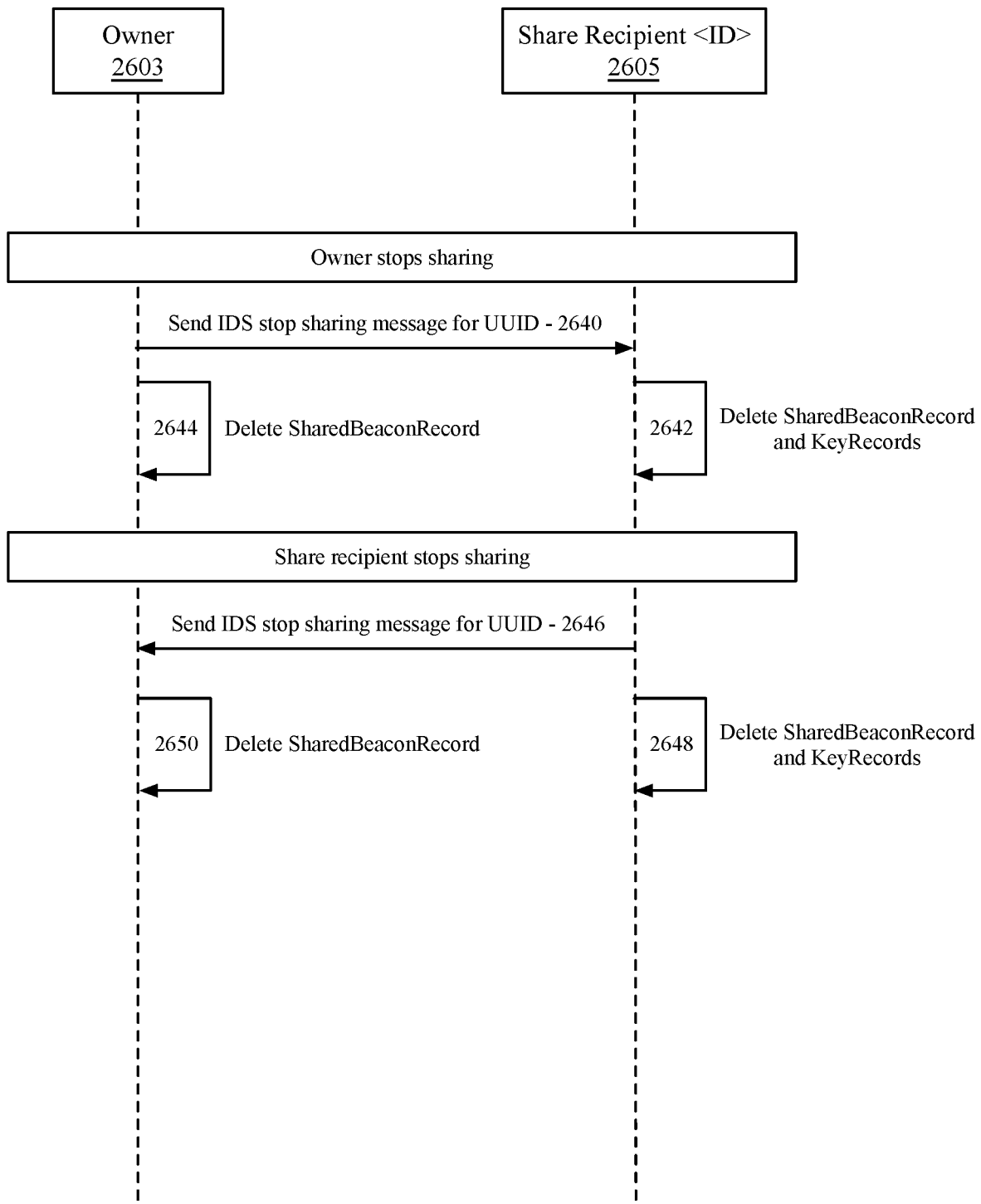

FIG. 26A-26C are sequence diagrams of operations to configure the sharing of keys for a wireless accessory. FIG. 26A shows operations to establish a share. FIG. 26B shows key update operations for an established share. FIG. 26C shows operations to stop a share.

As shown in FIG. 26A, the owner device 2603 can send a share request to share recipient device 2505. The owner device 2603 can be, for example, owner device 1402, while share recipient device 2605 can be delegate device 1904. The share recipient device 2605 can be identified by a share recipient identifier, which can be, for example, an identity handle for an account associated with the share recipient device 2605.

The owner device 2603 can perform an operation 2602 to start sharing a beacon (e.g., wireless accessory) to an identity handle <ID>, which identifies share recipient device 2605 and/or a user account associated therewith. The owner device 2603 then performs operation 2604 to create a shared beacon record for the share recipient and set the accepted state to false. The shared beacon record can be written to a local container that is synchronized with a remote container on a server associated with a cloud datastore. The owner device 2603 then performs operation 2606 to send a share request to the share recipient device 2605. The share can be sent over an identity service (IDS) channel that is established via the use of identity server 2320. The shared beacon record can be sent with the share request. In one embodiment a universal resource locator (URL) to the shared beacon record can be sent with the share request and the share recipient device 2605 can retrieve the shared beacon record via the URL.

The share recipient device 2605 can receive the share request and perform an operation 2608 to write the shared beacon record to a cloud storage container. The share recipient device 2605 can then perform an action 2610 to show an acceptance UI on a display of the device to allow a user to accept or decline the share. The share recipient device 2605 can send, via an IDS channel, an accept message or a decline message 2612 to the owner device 2603. An accept message can be sent when the user of the share recipient device 2605 indicates via the accept UI that the user agrees to accept the share. A decline message can be sent when the user of the share recipient device indicates to decline the share. If the recipient user declines the share in the UI, owner device 2603 and share recipient device 2605 can perform operations 2614a-2614b to delete the shared beacon record from the cloud datastore. If the recipient user accepts the share in the UI, the owner device 2603 and share recipient device 2605 can perform operations 2616a-2616b to update the shared beacon record to indicate that the share has been accepted.

As shown in FIG. 26B, every N number of days, owner device 2603 can send a key list 2622 to share recipient device 2605. Share recipient device 2605 can then perform an operation 2624 to write the keys to a file system on the device as a key record. The share recipient device 2605 can use keys stored in the key record to locate and/or communicate with the shared accessory. The value of N can be determined by the user of owner device 2603 or can be determined by system policy. The specific types of keys in the key list 2622 can be determined based on the capabilities to be shared with share recipient device 2605. When share recipient device 2605 is to perform an action with a shared accessory, the device can select the appropriate keys for the appropriate privacy period and use those keys to detect, locate, and/or communicate with the accessory. The identity handle of the share recipient can be used to send the key list to multiple devices associated with the share recipient. Alternatively, a device of the share recipient can receive the key list and synchronize the key record with other devices.

The owner device 2603 may transmit new keys to share recipient device 2605 at a time that is optimal based on the device state of the owner device (e.g., battery level, network connectivity, etc.). Accordingly, it may be possible for the share recipient to run out of keys, such that the current time period (e.g., number of privacy windows) goes beyond the period for which keys have been made available. In such scenario, the share recipient device 2605 will not be able to perform actions with the accessory until new keys are received. Instead of waiting for new keys to be sent, the share recipient device 2605 can send a request 2626 for keys for the accessory having the beacon UUID for a specified date interval. The owner device 2603 can perform an operation 2628 to check the shared beacon record to determine if a share exists for the beacon UUID. If no share exists, the owner device can ignore the request (2632). If a shared beacon record exists, the owner device 2603 can send a message 2630 over an IDS channel to the identity handle specified in the shared beacon record. Upon receipt of the keys, the share recipient device 2605 can write the keys to the key record in the file system (2634).

In one embodiment, the key list can be shared between the owner device 2603 and the share recipient device 2605 via a shared key record that is synchronized through the cloud datastore. The owner device 2603 can periodically generate new keys and write the keys to an encrypted key record that is synchronized via the network connected datastore with the share recipient device 2605.

As shown in FIG. 26C, either the owner or the share recipient can end the share. If the owner stops sharing, the owner device 2603 can send an IDS stoop sharing message 2640 to the share recipient device that specifies the beacon UUID for which sharing is to be stopped. Multiple accessories may be shared between the owner device and the share recipient device 2605, so sending the beacon UUID allows definitive determination of the accessory for which sharing is to be stopped. Upon receipt of the message 2640, the share recipient device 2605 can perform an operation 2642 to delete the shared beacon record, as well as any stored key records for the identified accessory. The owner device 2603 can also perform an operation 2644 to delete the shared beacon record.

If the share recipient stops sharing, the share recipient device 2605 can send an IDS stoop sharing message 2646 to the owner recipient device that specifies the beacon UUID for which sharing is to be stopped. Upon receipt of the message 2640, the owner device 2603 can perform an operation 2650 to delete the shared beacon record. The share recipient device 2605 can also perform an operation 2648 to delete the shared beacon record, as well as any stored key records for the accessory.

Figures 27A, 27B:
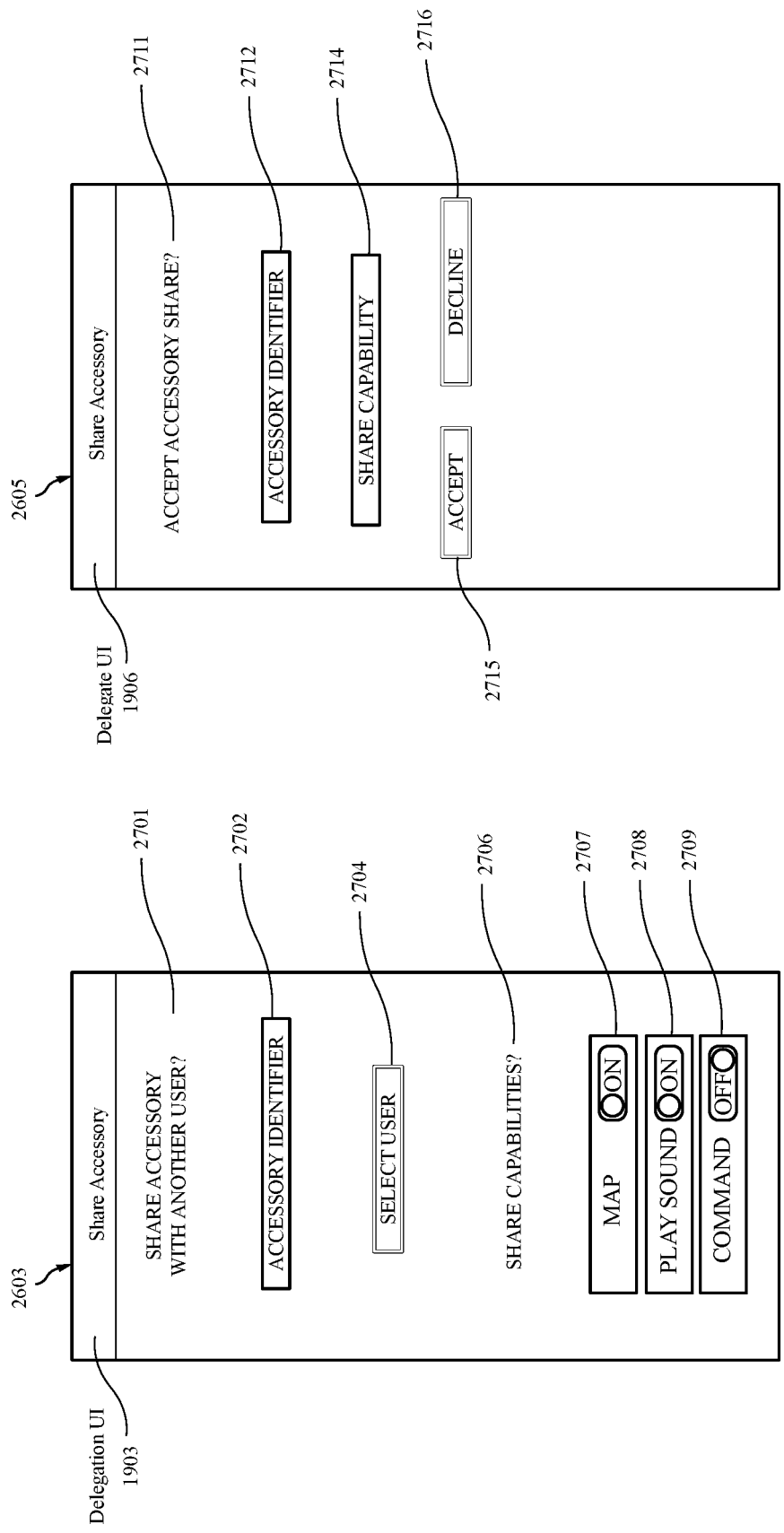
FIG. 27A-27B illustrates user interfaces to establish a key sharing arrangement between user accounts with respect to a wireless accessory.

FIG. 27A-27B illustrates user interfaces to establish a key sharing arrangement between user accounts with respect to a wireless accessory. FIG. 27A illustrates a delegation UI 1903. FIG. 27B illustrates a delegate UI 1906.

As shown in FIG. 27A, the owner device 2603 can present the delegation UI 1903 to a user of the owner device. The delegation UI 1903 may be accessed from a settings or configuration menu or application associated with a wireless accessory to be shared. The delegation UI 1903 can present an interface element 2701 that prompts the user whether an accessory having a displayed accessory identifier 2702 should be shared. The accessory identifier 2702 can be a name or type of the accessory and/or an identifier for the accessory. The delegation UI 1903 can also present an interface element 2704 that allows the selection of a user to which the accessory is to be shared. The user can be selected, for example, from users in a contact list of the user. The user may also be indicated by typing in an identity handle, such as an email address, a phone number, and/or another piece of information that can be used to identify a user or to identify an account associated with a user. The delegate UI 1903 can also present a text prompt 2706 to determine capabilities to be shared for the accessory, for example, whether the user to which the accessory is shared should be able to map the accessory by querying a location server for the location of the accessory (e.g., interface element 2707) or to cause the accessory to play a sound (e.g., interface element 2708), for example to enable the accessory to be located within a room. If the accessory has some independent functionality, an option to enable the delegate to command (interface element 2709) may also be presented. The selected share capabilities can be used to determine which keys are to be shared with the share recipient. The specific capabilities that are presented can vary with the type of wireless accessory. Additionally, some capabilities may be default capabilities. For example, a default capability may be the ability to wirelessly detect the wireless accessory, connect with the wireless accessory, and/or place the wireless accessory in a near owner state.

As shown in FIG. 27B, the share recipient device 2605 can present the delegate UI 1906 to a user of the share recipient device. The delegate UI 1906 can include an interface element 2711 to prompt the user as to whether the share of an accessory having a displayed accessory identifier 2712 should be accepted. The delegate UI 1906 can also present an interface element 2714 that shows the capabilities that are being shared. The delegate UI 1906 can present user interface elements that allow a user to accept (interface element 2715) or decline (interface element 2716) the share.

Figure 28A:
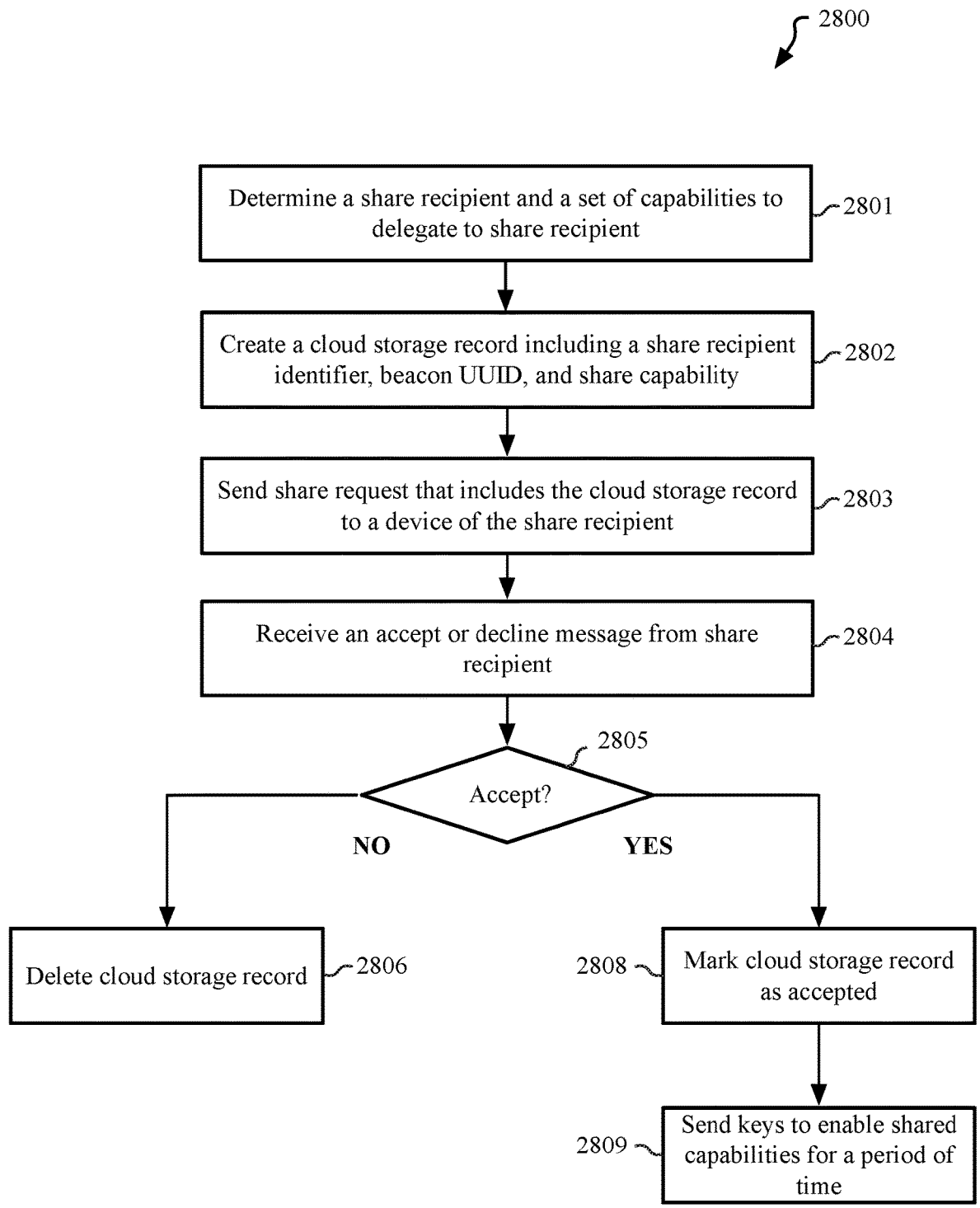
FIG. 28A-28C illustrate methods to enable key sharing for a wireless accessory device, according to embodiments.
Figure 28B:
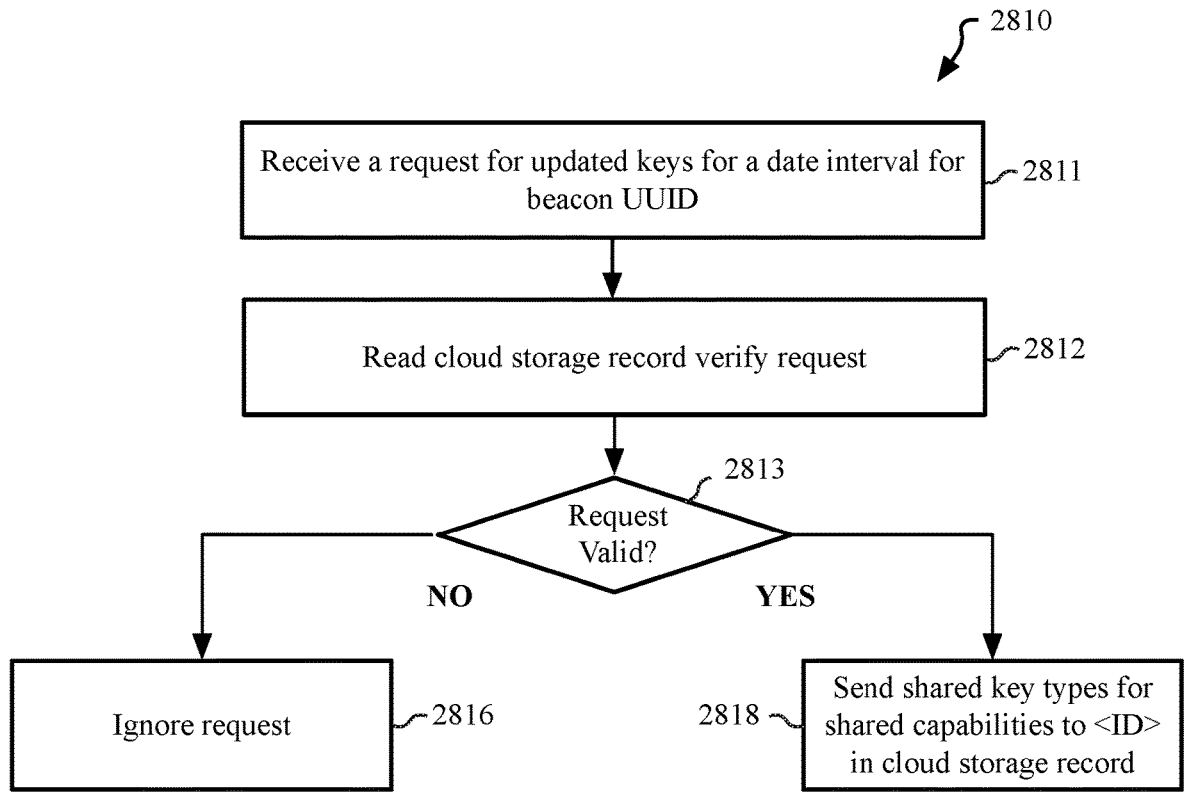
Figure 28C:
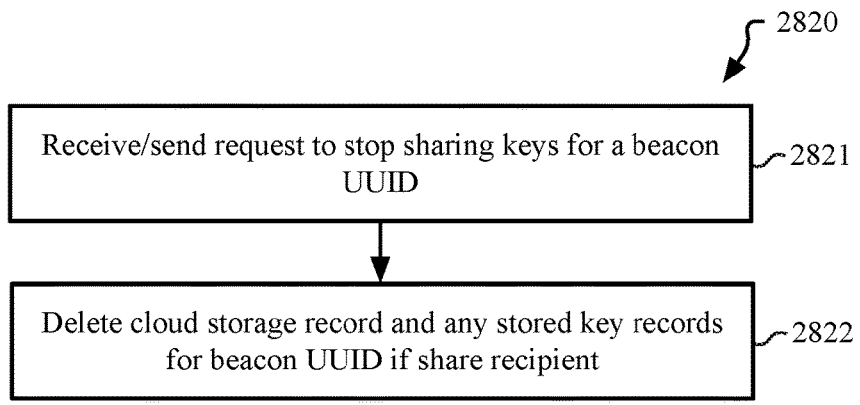

FIG. 28A-28C illustrate methods 2800, 2810, 2820 to enable key sharing for a wireless accessory device, according to embodiments. FIG. 28A shows a method 2800 of setting up a key sharing record on a cloud datastore. FIG. 28B shows a method 2810 of sending updated keys. FIG. 28C shows a method 2820 of ending a key sharing arrangement.

As shown in FIG. 28A, method 2800 includes for an owner device to determine a share recipient and a set of capabilities to delegate to share recipient (block 2801). The owner device can then create a cloud storage record including an identifier for the share recipient (e.g., identity handle), the UUID of the beacon, and the capabilities to share with the share recipient (block 2802). The cloud storage record can be stored in a local cloud storage container, a remote cloud storage container, or a local cloud storage container that is synchronized with a remote container on a cloud storage device. The cloud storage record is initially marked as not accepted. The owner device can then send a share request that includes the cloud storage record (or a URL for the cloud storage record) to a device of the share recipient (block 2803). The share recipient can store the cloud storage record to cloud storage and display a UI to prompt the user of the share recipient device. The user of the device of the share recipient can accept or decline the request via the UI. The owner device can then receive an accept or decline message from share recipient (block 2804) to indicate whether the share was accepted or declines. If the share is declined (NO, block 2805), then the owner device can delete the cloud storage record. The share recipient can also delete the cloud storage record in response to declining the share (2806). If the share is accepted (YES, block 2805), then the owner device can mark the cloud storage record as accepted (2808). The share recipient can also mark the cloud storage record as accepted in response to accepting the share. The owner device and the share recipient can mark the cloud storage record as accepted by updating the accepted field (e.g., accepted field 2526) in the cloud storage record to true. In one embodiment, the share recipient can update the accepted field in the cloud storage record and the update may be automatically synchronized with the owner device via a cloud storage record share configured for the cloud storage record.

After the owner device makes the cloud storage record as accepted, the owner device can send the set of cryptographic keys to enable the shared capabilities for a period of time (block 2809). The set of cryptographic keys can be, for example, the delegate keys described herein. The owner device can pre-compute the keys for the upcoming time periods for which the share will be valid. All keys for the time period can be sent or a subset of keys can be sent, with new keys being sent every N number of days.

As shown in FIG. 28B, method 2810 includes for an owner device to receive a request for updated keys for a date interval for beacon UUID (block 2811). The request can be received if the privacy period for the keys sent to the share recipient has passed but the owner device has not yet had the opportunity to send new keys. The owner device can read the cloud storage record (e.g., shared beacon record) associated with the sharing arrangement to verify the request (block 2812). If the request is not valid (NO, block 2813), for example if no cloud storage record exists for the beacon UUID, the owner device can ignore the request (block 2816). If the request is valid (YES, block 2813), the owner device can generate and send the shared key types for the shared capabilities to the identity handle for the share that is stored in the cloud storage record (block 2818). The types of keys to send and the identity to which the keys are sent can be determined based on the cloud storage record. Thus, without regard to the identifier from which the request is received, the updated keys will be sent to the identity handle stored in the cloud storage record. Additionally, the share recipient cannot request keys for capabilities that are not part of the share arrangement. The number of privacy windows for which keys are generated can be determined in part based on the requested date interval, although the owner device can respond with a different number of privacy windows than requested.

As shown in FIG. 28C, a share can be stopped by the owner device or the share recipient. The owner device or recipient device can receive or send a request to stop sharing keys for a beacon UUID (block 2821). The owner device and recipient device can then delete the cloud storage record for the share arrangement and the share recipient can delete any stored key records for the beacon UUID (block 2822).

Reference herein to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow can be performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used herein is for the purpose of describing particular embodiments only and is not intended to be limiting as to all embodiments. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Computing devices, user interfaces for such devices, and associated processes for using such devices are described herein. In some embodiments, the computing device is a portable communications device such as a mobile telephone that also contains other functions, such as PDA and/or music player functions. In the description and figures of this application, where a wireless device, wireless accessory, or wireless accessory device is described or illustrated, unless stated otherwise the described or illustrated attributes can generally be applied to any type of wireless device, wirelesses accessory, or wireless accessory device that is capable of broadcasting a wireless beacon.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide for a non-transitory machine-readable medium storing instructions to cause one or more processor to perform operations comprising determining, for a wireless accessory, a share recipient and a set of capabilities to delegate to the share recipient; creating a storage record including fields to store an identifier of the share recipient, an identifier of the wireless accessory, and a set of capabilities to be shared with the share recipient; sending a share request to a share recipient device; in response to receipt of an accept message from the share recipient device, marking the cloud storage record as accepted; and sending a set of cryptographic keys to the share recipient device to enable the share recipient device to perform the set of capabilities on the wireless accessory.

One embodiment provides for a data processing system on an electronic device, the data processing system comprising memory to store instructions and one or more processors to execute the instructions. The instructions cause the one or more processors to determine, for a wireless accessory, a share recipient and a set of capabilities to delegate to the share recipient, create a storage record including fields to store an identifier of the share recipient, an identifier of the wireless accessory, and a set of capabilities to be shared with the share recipient, and send a share request to a share recipient device that is associated with the share recipient. In response to receipt of an accept message from the share recipient device, the one or more processors can mark the storage record as accepted send a set of cryptographic keys to the share recipient device to enable the share recipient device to perform the set of capabilities on the wireless accessory.

One embodiment provides for an electronic device comprising a wireless processor coupled with a wireless radio, memory to store instructions, and one or more processors to execute the instructions. The instructions cause the one or more processors to determine, for a wireless accessory, a share recipient and a set of capabilities to delegate to the share recipient, create a storage record including fields to store an identifier of the share recipient, an identifier of the wireless accessory, and a set of capabilities to be shared with the share recipient, and send, via the wireless processor, a share request to a share recipient device that is associated with the share recipient. In response to receipt of an accept message from the share recipient device, the one or more processors can mark the storage record as accepted and send a set of cryptographic keys to the share recipient device to enable the share recipient device to perform the set of capabilities on the wireless accessory.

One embodiment provides for a method comprising, on an electronic device associated with a share recipient, receiving a request to accept a share a capability associated with a wireless accessory, the request including a storage record, where the storage record includes fields to store an identifier of the share recipient, an identifier of the wireless accessory, and a set of capabilities to be shared with the share recipient. The method additionally comprises presenting an interface on a display of the electronic device to accept or decline the request, sending a message indicating acceptance of the request in response to receipt an input via the interface, updating the storage record to indicate acceptance of the request, and receiving a set of cryptographic keys to enable the electronic device to perform an operation associated with the wireless accessory.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A non-transitory machine-readable medium storing instructions to cause one or more processor to perform operations comprising:
   determining, for a wireless accessory device by an owner device associated with an owner, a share recipient and a set of capabilities to delegate to the share recipient, wherein the wireless accessory device is owned by the owner;
   creating a storage record including fields to store an identifier of the share recipient, an identifier of the wireless accessory device, and the set of capabilities to be shared with the share recipient;
   sending, by the owner device, a share request to a share recipient device that is associated with the share recipient;
   in response to receipt of an accept message from the share recipient device, marking, by the owner device, the storage record as accepted; and
   sending a set of cryptographic keys to the share recipient device to enable the share recipient device to perform the set of capabilities on the wireless accessory device.

2. The non-transitory machine-readable medium as in claim 1, the operations additionally comprising writing the storage record to a network connected datastore.

3. The non-transitory machine-readable medium as in claim 2, wherein the network connected datastore is stored on a remote server device.

4. The non-transitory machine-readable medium as in claim 2, wherein the storage record is written to a local container associated with the network connected datastore and the local container is synchronized with a remote storage device.

5. The non-transitory machine-readable medium as in claim 1, wherein the set of capabilities to delegate to the share recipient includes connecting to the wireless accessory device, performing an action on the wireless accessory device, and querying a location server for a location of the wireless accessory device.

6. The non-transitory machine-readable medium as in claim 5, wherein performing the action on the wireless accessory device includes causing the wireless accessory device to play a sound and wherein sending the share request to the share recipient device includes creating a network communication channel with the share recipient device via an identity server using the identifier of the share recipient.

7. The non-transitory machine-readable medium as in claim 6, the operations additionally comprising receiving the accept message from the share recipient device via the network communication channel.

8. The non-transitory machine-readable medium as in claim 1, wherein marking the storage record as accepted includes updating a field of the storage record.

9. The non-transitory machine-readable medium as in claim 1, the operations additionally comprising, in response to receipt of a deny message from the share recipient device, deleting the storage record.

10. The non-transitory machine-readable medium as in claim 1, the operations additionally comprising generating the set of cryptographic keys based on stored key material, wherein the key material is collaboratively generated with the wireless accessory device.

11. The non-transitory machine-readable medium as in claim 10, wherein the set of cryptographic keys includes keys for one or more privacy periods of the wireless accessory device, and the operations additionally comprising changing, each privacy period, one or more keys used to connect with the wireless accessory device.

12. The non-transitory machine-readable medium as in claim 11, the operations additionally comprising periodically sending an updated set of cryptographic keys to the share recipient device.

13. The non-transitory machine-readable medium as in claim 11, the operations additionally comprising receiving a request from the share recipient device for additional keys, validating the request via the storage record, and sending an updated set of cryptographic keys to the share recipient device using the identifier of the share recipient included in the storage record.

14. A data processing system on an electronic device, the data processing system comprising:
   memory to store instructions; and
   one or more processors to execute the instructions, wherein the instructions cause the one or more processors to:
      determine, for a wireless accessory device by an owner device associated with an owner, a share recipient and a set of capabilities to delegate to the share recipient, wherein the wireless accessory device is owned by the owner;
      create a storage record including fields to store an identifier of the share recipient, an identifier of the wireless accessory device, and the set of capabilities to be shared with the share recipient;
      send, by the owner device, a share request to a share recipient device that is associated with the share recipient;
      in response to receipt of an accept message from the share recipient device, mark, by the owner device, the storage record as accepted; and send a set of cryptographic keys to the share recipient device to enable the share recipient device to perform the set of capabilities on the wireless accessory device.

15. The data processing system as in claim 14, wherein the one or more processors are additionally to write the storage record to a cloud datastore.

16. The data processing system as in claim 14, wherein sending the share request to the share recipient device includes creating a network communication channel with the share recipient device via an identity server using the identifier of the share recipient.

17. The data processing system as in claim 16, wherein the one or more processors are additionally to receive the accept message from the share recipient device via the network communication channel.

18. A method comprising:
on an electronic device associated with a share recipient:
receiving, from an owner device associated with an owner, a request to accept a share of a capability associated with a wireless accessory device, the request including a storage record, wherein the storage record includes fields to store an identifier of the share recipient, an identifier of the wireless accessory device, and a set of capabilities to be shared with the share recipient, wherein the wireless accessory device is owned by the owner;
presenting an interface on a display of the electronic device to accept or decline the request;
sending a message indicating acceptance of the request in response to receipt of an input via the interface;
updating the storage record to indicate acceptance of the request; and
receiving a set of cryptographic keys to enable the electronic device to perform an operation associated with the wireless accessory device.

19. The method as in claim 18, wherein the operation associated with the wireless accessory device includes detecting a wireless beacon signal transmitted by the wireless accessory device.

20. The method as in claim 19, wherein the operation associated with the wireless accessory device includes placing the wireless accessory device in a near owner mode in response to detecting the wireless beacon signal transmitted by the wireless accessory device, querying a location server for a location of the wireless accessory device, or sending a command to the wireless accessory device to cause the wireless accessory device to play a sound.

* * * * *